(12) United States Patent
Hanson et al.

(10) Patent No.: US 9,880,045 B2
(45) Date of Patent: *Jan. 30, 2018

(54) SENSOR INCLUDING ELECTRICAL TRANSMISSION-LINE PARAMETER THAT CHANGES RESPONSIVE TO VEHICULAR LOAD

(71) Applicant: INTERNATIONAL ROAD DYNAMICS, Saskatoon (CA)

(72) Inventors: Randal Leroy Hanson, Saskatoon (CA); Michael David Lockerbie, Saskatoon (CA); Ian Robert Meier, Saskatoon (CA); Tyler William Haichert, Saskatoon (CA)

(73) Assignee: International Road Dynamics (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,765

(22) Filed: Mar. 4, 2014

(65) Prior Publication Data

US 2014/0291039 A1   Oct. 2, 2014

Related U.S. Application Data

(63) Continuation-in-part of application No. 13/835,797, filed on Mar. 15, 2013, now Pat. No. 9,429,463.

(Continued)

(51) Int. Cl.
*G01G 7/06* (2006.01)
*G01G 19/03* (2006.01)
(Continued)

(52) U.S. Cl.
CPC ............. *G01G 19/024* (2013.01); *G01G 7/06* (2013.01); *G01L 1/06* (2013.01); *G01L 1/14* (2013.01); *G07C 5/08* (2013.01); *G08B 13/2497* (2013.01)

(58) Field of Classification Search
CPC .... G01G 19/024; G01G 23/01; G01G 23/015; G01G 7/06; G07C 5/08; G08B 13/2497;
(Continued)

(56) References Cited

U.S. PATENT DOCUMENTS 3,782,486 A * 1/1974 Kuhn ..................... G08B 13/26
                                                         177/210 R
4,560,016 A * 12/1985 Ibanez ................... G01G 19/03
                                                         177/132

(Continued)

FOREIGN PATENT DOCUMENTS

CA        2163045 A1     5/1997
CN       201000356       1/2008
(Continued)

OTHER PUBLICATIONS

"What Is Coaxial Cable?" definition from WhatIS.com website (http://searchdatacenter.techtarget.com/definition/coaxial-cable). Downloaded Oct. 8, 2015.*

(Continued)

*Primary Examiner* — Randy Gibson
(74) *Attorney, Agent, or Firm* — Tarolli, Sundheim, Covell & Tummino LLP

(57) ABSTRACT

An apparatus includes a sensor assembly. The sensor assembly includes a transmission-line assembly having an electrical transmission-line parameter configured to change, at least in part, in response to reception, at least in part, of a vehicular load of a moving vehicle moving relative to a vehicular roadway to the transmission-line assembly positionable, at least in part, relative to the vehicular roadway.

73 Claims, 33 Drawing Sheets

Related U.S. Application Data

(60) Provisional application No. 61/772,138, filed on Mar. 4, 2013.

(51) Int. Cl.
*G01L 1/06* (2006.01)
*G01L 1/14* (2006.01)
*G08B 13/24* (2006.01)
*G07C 5/08* (2006.01)
*G01G 19/02* (2006.01)

(58) Field of Classification Search
CPC ... G01L 1/06; G01L 1/14; G01L 1/142; G01L 1/144; G01L 1/146
USPC ........................................................ 324/644
See application file for complete search history.

(56) References Cited

U.S. PATENT DOCUMENTS

| | | | | |
|---|---|---|---|---|
| 4,712,423 | A * | 12/1987 | Siffert | G01L 1/16 177/132 |
| 4,799,381 | A * | 1/1989 | Tromp | G01G 19/024 177/211 |
| 4,984,128 | A * | 1/1991 | Cebon | G01G 7/06 177/210 C |
| 5,111,897 | A * | 5/1992 | Snyder | G01G 19/024 177/1 |
| 5,260,520 | A * | 11/1993 | Muhs | G01G 19/03 177/1 |
| 5,265,481 | A * | 11/1993 | Sonderegger | G01G 3/13 177/210 C |
| 5,448,222 | A | 9/1995 | Harman | |
| 5,461,924 | A * | 10/1995 | Calderara | G01G 3/13 73/768 |
| 5,520,056 | A * | 5/1996 | Buisson | G08G 1/02 340/933 |
| 5,585,604 | A | 12/1996 | Holm | |
| 5,693,886 | A | 12/1997 | Seimiya et al. | |
| 5,705,984 | A * | 1/1998 | Wilson | G08B 13/2497 340/552 |
| 5,710,558 | A * | 1/1998 | Gibson | G08G 1/02 200/85 R |
| 5,900,592 | A | 5/1999 | Sohns et al. | |
| 5,998,741 | A * | 12/1999 | Beshears | G08G 1/015 177/133 |
| 6,459,050 | B1 | 10/2002 | Muhs et al. | |
| 6,526,834 | B1 | 3/2003 | Kohler et al. | |
| 6,692,567 | B1 | 2/2004 | Tatom et al. | |
| 6,865,518 | B2 | 3/2005 | Bertrand et al. | |
| 6,894,233 | B2 * | 5/2005 | Dingwall | G07B 15/00 177/210 C |
| 7,072,763 | B2 | 7/2006 | Saxon et al. | |
| 7,153,383 | B2 * | 12/2006 | Gebert | G01G 7/06 156/249 |
| 7,375,293 | B2 | 5/2008 | Beshears et al. | |
| 7,421,910 | B2 | 9/2008 | Chen et al. | |
| 7,783,450 | B2 | 8/2010 | Hively et al. | |
| 9,279,712 | B2 * | 3/2016 | Kroll | G01G 3/14 |
| 9,304,032 | B2 * | 4/2016 | Cornu | G01G 3/13 |
| 9,488,517 | B2 * | 11/2016 | Cornu | G01G 19/024 |
| 2004/0080432 | A1 | 4/2004 | Hill et al. | |
| 2004/0239616 | A1 * | 12/2004 | Collins | G06F 3/0202 345/156 |
| 2005/0082094 | A1 | 4/2005 | Gebert | |
| 2005/0271474 | A1 | 12/2005 | Smith et al. | |
| 2006/0052980 | A1 | 3/2006 | LaFollette et al. | |
| 2006/0086197 | A1 | 4/2006 | Chen et al. | |
| 2006/0097730 | A1 * | 5/2006 | Park | G01R 31/088 324/534 |
| 2007/0067141 | A1 | 3/2007 | Beshears et al. | |
| 2008/0136625 | A1 | 6/2008 | Chew | |
| 2009/0151421 | A1 | 6/2009 | Susor | |
| 2009/0273352 | A1 | 11/2009 | Yu | |
| 2011/0015808 | A1 | 1/2011 | Dreier et al. | |
| 2011/0037483 | A1 * | 2/2011 | Scheuermann | G01L 1/14 324/644 |
| 2011/0119028 | A1 * | 5/2011 | Bishop | G01G 23/015 702/173 |
| 2011/0127090 | A1 | 6/2011 | Vijayaraghavan et al. | |
| 2011/0267200 | A1 | 11/2011 | Reynolds et al. | |
| 2014/0249711 | A1 * | 9/2014 | Hanson | G01G 19/024 701/29.1 |
| 2014/0291039 | A1 | 10/2014 | Hanson et al. | |
| 2016/0018252 | A1 * | 1/2016 | Hanson | G01G 19/024 73/774 |
| 2016/0019731 | A1 * | 1/2016 | Hanson | G01G 19/024 701/29.1 |

FOREIGN PATENT DOCUMENTS

| | | | |
|---|---|---|---|
| CN | 101738244 | A | 6/2010 |
| CN | 202209955 | U | 5/2012 |
| EP | 0423440 | B1 | 10/1993 |
| EP | 0491655 | B1 | 8/1995 |
| EP | 0997713 | A1 | 5/2000 |
| EP | 2189766 | B1 | 7/2012 |
| FR | 2857092 | A1 * | 7/2003 ........... G01G 19/024 |
| FR | 2857092 | A1 | 1/2005 |
| GB | 225081 | A | 11/1924 |
| GB | 2056672 | B | 7/1983 |
| GB | 2250813 | A * | 6/1992 ........... G01G 19/04 |
| GB | 2377027 | B | 6/2003 |
| JP | 2000314654 | A | 11/2000 |
| JP | 2007172458 | A | 7/2007 |
| JP | 2008232954 | A | 10/2008 |
| JP | 2012042219 | A | 3/2012 |
| JP | 2014059807 | A | 4/2014 |
| WO | 2006129999 | A1 | 12/2006 |
| WO | 2008135040 | A2 | 11/2008 |
| WO | 2013071452 | A1 | 5/2013 |
| WO | WO 2013/071452 | * | 5/2013 ........... G01G 19/024 |
| WO | 2014136066 | A3 | 12/2014 |

OTHER PUBLICATIONS

"Development of an Electrical Time Domain Reflectometry (ETDR) Distributed Strain Sensor", Mark W. Lin, Jagan Thaduri, and Ayo O Abatan. Institute of Physics Publishing, Measurment Science Technology 16 (2005), pp. 1495-1505.Published Jun. 15, 2005.*

Notification of Transmittal of International Preliminary Report on Patentability issued in PCT/IB2014/059434 on Jun. 25, 2015.

"Development of an Electrical Time Domain Reflectometry (ETDR) Distributed Strain Sensor", Mark W. Lin, Jagan Thaduri and Ayo A. Abatan, Institute of Physics Publishing, Measurement Science Technology 16 (2005), pp. 1495-1505, Published Jun. 15. 2005.

"Vehicle Weighing in Motion With Fibre Optic Sensors" J Boby, S Teral, J M Caussignac & M Siffert, Measurement & Control vol. 26, Mar. 1993, pp. 45-47.

C I Merzbacher, A D Kersey, and E J Friebele. Fiber optic sensors in concrete structures: a review, 1996 Smart Mater. Struct. 5 pp. 196-208.

CIPO Examination Notes, PCT/IB2014/059406 (Jun. 2014).

Ki-Seok Kwak, Tae Sung Yoon and Jin Bae Park, Load Impedance Measurement on a Coaxial Cable via Time-Frequency Domain Reflectometry, SICE-ICAS International Joint Conference, Oct. 18-21, 2006 in Bexco, Busan, Korea, pp. 1643-1646.

p. 7 of Office Action dated Oct. 27, 2015 for U.S. Appl. No. 14/196,765 which has footnote 1 which details "What is Coaxial Cable?" definition from WhatIS.com website (http://searchdatacenter.techtarget.com/definition/coaxial-cable).

Paulter, "An Assessment on the Accuracy of Time-Domain Reflectometry for Measuring the Characteristic Impedance of Transmission Lines", IEEE Transactions on Instrumentation and Measurement, vol. 50, No. 5, pp. 1381-1387, Oct. 2001.

PCT Int'l Search Report, PCT/IB2014/059406 (dated Jun. 2014).

(56) References Cited

OTHER PUBLICATIONS

PCT/IB2014/059434 Notification of Transmittal of International Preliminary Report on Patentability, dated Jun. 25, 2015.

Shin et al, "Evaluation of the Load Impedance in Coaxial Cable via Time-Frequency Domain Reflectometry", Advanced Signal Processing Algorithms, Architectures, and Implementations XIII, Proceedings of SPIE, vol. 5205 (2003).

Shin et al, "Time-Frequency Domain Reflectometry for Smart Wiring Systems", Advanced Signal Processing Algorithms, Architectures, and Implementations XIII, Proceedings of SPIE, vol. 4791 (2002).

Tong et al, Study on Elastic Helical TDR Sensing Cable for Distributed Deformation Detection, Sensors 2012, 12, 9586-9602, ISSN 1424-8220.

* cited by examiner

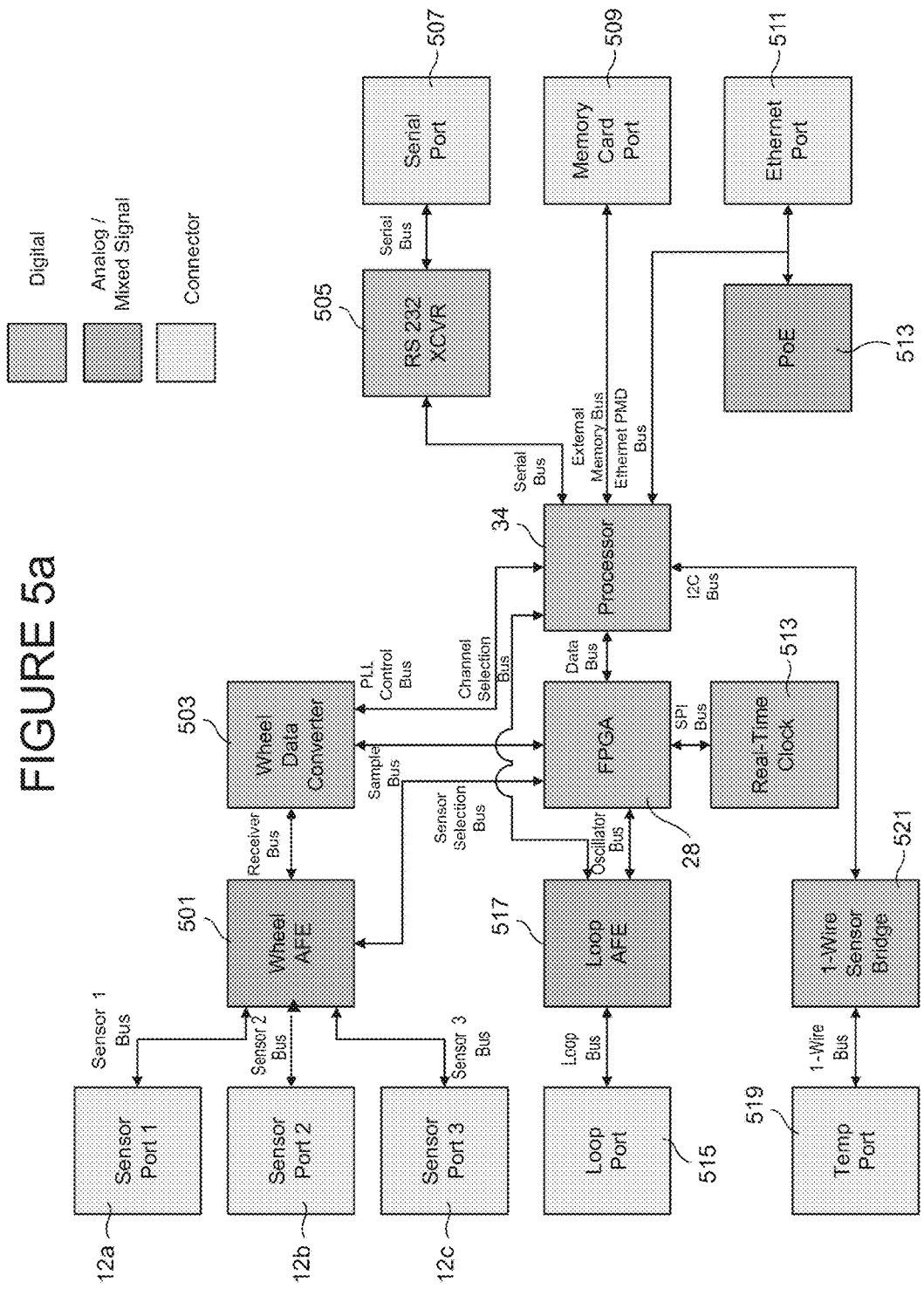

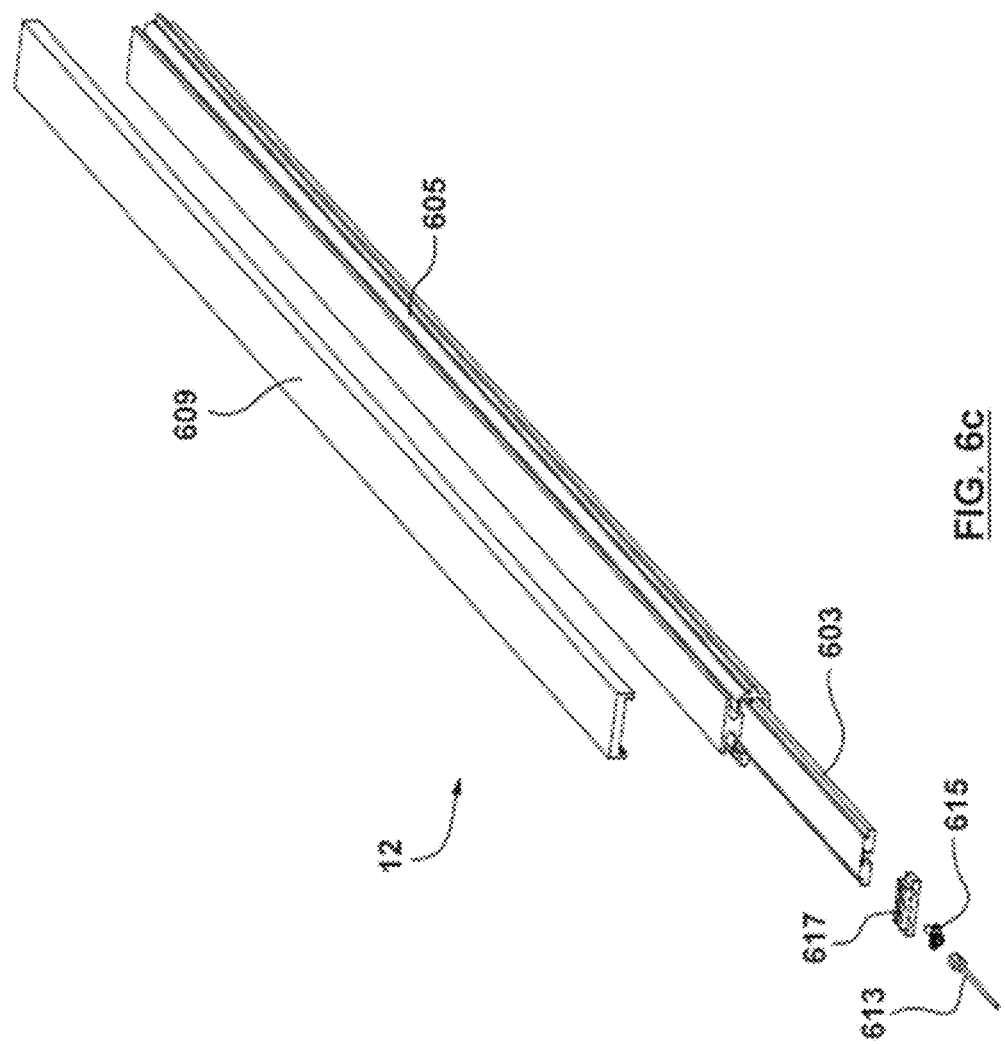

SENSOR INCLUDING ELECTRICAL TRANSMISSION-LINE PARAMETER THAT CHANGES RESPONSIVE TO VEHICULAR LOAD

CROSS-REFERENCE TO RELATED APPLICATION(S)

This application is related to and claims domestic priority benefits under 35 USC §119(e) from U.S. Provisional Patent Application Ser. No. 61/772,138 filed on Mar. 4, 2013, the entire content of which is expressly incorporated hereinto by reference.

This application is related to and claims domestic priority benefits under 35 USC §119(e) from U.S. Utility patent application Ser. No. 13/835,797 filed on Mar. 15, 2013, the entire content of which is expressly incorporated hereinto by reference.

TECHNICAL FIELD

The embodiments disclosed herein relate generally to intelligent transportation systems.

BACKGROUND

Intelligent transportation systems may involve data collection, toll collection, vehicle classification, weigh in motion (WIM), and other traffic monitoring or traffic management systems.

For example, WIM systems are used to detect and weigh vehicles in motion in order to enhance the operation of road systems in a safer and more efficient manner.

A WIM system uses one or more sensors to obtain information about a vehicle as it is sensed by the sensor, typically as the vehicle moves over the sensor. Some information may be measured directly from a sensor, and other information may be measured and derived from a combination of sensors operating together.

Vehicle information that may be measured includes, for example, the number of axles, weight per axle, weight per wheel, vehicle weight, wheel count, wheel spacing, axle spacing, inter-axle spacing, axle width, and axle and/or vehicle speed. Aggregate information may also be collected such as the total number of vehicles detected by the sensors.

Time Domain Reflectometry

Generally, time domain reflectometry (TDR) is a measurement technique based on the principle that a transmission line of a particular geometry presents a known characteristic impedance. Therefore, changes to the geometry of the transmission line result in changes in the characteristic impedance that can be measured using TDR techniques. A skilled person would understand that time domain reflectometry may be used with optical or electrical signals, and that practically the optical and electrical signals are physically different requiring differently skilled knowledge and equipment to measure changes in transmission line characteristics.

In an electrical transmission line, a reflection will be generated whenever an incident wave meets a change in the characteristic impedance, which is also known as a discontinuity. TDR measurement techniques can then be used to determine the location and magnitude of the discontinuity in the transmission line from the reflected wave. Thus, the time the reflected wave takes to travel back along the transmission line can be translated into a distance along the transmission line. The magnitude of the voltage of the reflected wave can be used to calculate the amount of change in the characteristic impedance.

TDR measurement techniques may use a step input voltage for the incident wave shape as it eases the complexity of interpreting the reflected signals. In source- or both-ends terminated transmission lines, the step input voltage is divided between the source impedance and the transmission line impedance. If the source and transmission line impedances are matched, then the voltage measured between the source and the transmission line over the round-trip of the incident wave along the transmission line is half of the step input voltage. Where discontinuities exist on the transmission line, the voltage measured will deviate from exactly half due to the received reflections. Other approaches for TDR measurement may also be used, such as wave modulation with a swept frequency.

UK patent application GB 2,250,813A discloses a weighing apparatus for vehicles. The apparatus comprises a fibre optic cable whose light transmission characteristics vary under load and is encased in a pressure pad of resilient material and laid across a roadway. As a vehicle crosses the pressure pad, a time domain reflectometer calculates the load exerted by each wheel by monitoring the intensity of back scattered light from the fibre optic cable.

Known traffic monitoring and transportation management systems typically use strain gauge type sensors, for example, a mechanical strain gauge or piezo electric strain sensor, that are not configured as a transmission line. Therefore, existing intelligent transportation systems using strain gauge type sensors have signal processing systems and digital processing systems that do not utilize electrical TDR (ETDR) measurement techniques.

SUMMARY

Existing intelligent transportation systems may be improved by increasing the fidelity of the measured or extracted information corresponding to the physical property of the vehicle being measured by the sensor, e.g. information about the vehicle's wheel weights, as the vehicle's wheels move over the sensor. Existing intelligent transportation systems may also be improved by adding the ability to measure additional wheel specific parameters.

Being able to accurately measure the magnitude of the wheel load on the sensor is a separate technical problem from being able to accurately determine the number of wheels, and/or where the wheel load or loads are applied on the sensor.

An object of the present invention is to provide a system for measuring moving vehicle information. In accordance with one aspect of the invention, there is provided a system for measuring moving vehicle information comprising: a sensor configured to respond to one or more wheels of the vehicle, where one or more of said wheels changes the characteristic impedance of the sensor at the wheel's contact location; an electrical time domain reflectometry signal processing system capable of measuring the change in the impedance of the sensor and converting the impedance change to a signal; and a data-processing system capable of extracting vehicle information from the signal.

The system is configured to measure moving vehicle information, comprising number of wheels per axle, wheel pressure and wheel-road contact dimensions which include wheel width, wheel location on the sensor and the length of time the wheel exerts force on the sensor as measured using electrical time domain reflectometry (ETDR). Also, axle width and inter-axle spacing may be calculated. Where axle width is understood as the width of an axle of a vehicle calculated as the distance between the measured wheels of the vehicle along one axle. Inter-axle spacing is understood as the distance between one set of wheels on one axle and another set of wheels on another axle of the measured vehicle. Also, location or position of the vehicle in the lane may be derived from the location of the wheels of the vehicle as they pass over the sensor, since the sensor generally runs across the entire lane.

In another aspect of the invention, there is provided an apparatus for measuring information about a moving vehicle comprising a sensor whose impedance changes in response to an applied load; a signal source for transmitting an electrical signal along the sensor; a receiver for measuring a reflected electrical signal reflected by the sensor, the reflected electrical signal caused by the impedance change of the sensor; and a data processing system for extracting information about the vehicle from the reflected electrical signal.

In various embodiments of the system and apparatus, the sensor comprises a transmission line that is integrated transversely into a roadway so that traffic, i.e. vehicles, pass over the sensor. The force exerted on the sensor, due to the weight of the passing wheel of the vehicle, causes a deflection in the structure of the transmission line, thereby affecting the impedance of the transmission line where the force is applied. The impedance change is measured using ETDR techniques, and the vehicle information is extracted from the measured impedance changes using signal processing systems and digital processing systems.

In one embodiment, the sensor comprising a transmission line may be calibrated at every position along the line in order to improve accuracy.

In another embodiment, the sensor is protected by encasing it in a resilient and durable housing.

In a further embodiment, the sensor may be positioned above the road. In an alternative embodiment, the sensor may be positioned flush with the road surface. In another alternative embodiment, the sensor may be positioned below the road surface.

The sensor in one embodiment is generally transversely oriented relative to the movement of the vehicles, spanning the width of the road. In an alternative embodiment, the sensor spans one lane of the road. A skilled person would understand, however, that different sensor orientations, placements, and lengths are possible.

In another aspect of the invention, there is provided a method for measuring moving vehicle information using time domain reflectometry. In one embodiment of the invention, the method comprises measuring the change in the impedance of a sensor using electrical time domain reflectometry signal processing; converting the impedance change to a signal; and processing the signal to extract vehicle information.

In various aspects and embodiments of the invention, the use of ETDR to measure moving vehicle information provides additional data compared to known intelligent transportation systems, and more reliable information over prior known vehicle information systems. In another embodiment, the use of ETDR to measure moving vehicle information may be more cost effective over known systems.

In one embodiment of the invention, the use of ETDR to measure moving vehicle information allows for the collection of detailed vehicle information, including spatial data, using a single ETDR sensor. This includes spatial data that is not reasonably obtainable in a cost effective manner using known systems.

In another embodiment, the weight of the vehicle can be calculated by integrating the wheel pressure associated with the instantaneous wheel-sensor contact duration measured using the ETDR techniques over the wheel-road contact length. The wheel-road contact length is determined by the speed of the vehicle, specifically the speed of the wheels of the vehicle as they move over the ETDR sensor and wheel-sensor contact duration. The weight of the vehicle is then calculated as the sum of the weight calculated for each wheel of the vehicle. The weight of each axle is calculated as the sum of the weight for each wheel associated with that axle.

A skilled person would understand that, generally, a vehicle travelling on a road has wheels, that the wheels are travelling at the same speed as the vehicle, and that the wheels are practically synonymous with the tires. A skilled person would also understand that vehicle speed may be determined in a variety of ways (such as, by way of a speed measuring system). In one embodiment of the invention, vehicle speed may be calculated by separating two instances of the sensor by a known distance (between the sensors), then calculating the vehicle speed by measuring the time it takes the vehicle to travel the fixed distance between the two instances of the sensor. The sensors could be two ETDR sensors, or other known sensors such as loop sensors, mechanical strain gauges, or piezoelectric sensors, or a combination of different sensor types. Vehicle speed may also be measured by radar or other known techniques (generically known as a speed measuring system). For the system to calculate the weight of the vehicle, the system needs to receive a speed measurement of the moving vehicle.

In one embodiment, the measurement of moving vehicle information comprises one or more ETDR sensors that may be used in combination with other non-ETDR sensors such as temperature sensors, speed sensors, loop or vehicle presence sensors, accelerometer sensors, seismic sensors, acoustic sensors, or any other sensor suitable for collecting relevant road condition, road environment, or vehicle information.

In various aspects and embodiments of the invention, the vehicle information and/or data collected by the apparatus, system or method may be stored in a data store. In one embodiment, information of various forms (e.g. data) may be made available over a network such as a virtual private network (VPN) or the internet. In another embodiment of the invention, the data store may be a hard drive or solid state drive, or other known storage technology. In yet another embodiment, the data store may have a physical interface whereby a user may collect the information and/or data, e.g. serial port, parallel port, ethernet port, usb port, or other known computer interface.

A skilled person would understand that the information may be in a raw or processed form, or that information in the form of data may be metadata, or other data generated by the system, apparatus or method that is related to the operation of the system, apparatus or method for measuring moving vehicle information, and not limited to vehicle information alone, including the interaction of the roadway with the vehicle.

In order to mitigate, at least in part, the problem(s) identified above, in accordance with an aspect, there is provided an apparatus including a sensor assembly. The sensor assembly includes a transmission-line assembly having an electrical transmission-line parameter configured to change, at least in part, in response to reception, at least in part, of a vehicular load of a moving vehicle moving relative to a vehicular roadway, and the transmission-line assembly is positionable, at least in part, relative to the vehicular roadway.

In order to mitigate, at least in part, the problem(s) identified above, in accordance with an aspect, there is provided a method including changing, at least in part, an electrical transmission-line parameter of a transmission-line assembly of a sensor assembly in response to reception, at least in part, of a vehicular load of a moving vehicle moving relative to a vehicular roadway, and the transmission-line assembly is positionable, at least in part, relative to the vehicular roadway.

In order to mitigate, at least in part, the problem(s) identified above, in accordance with an aspect, there is provided an apparatus including a sensor assembly. The sensor assembly includes a transmission-line assembly having an electrical transmission-line parameter configured to change, at least in part, in response to reception, at least in part, of a vehicular load of a moving vehicle moving relative to a vehicular roadway to the transmission-line assembly positionable, at least in part, relative to the vehicular roadway.

In order to mitigate, at least in part, the problem(s) identified above, in accordance with an aspect, there is provided a method including changing, at least in part, an electrical transmission-line parameter of a transmission-line assembly of a sensor assembly in response to reception, at least in part, of a vehicular load of a moving vehicle moving relative to a vehicular roadway to the transmission-line assembly positionable, at least in part, relative to the vehicular roadway.

In order to mitigate, at least in part, the problem(s) identified above, in accordance with an aspect, there is provided other aspects as identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 5a is a system block diagram of an example embodiment system for measuring vehicle information using a plurality of ETDR sensors, a vehicle presence sensor, and a temperature sensor;

FIGS. 6a-6c are respectively perspective view, top view, and, sectional view along the line A-A of an example embodiment of an ETDR sensor;

Figure 1A:
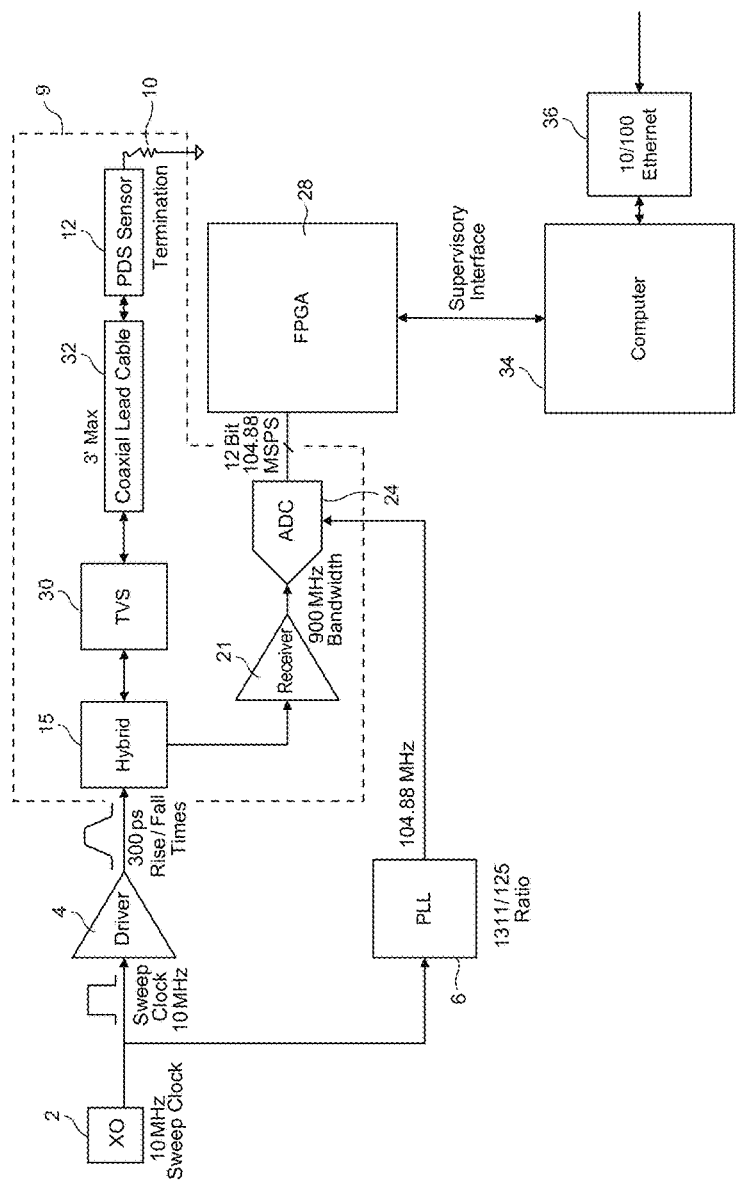
FIG. 1a is a system block diagram of an example embodiment system for measuring vehicle information.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating an understanding of the various presently disclosed embodiments. In addition, common, but well-understood, elements that are useful or necessary in commercially feasible embodiments are often not depicted in order to facilitate a less obstructed view of the various embodiments of the present disclosure.

LISTING OF REFERENCE NUMERALS USED
IN THE DRAWINGS 2 base crystal oscillator, or base xo, or crystal oscillator
4 driver, or high-bandwidth driver
6 phase-locked loop, or PLL
8 voltage controlled crystal oscillator, or VCXO
9 bandwidth sensitive area
10 terminator, end terminator, or termination
11 instantaneous load, or load
12 parametric disturbance sensor, PDS, PDS sensor, sensor, or sensor assembly, or sensor assembly
12a first PDS port, parametric disturbance sensor port, or sensor ports 12b second PDS port, parametric disturbance sensor port, or sensor ports
12c third PDS port, parametric disturbance sensor port, or sensor ports
14 source terminator
15 bridge, or hybrid circuit
16 source terminator reference
18 end terminator reference
20 differential amplifier
21 receiver, or receiver amplifier
22 amplifier
24 analog-to-digital converter, ADC, high-speed ADC, or higher resolution ADC
28 counting logic, field-programmable gate array, FPGA, high-speed logic, or logic
30 transient voltage suppression protection circuitry
30a TVS protection circuitry
30b TVS protection circuitry
30c TVS protection circuitry
32 coaxial lead cable, or lead cable
34 computer
36, Ethernet port
201 low-pass filter, LPF, passive analog integrating low-pass filter, or passive analog integrating LPF
203 gate/hold circuit
205 digital-to-analog converter, or DAC
301 comparator, CMP, or high-speed comparator
303 tracking low-pass filter, or tracking LPF
304 bias
305 SUM, or adder
501 wheel analog front end, or wheel AFE
503 wheel data converter
505 transceiver, or XCVR
507 serial port
509 SD card port
511 Ethernet port
513 power over Ethernet device, or POE device
515 loop port
517 loop analog front-end, loop AFE
519 temperature port
521 1-wire sensor bridge
523 real-time clock
551 radio-frequency (RF) switch, or the switch
553 reference terminator
590 output
592 output
594 input
601 sensor core
603 sensor carrier
605 sensor carrier exterior housing, or sensor carrier extrusion housing
607 support tubing
609 cap extrusion
610 adhesive
611 isolation foam
615 connector
617 termination block
701 concrete
705 grout
707 screws
709 closed cell foam, or foam
711 electromagnetic interference (EMI) gasket
712 x-axis
714 y-axis
716 z-axis
800 apparatus
802 transmission-line assembly
804 termination impedance
806 core assembly
808 shield assembly
810 carrier assembly
811 region
812 positioning assembly
813 region
816 gap
817 length
818 tubular assembly
819 channel
820 elastically-deformable portion
822 roadway anchor
824 wear-resistant assembly
825 core-anchor assembly
828 force-receiving portion
830 force-transfer portion
832 retainer assembly
834 surface
836 shield-engagement portion
838 carrier body
839 channel
840 contact portion
842 force-receiving section
844 body assembly
846 shield-engaging portion
848 shield-contact portion
850 shield-receiving zone
852 adhesive-backed closed-cell neoprene foam, or foam
854 sealer material
856 foam assembly
858 sealer
860 signal cable
862 sealant
864 fitting assembly
866 signal connector
868 sealing element
870 signal interface
872 first end cap
874 fastener
876 second end cap
878 fastener
880 terminator-connector assembly
882 termination block
884 roadway-mountable housing
885 remote housing
886 analog electronics module
888 digital electronics module
900 moving vehicle
902 vehicular load
904 direction
906 electrical time domain reflectometry signal processing system, or ETDR system
908 vehicular roadway
910 signal-wire assembly
912 sensor

DETAILED DESCRIPTION OF THE NON-LIMITING EMBODIMENT(S)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of the description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a". The aspects (examples, alterations, modifications, options, variations, embodiments and any equivalent thereof) are described with reference to the drawings. It should be understood that the invention is limited to the subject matter provided by the claims, and that the invention is not limited to the particular aspects depicted and described.

The various aspects and embodiments of the invention will now be described with reference to the figures.

Exemplary System and Operation

Referring now to FIG. 1a, there is shown an embodiment of the system and apparatus for measuring moving vehicle information. This embodiment may measure information about the moving vehicle such as the number of wheels per axle, wheel pressure and wheel-road contact dimensions including wheel width, wheel location on the sensor and the length of time the wheel exerts force on the sensor. From the vehicle information obtained, axle width, inter-axle spacing and, lane position may be determined. Vehicle speed, vehicle length, and vehicle count may be measured using this embodiment in conjunction with additional sensors.

Figure 1B:
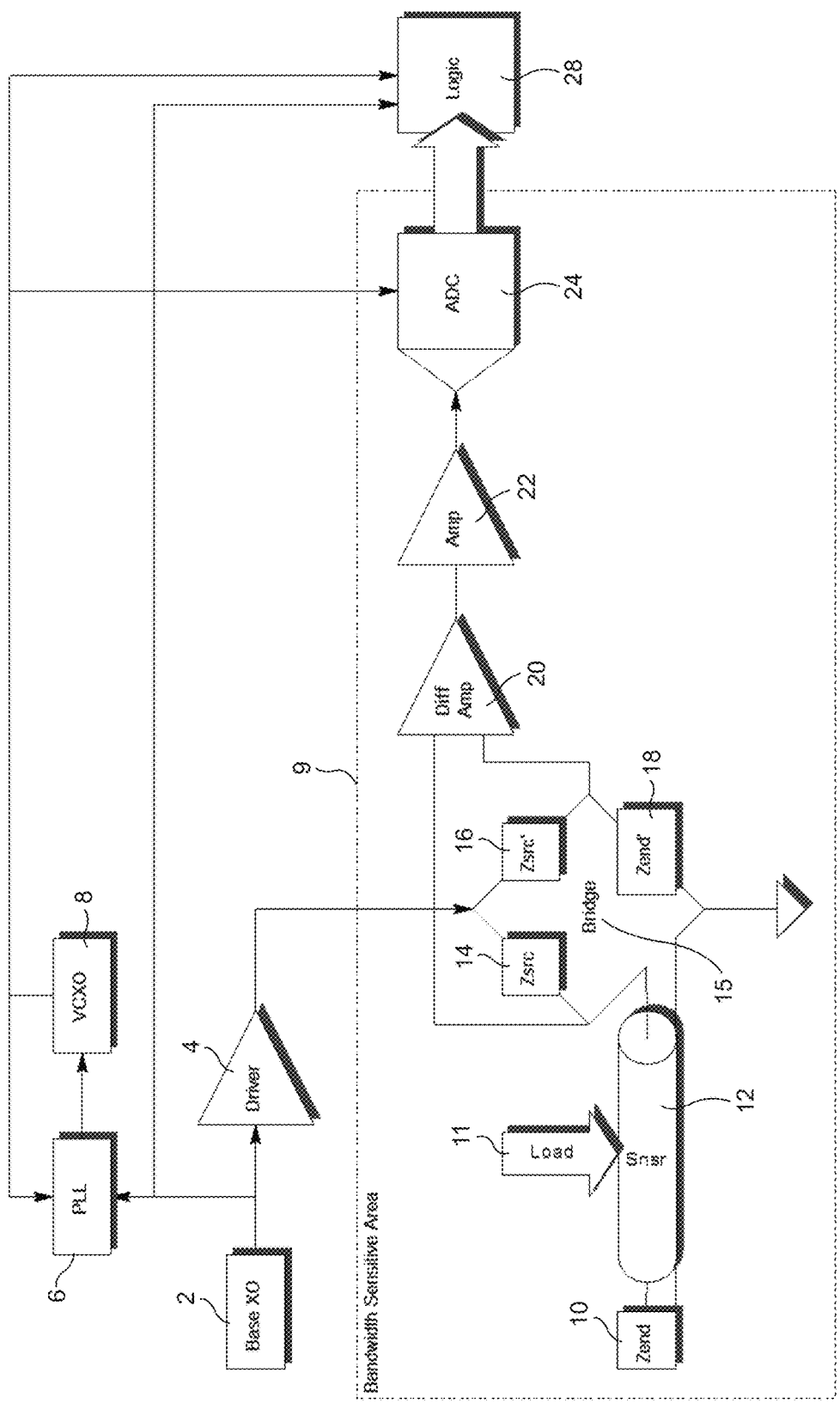
FIG. 1b is a system block diagram of an example embodiment system for measuring vehicle information.

In the operation of this embodiment of the system and apparatus as shown in FIG. 1a, the crystal oscillator 2 generates a sweep clock signal, such as 10 MHz (Megahertz) reference clock signal, which is buffered by a high-bandwidth driver 4. The crystal oscillator 2 is also called a base XO 2. The signal is driven through a hybrid circuit 15 to the transmission line, which may consist of a coaxial lead cable 32, a printed circuit board (PCB) trace (not shown), and a parametric disturbance sensor 12. The parametric disturbance sensor 12 is also called the PDS 12 or the sensor 12. The components of the system in the bandwidth sensitive area 9 must be able to pass high frequencies in order to reproduce the spatial features of the load 11 (the load 11 is depicted in FIG. 1b).

Parametric Disturbance Sensor (PDS)

A skilled person would understand that the parametric disturbance sensor 12 (PDS stands for parametric disturbance sensor) is the portion of the transmission line that is, in an embodiment, located transversely, embedded within, and flush with the surface of the roadway. The skilled person would also appreciate that the signal would travel along the entire transmission line, and that the entire transmission line may be considered as the entire sensor in other embodiments. A description of an exemplary PDS construction for use with the system and apparatus of the invention is provided under the section entitled, "Sensor" of the detailed description.

The PDS 12 is constructed so as to be capable of changing impedance in a predictable manner. In an embodiment of the invention, the PDS 12 is configured to produce detectable changes in impedance for vehicles with tire pressures ranging from 10 pounds per square inch (PSI) to 150 PSI. In another embodiment, the PDS 12 is configured to allow for a detectable transverse spatial resolution of 1.5 inches, which is obtained in cooperation with the capabilities of the electronics interface. The PDS 12 is attached to an appropriate terminator 10 for minimizing reflections, which is a termination resistor that closely matches the characteristic impedance of the PDS 12, e.g. a 1% 50 ohm resistor.

Electrical Time Domain Reflectrometry Signal Processing System

Any impedance mismatches along the transmission line such as those produced by a wheel load results in reflections that travel back towards the source of the signal in the transmission line. The hybrid circuit 15 directs these reflections to a receiver 21, where they are amplified, and then digitized by an analog-to-digital converter 24. The analog-to-digital converter 24 may be called the ADC 24. The receiver 21 may be called a receiver amplifier. The converted and sampled data is processed by a field-programmable gate array 28. The field programmable gate array 28 may be called the FPGA 28. Then, the data as processed by the FPGA 28 is further processed by the computer 34 to obtain the desired information about the vehicle. The computer 34 is connected to an Ethernet port 36.

The sweep clock period is chosen so that the half period is larger than the round-trip time of the wave traversing the PDS 12. The following equation calculates the maximum sweep clock frequency at which the device and system can operate:

$$\text{Frequency\_max} = 1/\text{Time\_min};$$

In one embodiment of the system and apparatus of the invention, the total transmission line delay may comprise the PDS 12 delay, the lead cable 32 delay, and the PCB trace delay. Therefore $T\_min = 4 \times (D\_PDS + D\_lead + D\_trace)$. In another embodiment, T_min may be as small as just $4 \times (D\_PDS)$, independent of lead cable and trace length. Then, multiple edges would exist within the entire transmission line at any instance in time, however, no more than one edge would be within the PDS 12 itself. The signal witnessed at the receiver 21 would consist of the superposition of multiple reflections, but reflections from the lead cable and PCB trace are constant and may be baseline subtracted leaving only the reflection from the PDS 12. Therefore, Time_min=4 (Delay_PDS).

In yet another embodiment of the invention, the crystal oscillator 2 generates a 10 megahertz (MHz) reference clock signal. The driver 4 is used to buffer the clock signal, and to produce a high edge-rate signal, e.g. a low-voltage positive emitter-coupled logic (LVPECL) with 300 picosecond rise/fall times. This high-edge rate signal is driven into the hybrid circuit 15 and the transmission line.

The hybrid circuit 15 is used to couple the transmitted and received signals to and from the transmission line. The sweep clock signal travels from the driver 4 to the termination 10 at the end of the sensor 12, and the reflected signals travel from the source of the impedance mismatch in the transmission line, preferably in the sensor 12, to the receiver 21. The hybrid circuit 15 allows the receiver 21 to see the reflected signals without seeing the transmitted signal. The basic function of the hybrid circuit 15 is that it subtracts the transmit signal from the composite signal containing both the transmitted and received signals, yielding only the received signal. Additionally, the received signal is amplified, in an embodiment, by a gain of 10.

In an embodiment of the invention, a transient voltage suppression protection circuitry 30 may be used to protect the apparatus or system hardware from electrostatic discharge (ESD) or lightning-induced surges. When the protection circuitry has sufficiently low capacitance it does not appreciably affect the bandwidth of the apparatus or system. Transient voltage suppression may be referred to as TVS.

The lead cable 32 is for connecting the hybrid circuit to the PDS 12. In an embodiment, the lead cable 32 is under three (3) feet long with a characteristic impedance of 50 ohms, but a skilled person would understand that choosing a different lead cable length or characteristic impedance is possible.

The function of the receiver amplifier 21 is to amplify the received signal from the hybrid circuit 15 and to drive the amplified differential signal into the analog-to-digital converter 24 (ADC). Preferably, the bandwidth of the output of the receiver 21 is 900 MHz. In an embodiment, a fully differential amplifier with an amplification factor of 4 may be used. A skilled person would understand that different amplifier designs may be used.

The ADC 24 is for digitizing the signal from the receiver amplifier 21. Also, the ADC 24 receives a sampling clock signal from a phase-locked loop 6. The phase-locked loop 6 is also called the PLL 6. The digital output, representing the sampled version of the signal from the receiver 21, of the ADC 24, is connected to a field-programmable gate array 28. The field-programmable gate array 28 is also called the FPGA 28. In an embodiment, the ADC 24 has 12 bits of resolution with 104.88 mega samples per second (MSPS). It will be appreciated that skilled persons would understand that different ADC resolutions with different sampling rates may be used (if so desired). The phase-locked loop 6 is for generating a sampling clock that allows the use of an equivalent time sampling technique. Equivalent time sampling is a known technique that allows for an effective sampling rate much higher than the actual sampling rate.

In an embodiment, the PLL 6 is used to lock the 104.88 MHz sampling clock to the 10 MHz sweep clock. This ratio is 1311/125, and is chosen so that the ADC samples the reflected signal at 1311 evenly spaced positions after 125 cycles of the sweep clock. Therefore, in this embodiment, with these parameters, a skilled person would understand that a practical sensor length of 13 feet with the lead cable length being 3 feet of RG-58 (a type of coaxial cable) is appropriate. A skilled person would also understand that different sensors lengths or lead cable lengths may be used under different sampling conditions.

Data Processing System

The FPGA 28 is for receiving and processing the ETDR data from the ADC 24, and sending it to the computer 34 (via a supervisory interface). The computer 34 cooperates with the FPGA 28 to process the digitized and FPGA processed signal data. In an embodiment, the computer 34 aggregates individual wheel load events received from the FPGA 28 into vehicle records containing numerous pieces of vehicle profile information. In an embodiment, the computer 34 is a computer on a module. A skilled person would understand that there are other equivalent computing or embedded computing solutions that may be used instead. In an embodiment, these processing steps may include, ADC sample receiving, sample reordering, sweep averaging, sweep zone integration, and positional monitoring.

In an embodiment, a zone refers to a range of samples associated with positions located transversely along the length of the PDS 12 that is experiencing a load, or disturbance, from a wheel or wheels. For example, a car crossing the PDS 12 would create two (2) zones per axle, i.e. one zone for the left tire and one zone for the right tire for each axle. Each zone is a number of sample positions wide centered on the wheel. Those sample positions values are then integrated over the wheel-sensor contact duration producing a raw tire weight. Then, once the speed of the vehicle is known, the absolute weight or average pressure can be calculated from the raw weight and the speed of the vehicle.

In an embodiment, digital samples are clocked into the FPGA 28 at 104.88 mega samples per second (MSPS), corresponding to the ADC 24 sample rate. Due to the equivalent time sampling technique used to collect the 1311 evenly spaced reflections, the samples will arrive at the FPGA 28 out of sequence. To reorder the samples, they are placed into the internal memory locations of the FPGA 28 using an address pointer that increments by 125 modulo 1311. A full set of 1311 consecutive samples constitutes a sweep. An external presence detection device or vehicle presence sensor, e.g. an inductive loop sensor, light curtain, microwave sensor or acoustic sensors, is used to ensure wheels are absent from the PDS 12. When wheels are absent, one or more sweeps may be averaged to assemble a baseline sweep or control sweep. The baseline sweep is regenerated frequently to ensure it accurately represents the current properties of the undisturbed or unloaded instance of the PDS 12. Incoming sweeps are then compared against the baseline sweep and any significant difference detected forms the basis of a disturbance. A disturbance zone is limited in width to either a single or multi-wheel array on a given side of a vehicle's axle. A zone thus contains only a subset of consecutive samples within a sweep, but may resize dynamically to accommodate variations in the disturbance width. Each zone is integrated over the width and duration of the disturbance. Once the disturbance exits the PDS 12, parameters such as start time, location, width, duration, and raw weight are stored to memory and an interrupt flag is set to signal the computer 34 that a new wheel event has occurred. Once the interrupt is detected by the computer 34, it may retrieve the wheel event data from the memory of the FPGA 28 at a rate determined by the clock of the computer 34.

System Configurations for Measuring Vehicle Parameters

Measuring Wheel Pressure and Wheel-Road (Sensor) Dimensions

Referring now to FIG. 1b, there is shown another embodiment of the system and device for measuring moving vehicle information. This embodiment may measure information about the moving vehicle such as number of wheels per axle, wheel pressure and wheel-road contact dimensions including wheel width, wheel location on the sensor and the length of time the wheel exerts force on the sensor. From the vehicle information obtained, axle width, inter-axle spacing and, lane position may also be determined.

In this embodiment, the base crystal oscillator 2 cooperates with a driver 4 to generate a step input incident signal at the rate of the base crystal oscillator 2. The incident signal is driven into a sensor 12 through the hybrid circuit 15; the hybrid circuit 15 may be called a bridge 15. A load 11 may be applied to the sensor 12, and the load 11 will generate a reflected signal along the sensor 12 that will be sensed on the bridge 15. The differential reflected signal is transformed to a single-ended reflected signal by a differential amplifier 20 and is then amplified by an amplifier 22. A skilled person would understand that a transformer may also be used instead of a differential amplifier 20. An ADC 24 converts the analog reflected signal into digital reflected signal sample data that is fed into the FPGA 28. The FPGA 28 may also be called a logic 28. The logic 28 reassembles the reflected signal from the digital reflected signal sample data, and performs calculations to calculate the magnitude of the load 11 or the location of the load 11 on the sensor 12 or both. Additionally, other vehicle information may be obtained by the logic 28.

As the load 11 contacts and traverses the sensor 12, the sensor 12 continuously reacts to the instantaneous load 11. The load 11 creates a change in the geometry of the sensor 12 and a corresponding measurable change in the characteristic impedance, which generates the reflected signal when the incident signal meets the discontinuity.

The sensor 12 is a transmission line that is terminated at both ends. A source terminator 14 (Zsrc) provides a voltage measurement point between the source terminator 14 and the sensor 12. An end terminator 10 (Zend) improves the signal-to-noise ratio by reducing extraneous end reflections of the incident signal that can pollute the reflected signal. Additionally, the resistance and capacitance of the sensor 12 interact to produce a length dependent low pass filter that increases the rise and fall times of the reflected signal.

The relationship between the load 11 and the reflection coefficient of the sensor is preferably linear. This means that the changes in the reflection coefficient or voltage deviations from nominal are a linear representation of the load 11 at the location where the load 11 is applied to the sensor 12.

A skilled person will understand that the design and selection of the sensor 12 is varied, and will depend on the vehicle information to be measured by the system, device, or method. This includes making specific design decisions and trade-offs regarding cost, complexity, performance, and durability.

In an embodiment, the sensor 12 is embedded in the surface of a roadway transverse to a moving vehicle's direction of travel. A flat top portion of the sensor 12 could be raised slightly above the surface of the roadway to assure compression when the load 11 is present. Compression of the sensor 12 due to the load 11 will create changes in its geometry causing changes in the impedance that will generate the reflected signal in response to the step input incident wave.

For weigh-in-motion and vehicle detection, an embodiment of the PDS 12 is described below. In another embodiment, the sensor 12 may be a compressible coaxial cable encapsulated in a jacket with a rectangular cross section. In another embodiment, for vehicle detection, the sensor 12 may be two parallel conductors that form a twin-lead transmission line, where the proximity of the vehicle causes changes in the dielectric constant that may be measured as a change in the characteristic impedance using ETDR techniques.

The components of the system in the bandwidth sensitive area 9 must be able to pass high frequencies in order to reproduce the spatial features of the load 11. By defining the required resolution between spatial features, the step input incident signal rise time and bandwidth may be calculated:

time_rise=Length (transmission line feature spacing)/ 2*Velocity_propagation (propagation velocity of the medium)

BandWidth=0.35 (single-pole constant of proportionality)/time_rise (10%-90% rise time)

The base crystal oscillator 2 generates the incident signal that is rising and falling with a fixed half-period that is longer than the round-trip time for the length of the sensor 12. The rise and fall times of the incident signal are calculated as above and are sufficiently fast to reveal the spatial resolution of the load 11 along the sensor 12. The longer the rise and fall times, the lower the incident signal's bandwidth, resulting in less resolution available from the reflected signal. Additionally, the base crystal oscillator 2 must have sufficiently low jitter and the signal chain bandwidth must be sufficiently high in order to maintain the spatial resolution of the spatial features of the load 11.

The driver 4 continuously drives the rising and falling incident signal from the base crystal oscillator 2 into the sensor 12 through the bridge 15. The 10%-90% rise and fall times of the driver 4 may be characterized based on the spatial feature resolution size. In an embodiment, to drive the incident signal with a feature spacing of six (6) inches, the driver 4 should have corresponding 10%-90% rise and fall times of approximately 313 picoseconds:

10%-90% rise/fall time=0.1524 m (or 6 in)/[2*c (speed of light)*0.81 (propagation velocity constant)]

10%-90% rise/fall time=313 picoseconds

Next, the bridge 15 is used to difference the reflected signal from the sensor 12, from that of a pair of fixed reference terminators consisting of a source terminator reference 16 (Zsrc') and an end terminator reference 18 (Zend'). The fixed reference terminators have nominally the same impedances as the sensor 12, the source terminator 14, and the end terminator 10. The bridge 15 highlights the deviations in the reflected signal from nominal values, resulting in a lower voltage dynamic range requirement of the ETDR signal processing means in the bandwidth sensitive area 9.

In an embodiment of the invention, the bridge 15 presents a common-mode voltage to the input of the differential amplifier 20. In another embodiment, the bridge 15 presents a common-mode voltage to the input of the transformer (not shown) of half of the output voltage of the driver 4 during the positive half-cycle of the incident signal, and zero elsewhere. The differential amplifier or transformer converts its input from a differential signal to a single-ended signal by removing the common-mode signal and this further reduces the required voltage dynamic range of the ETDR signal processing means in the bandwidth sensitive area 9. A skilled person would understand that other methods of eliminating the input signal from a reflected signal could be used without departing from the scope of the present disclosure. The skilled person would understand that the signal observed at the inputs of the differential amplifier 20 consists of a) common-mode signal from the driver 4, and b) differential-mode reflections from the sensor 12. The skilled person would also understand that it is ideal that the contribution of the driver 4 to the signal is common-mode, however, practically there may be slight imbalances in the bridge Zsrc and Zend values that will introduce an additional differential-mode portion to the signal at the inputs of the differential amplifier 20. This imbalance is generally constant however and may be filtered by the logic or the FPGA 28.

Then, the output of the differential amplifier 20 is fed into an amplifier 22 and amplified to meet the input range appropriate for the ADC 24. The ADC 24 converts the analog reflected signal into a digital version of the reflected signal at a sampling rate generated by a voltage controlled crystal oscillator 8. The voltage controlled crystal oscillator 8 is also called the VCXO 8. The ADC 24 must support the sampling rate generated by the voltage controlled crystal oscillator 8 with an adequate bit resolution to reconstruct the load 11 with sufficient fidelity.

A voltage controlled crystal oscillator 8 cooperates with an anti jitter circuit, such as a phase-locked loop 6, to provide a sampling clock for the ADC 24 with sufficiently low jitter, which is required to maintain the spatial resolution of the sensed spatial features of the load 11.

The digital reflected signal samples are reassembled by the logic 28 and interleaved by using digital sampling oscilloscope techniques. In an embodiment, equivalent time sampling is used. Due to speed limitations of the ADC 24 and the logic 28, sampling oscilloscope techniques are employed to capture the high frequency reflected signals that are experienced when capturing the required spatial feature resolution. For example, in an embodiment, the spatial feature resolution of 3 inches generates high frequency reflected signals that are experienced when differentiating the load 11 caused by a single wheel versus a dual wheel pair.

Additionally, the logic 28 can average many complete sweeps of the sensor in order to reduce the sensor measurement noise, and the reflected signal caused by the load 11 is differenced from a base-line signal from which the load 11 is known not to be present.

In an embodiment, when weighing a vehicle, for a load 11 caused by a wheel, the apparatus or system of the invention provides the force profile presented by the wheel-width over the time presented by the wheel length. The forces from these orthogonal axes are integrated by the logic 28 to yield the total wheel raw-weight presented. Then, the raw-weight is multiplied by the wheel speed in the direction of travel to compensate for vehicles travelling at varying speeds to yield the actual wheel weight.

Figure 3:
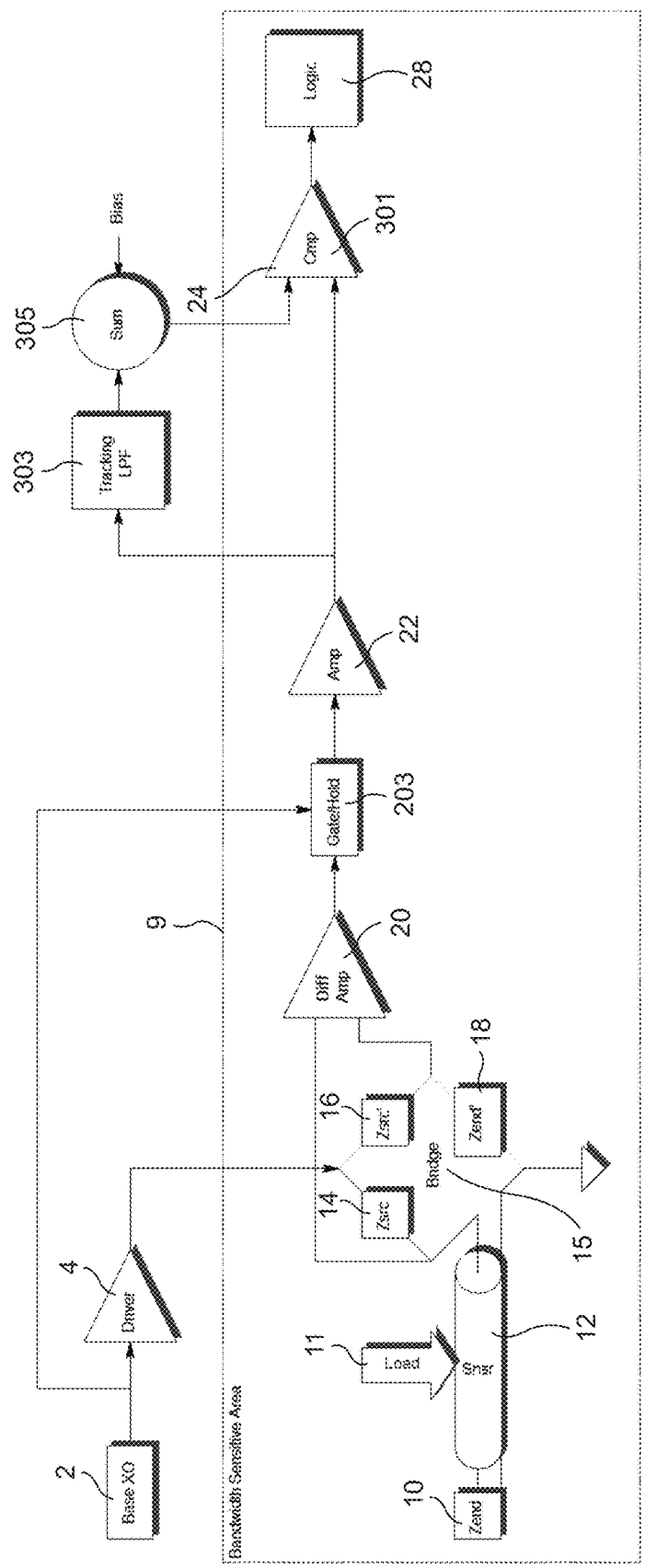
FIG. 3 is a system block diagram of an example embodiment system for determining wheel count.
Figure 4:
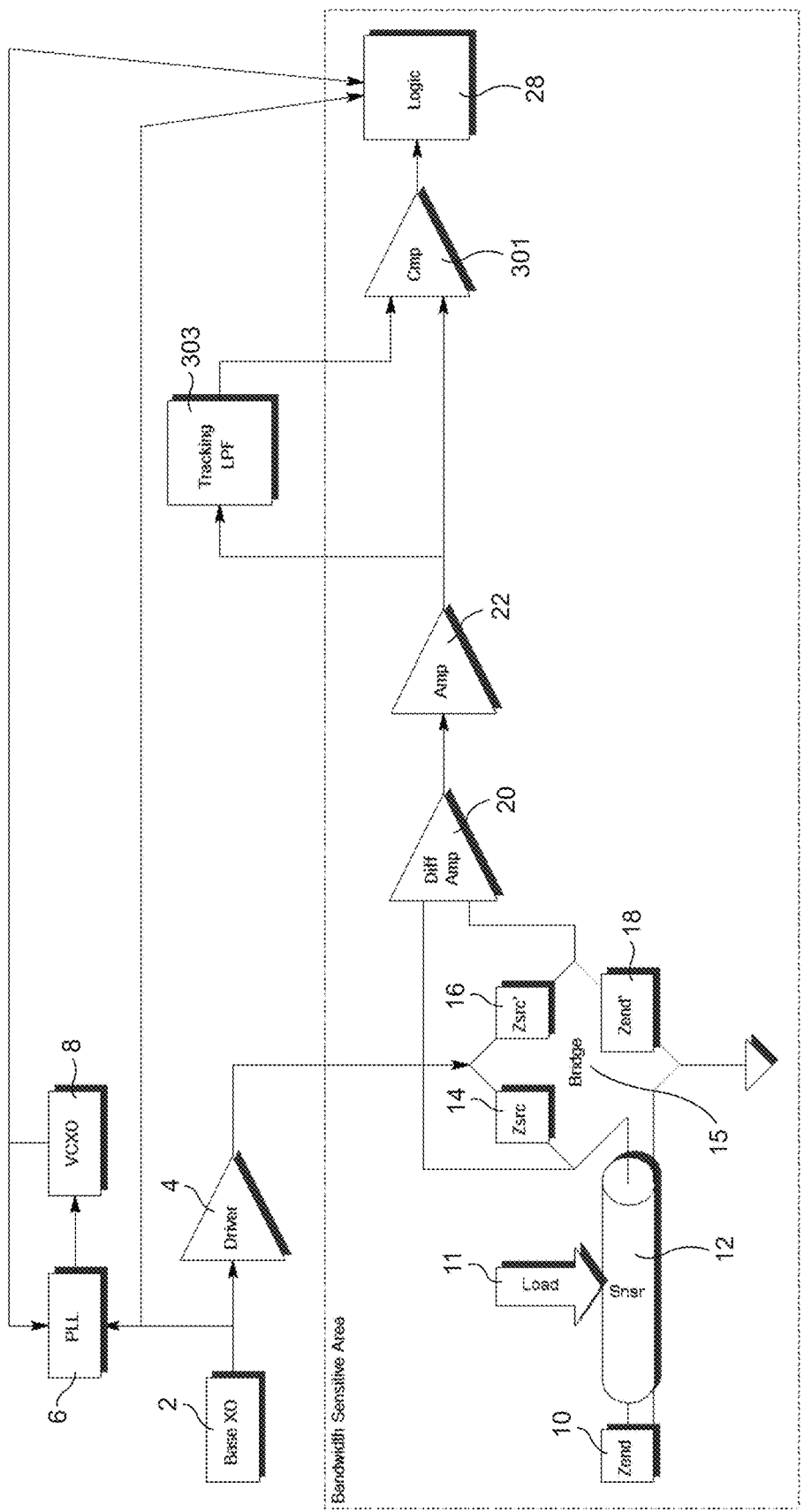
FIG. 4 is a system block diagram of an example embodiment system for determining the spatial profile of a vehicle.

In other embodiments of the invention, only a subset of vehicle data may be desired due to commercial reasons such as cost constraints or product differentiation. In these cases, the embodiments shown in FIGS. 1*a* and 1*b* may be modified so that only the desired vehicle information is obtained or measured. These modifications may, in some embodiments, simplify the implementation of the system. Examples of these aspects and embodiments are shown in FIGS. 2 to 4.

Furthermore, other exemplary embodiments of the apparatus and system as shown in FIGS. 1 to 4 may be used in combination with other non-ETDR sensors to collect road and vehicle information or data. For example, these sensors may be loop presence detectors, temperature sensors, speed sensors, strain gauge or piezoelectric strain sensors, or other sensors known in the art.

Detecting Weight and Axles of Vehicle

Figure 2:
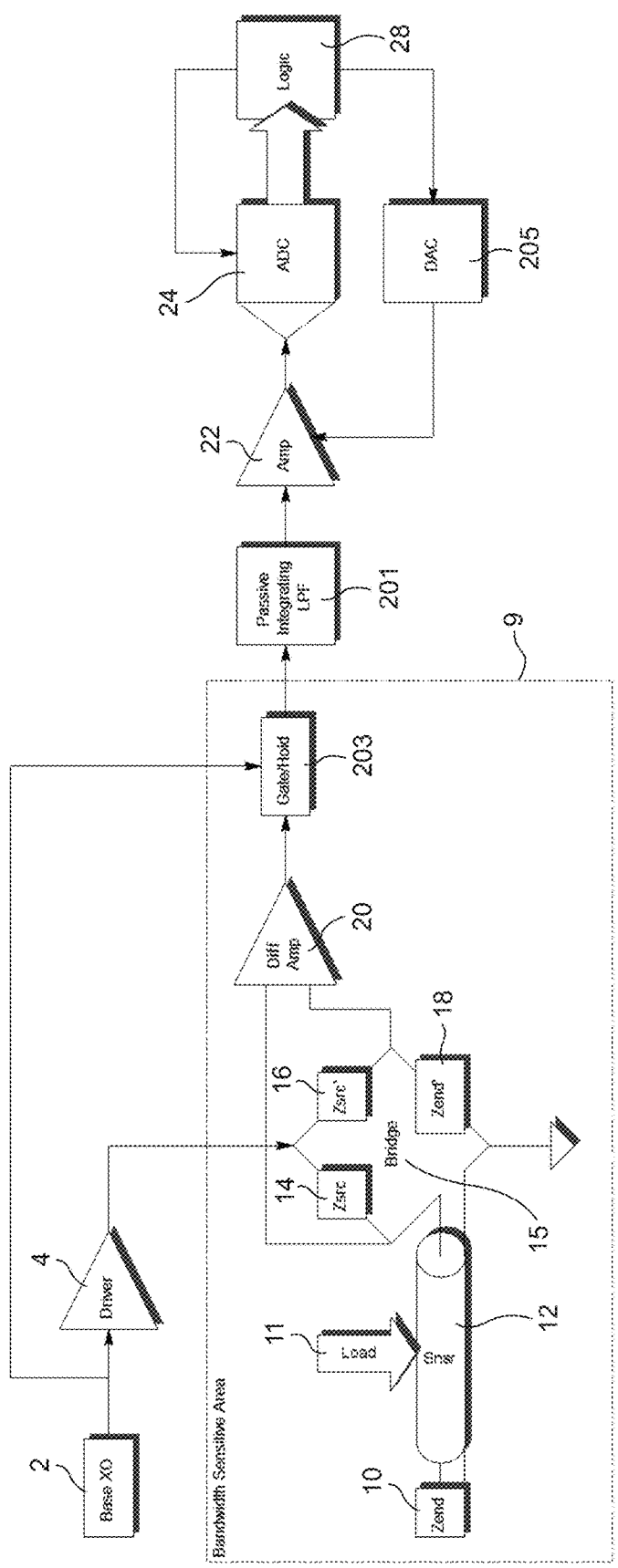
FIG. 2 is a system block diagram of an example embodiment system for determining axle and weight.

Referring now to FIG. 2, there is shown an embodiment of the invention directed towards determining the weight and detecting the axles of a vehicle. If only axle detection and weight information are of interest, system bandwidth can be reduced. This aspect reduces the cost of the device and system. This aspect also does not provide any spatial information along the length of the sensor, or transverse to the roadway, e.g. wheel width, wheel separation. It is still possible to determine spatial information that is longitudinal along the roadway, such as axle separation or inter-axle spacing. Also, in this aspect, there is only a single calibration point for the entire sensor.

In the embodiment shown in FIG. 2, higher edge-rate and bandwidth are required to determine spatial information, in contrast to determining aggregate weight. As the driver edge-rate and bandwidth are reduced, the spatial signature is smeared. This makes it harder to determine spatial information. Note that as bandwidth is reduced, the smearing effect spreads the amplitude over a larger time (space), so that a higher resolution ADC 24 and lower noise floor may be required. Also, the ADC 24 will have a significantly reduced bandwidth and sampling rate requirements.

In the embodiment of FIG. 2, a passive analog integrating low-pass filter 201 is used to integrate all the weight information over the sensor and lead cable, followed by sampling the signal by the ADC 24 at the desired measurement interval. It is understood that LPF stands for low-pass filter. In an embodiment, the interval may be 250 microseconds. This measurement interval can be completely decoupled from the base XO 2. The wheel weight signals are differenced from a base-line signal from which tires are known not to be present.

The driver 4 edge-rate may be reduced to the point where the rise and fall times approach the half period of the base XO 2. This approach increases the complexity of the driver 4 circuitry, but may have the benefit of reducing the required complexity of the components in the bandwidth sensitive area 9.

The reflections seen from the positive and negative half-cycles at the rate of the base XO 2 have opposite polarities, and so will cancel through a low-pass filter 201. The low-pass filter 201 is also called the LPF 201. To account for this, a gate or a gate/hold circuit 203 can be used to integrate only the reflections from the positive or negative half-cycles.

In another embodiment, the wheel-profile integration is performed by a passive analog integrating LPF 201. The passive aspect of this filter integrates while eliminating the otherwise high bandwidth requirements of the amplifier 22. The filter should pass the wheel presence information with a similar timing requirement to that of a piezoelectric sensor interface while suppressing higher frequencies such as those of the base XO 2. A skilled person would know that the LPF of an piezoelectric sensor interface may have a corner frequency of 2 kilohertz.

As shown in FIG. 2, a digital-to-analog converter 205 will be used to provide a reference to the amplifier 22 on which the amplified signal will ride. The digital-to-analog converter 205 is also called the DAC 205. The logic 28 will control the output value of the DAC 205 slowly to remove the aggregate baseline that is tracked over time. Also, in an embodiment of this aspect, the data rate for the logic 28 will be significantly reduced.

The bandwidth requirements for the amplifier 22 are reduced to only that of the wheel presence information as discussed above regarding the LPF 201. Since the wheel width is small relative to the sensor and lead length, deviations from baseline may be small so that a large gain may be required.

Wheel Count Per Axle without Spatial Profiling

Referring now to FIG. 3, there is shown an embodiment of the invention directed towards determining a wheel count per axle of a vehicle without spatial profiling. In this embodiment, the high bandwidth or spatial-resolution signal is split into two paths. The direct signal and a biased LPF signal are compared at the comparator 301 (the comparator may be referred to as CMP 301), and the high-speed logic 28 counts the rising or falling edges to determine the number of tires seen during a cycle of the base XO 2. This aspect provides a count of tires on the sensor but does not discriminate as to their positions along the sensor, i.e. no spatial profiling.

A tracking low-pass filter 303 (LPF) is used to smooth the signal as an estimation of the instantaneous baseline. Then, a bias 304 is added to the baseline signal by the SUM 305 to result in a threshold signal, which when over the threshold signal will cause the comparator 301 to trip. The threshold signal comprises the biased LPF signal.

The direct signal and threshold signal outputs are compared at the comparator 301 so that the output of the comparator 301 activates while the direct signal exceeds the threshold signal. The rising or falling edge of the output of the comparator 301 will clock a counter in the logic 28. The comparator 301 is a high-speed comparator since it is in the bandwidth sensitive area 9.

The counting logic 28 is reset to zero at the start of each measurement period. The difference between the edge-count for the measurement period and a stored count for a period where axles are known to not be present, i.e. the baseline, indicates the number of tires seen.

Spatial Profile of the Wheels on the Sensor

Referring now to FIG. 4, there is shown an embodiment of the invention directed towards determining a spatial profile of the wheels of the vehicle on the sensor. This embodiment maps the wheel contact spatial profile using the equivalent time sampling or VCXO/PLL technique as described in FIG. 1b and a comparator technique similar to that of the wheel-count solution shown in FIG. 3. In this embodiment, the high-speed ADC 24 shown in FIGS. 1a and 1b is eliminated. The direct signal from the amplifier 22 and the signal from the tracking LPF 303 are compared so that the high-speed comparator 301 output activates while the direct signal exceeds the threshold signal. The comparator 301 output, which is binary, is sampled or latched once per cycle of the VCXO 8 to build a complete profile over multiple cycles of the base XO 2. Each point within the profile is summed with its counterpart from subsequent profiles to build a non-binary profile.

In this embodiment, the gate/hold and sum sections of the circuit have been removed. The sensor 12 may be calibrated at every spatial location measured along the sensor 12.

This aspect may be combined with the axle detection and weighing aspect shown in FIG. 2 to allow for individual calibration parameters at each spatial location potentially providing higher fidelity weighing capabilities. But, this combined approach may not have the fidelity as the embodiments of the aspect that is shown in FIG. 1a or 1b, since the weight is aggregated before individual calibration parameters can be applied. However, this combined approach, does provide an opportunity to construct and apply a single calibration parameter that is tailored to the positions and widths of the wheel loads. This combined approach may require making assumptions about the distribution of the load.

In the embodiment shown in FIG. 4, each spatial location has a corresponding up/down counter within the logic 28. Each counter is reset to zero at the start of the measurement period. The active edge of the VCXO 8 clocks one counter either up or down according to the state of the output of the CMP 301. Over multiple measurement periods, points that follow the output of the tracking LPF 303, i.e. no wheel-load, will have a count of roughly zero; while those that deviate, i.e. wheel-loads present, will have a higher value. Instead of simply counting the transitions, this embodiment maps the wheel-sensor contact spatial profile using the VCXO/PLL technique of the embodiment shown in FIG. 1b, and the comparator technique similar to that of the embodiment described in FIG. 3. The output of the comparator 301 is sampled once per cycle of the VCXO 8 to build a complete spatial profile of the sensor over multiple cycles of the base XO 2; this is an implementation of equivalent time sampling. Each point within the profile is summed with its counterpart from subsequent profiles to build a non-binary profile. Points that follow the tracking LPF 303 output, i.e. no wheel-load, will have a sum of roughly zero, while those that deviate, i.e. wheel-loads present, will have a larger value. A digital threshold may be set within the logic 28 to separate loaded from unloaded profile points.

Multiple-Sensor Embodiments of the System and Method

Referring now to FIG. 5a, in an embodiment, there is shown a first PDS port 12a, a second PDS port 12b, and a third PDS port 12c. It is understood that the PDS port 12a is also called the parametric disturbance sensor port 12a. The PDS port 12a, PDS port 12b, and PDS port 12c, are connected to a Wheel Analog Front End 501 via corresponding sensor buses. The Wheel Analog Front End 501 is also called the Wheel AFE 501. The Wheel AFE 501 is connected to the Wheel Data Converter 503 via the receiver bus, and the Wheel AFE 501 is also connected to the FPGA 28 via the sensor selector bus. The Wheel Data Converter 503 is connected to the FPGA 28 via the sample bus, and is connected to the computer 34 via the PLL control bus. A skilled person would understand that various numbers of PDS sensors or PDS sensor ports may be used. The FPGA 28 is connected to the computer via a data bus.

The Loop Port 515 or a loop presence detector port is connected to the Loop Analog Front-End (AFE) 517 via a loop bus. The Loop Analog Front-End 517 is also called the Loop AFE 517. The Loop AFE 517 is connected to the FPGA 28 via the oscillator bus and the computer 34 via the channel selection bus.

The temperature port 519 is connected to the 1-Wire sensor bridge 521 (via a 1-Wire bus), which is connected to the computer 34 via the I2C bus.

The FPGA 28 is connected to the computer 34 via the Data Bus, and the real-time clock 523 via the serial peripheral interface (SPI) bus.

The computer 34 is connected to a transceiver over a serial bus, such as an RS-232 or an RS-422 transceiver 505. The transceiver 505 is also called the XCVR 505. The Serial Port 507 is connected to the XCVR 505 via a serial bus (such as, a RS-232 or RS-422 bus). The computer 34 is also connected to the Secure Digital (SD) Card Port via the SD Bus. The computer 34 is also connected to the Ethernet Port 511 and a Power Over Ethernet device 513 via the Ethernet PMD Bus. POE stands for Power Over Ethernet.

The Wheel AFE 501, the Loop AFE 517, and the POE 513 are analog or mixed signal blocks (modules). The FPGA 28, the Computer 34, the Wheel Data Converter 503, the XCVR 505, the Real-Time Clock 523, and the 1-Wire Sensor Bridge 521 are digital blocks (modules). The Sensor Ports 12a, 12b, and 12c, the Serial Port 507, the SD Card Port 509 (a memory card port), the Loop Port 515, the Temperature Port 519, and the Ethernet Port 511 are connectors.

In an embodiment, the Wheel AFE 501 actively pings each instance of the PDS 12 attached via the sensor ports 12a, 12b, and 12c in succession by the FPGA 28, which provides a sweep clock and processes the received reflected signal.

Figure 5B:
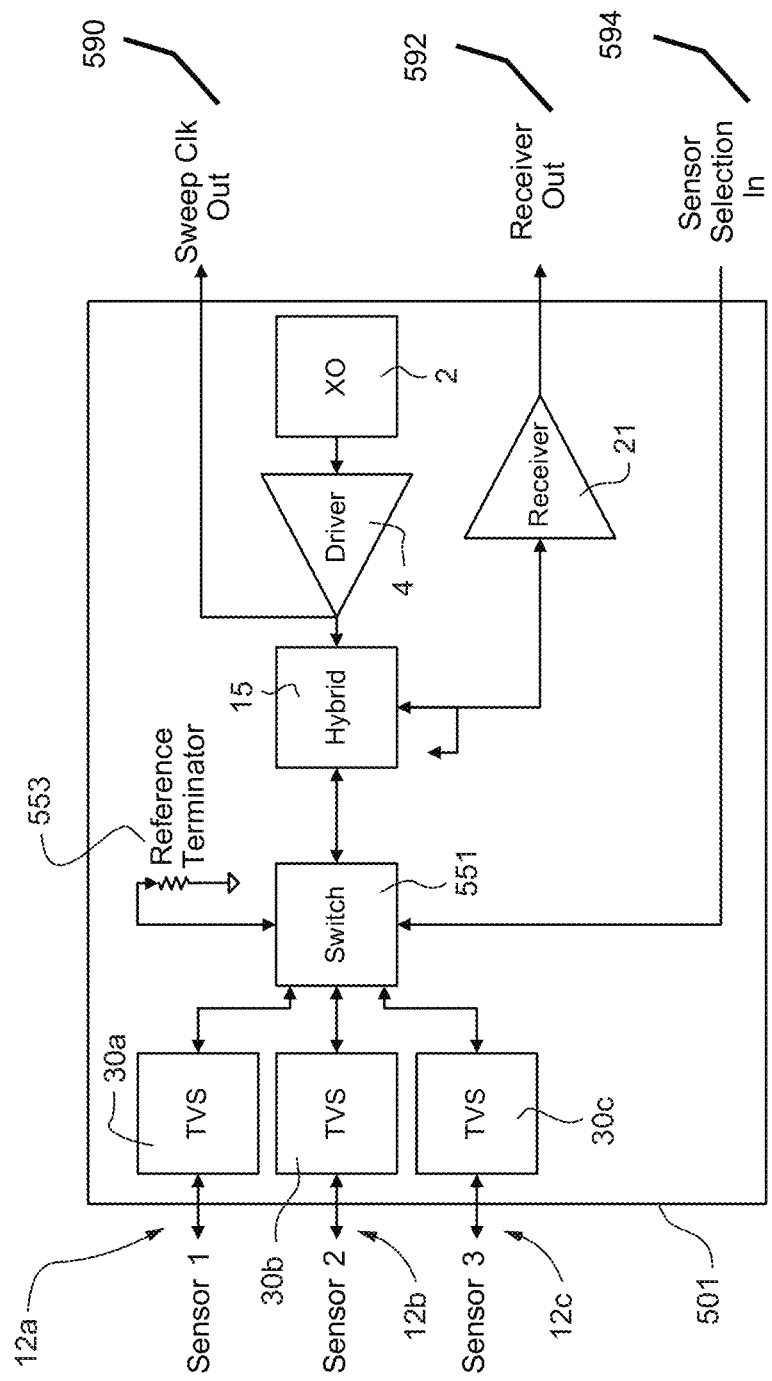
FIG. 5b is a block diagram of an example embodiment of a wheel analog front-end.

Referring to FIG. 5b, in an embodiment of the Wheel AFE 501, three instances of the PDS sensors 12 may be connected via Sensor Ports 12a, 12b and 12c to respective instances of the TVS protection circuitry 30a, 30b, and 30c. The three instances of the PDS sensors 12 or Sensor Ports 12a, 12b, and 12c may be supported by adding a radio-frequency (RF) switch 551. The switch 551 allows for time-division multiplexing between the three instances of the sensor 12 and the reference terminator 553. The switch 551 is also connected to the hybrid circuit 15, and a sensor selection input from the sensor selection bus from the FPGA 28. The reference terminator 553 may be used as a referenced to track variation due to pulse amplitude, supply voltage, or ageing, among other parameters. As depicted, there is provided an output 590 for the sweep clock output (from the driver 4), an output 592 for the receiver output (from the receiver 21), and an input 594 for the sensor selection input signal (for the input of the switch 551).

In another embodiment, the Wheel AFE 501 for interfacing with the 3 sensors or Sensor Ports 12a, 12b, and 12c may be the same as the single sensor implementations shown in FIGS. 1a and 1b with multiple parallel circuit blocks, instead of the switch 551.

The skilled person would understand that in the parallel embodiment, all 3 sensors may be active and sending data, while in the switched version, data is received only when the switch is active for that particular sensor 12.

Sensor

The sensor or parametric disturbance sensor 12 (PDS) is a transmission line. A number of problems are solved by the example of the system of the invention. These may include longevity, the ability to provide spatial information along the length of the sensor 12, the ability to provide positional information on wheels along the length of the sensor 12, the ability to measure wheel pressure, the ability to differentiate individual wheels, the ability to continuously monitor the sensor, the ability to resist or detect interference from wheels of an adjacent vehicle during wheel measurement, and ease of installation. This is in part achieved through the design of the sensor 12.

The design of the sensor 12 takes into account that the bandwidth of a transmission line is reduced the longer the transmission line becomes. Lower bandwidth causes lower minimum feature resolution and more interference between adjacent wheel-loads. Two phenomena cause the reduction in transmission line bandwidth, namely the "skin effect" and dielectric losses.

The skin effect causes conductors to exhibit a frequency dependent resistance, due to the self-inductance of the conductor. This causes the rise-time and dispersion of the transmission line to increase with the square of the transmission line length. This band-limiting has the undesired effect of causing wheels on the sensor to interfere with one another, due to inter-symbol interference. The way to reduce the rise-time without shortening the transmission line length is to reduce the resistance of the transmission line, which is accomplished by using a highly conductive material, and with larger surface area geometries.

Dielectric losses are caused by dissipation in the dielectric material. The amount of dissipation is determined by the loss tangent, and varies by material. This effect causes an increase in the rise-time and dispersion that is proportional to the transmission length. In order to mitigate this problem, a low loss dielectric material must be chosen.

Another problem the sensor solves is the ability to provide an approximately linear response, or characterizable response, to the weight of wheel-loads seen from vehicles such as trucks and cars. The limitations overcome are that the sensor 12 has to provide the linear response with sufficient bandwidth for the system to resolve the desired level of detail.

Problems that the sensor design has overcome are durability and reliability issues that arise when deployed in real world conditions for long periods of time. There is also consideration of manufacturability issues, and road infrastructure impacts. For example, the sensor is deployed in roadways and exposed to all weather conditions. The sensor has to survive and be reliable when it is driven over by vehicles such as cars and trucks continuously over long periods of time. The periods of time may be years or longer.

In one aspect, for example, a practical limitation is the ability to span one full lane of traffic with a sensor length of 13 feet. Another practical limitation is the ability to resolve a single tire from a dual tire pair, which has a gap of about 6 inches. This may require a spatial resolution of less than 3 inches which the system is able to provide.

In an embodiment, the sensor is designed with a 50 ohm nominal characteristic impedance. The range of the change in impedance over the expected wheel-load pressure range is less than 2 ohms. In an embodiment, the system electronics are capable of seeing or measuring an impedance change over the range of 10 ohms.

Figure 6A:
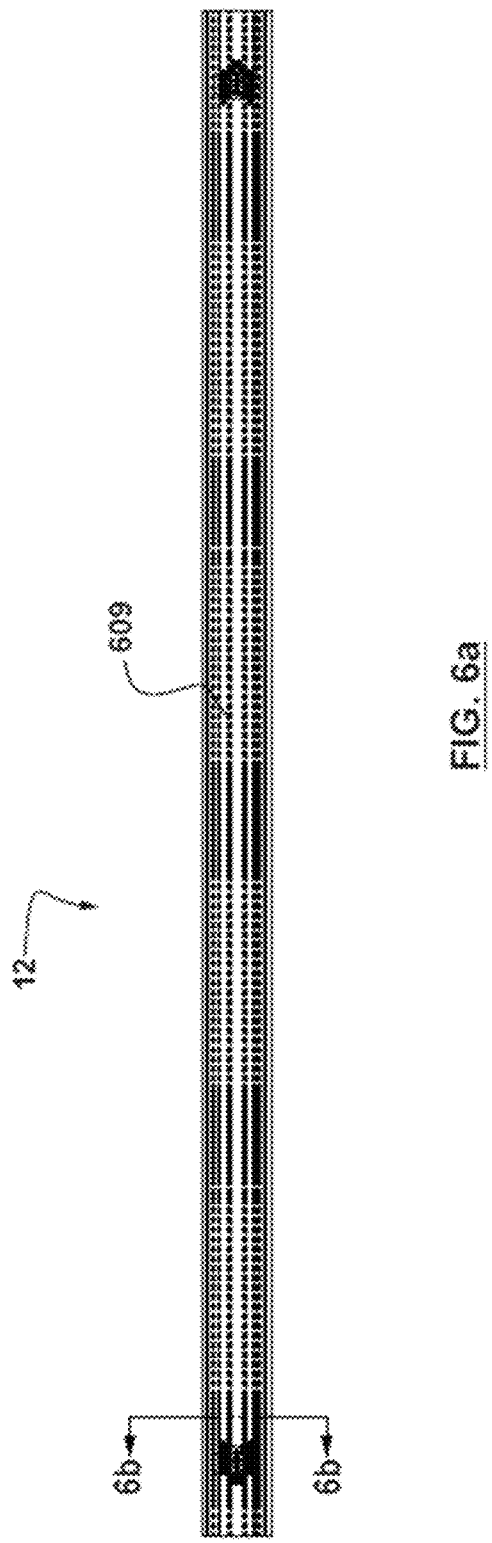
Figure 6B:
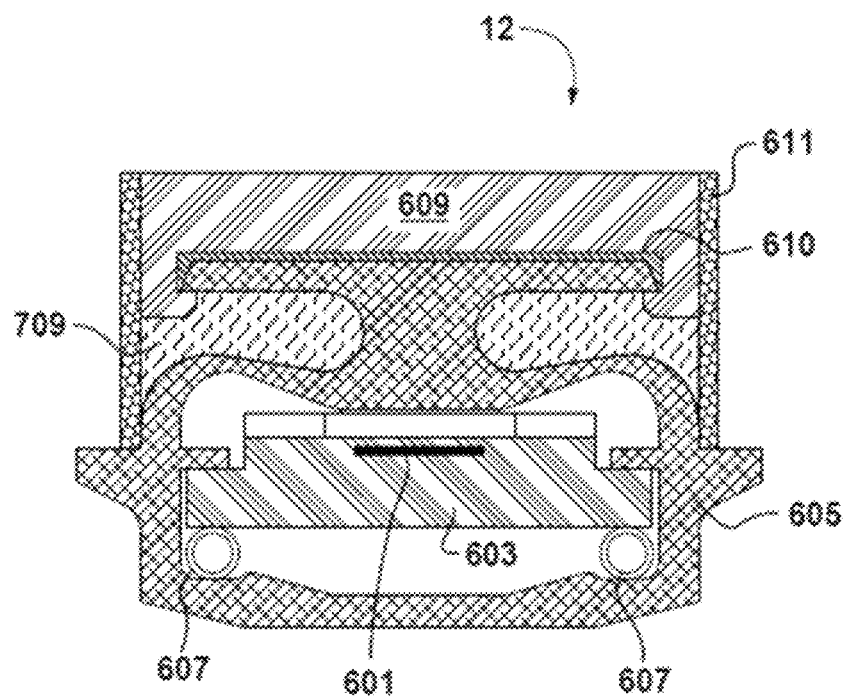

Referring now to FIGS. 6a-6c, there is shown an embodiment of the PDS 12. In the embodiment shown, the overall dimensions are much larger than a typical coaxial cable design, about 1.5 inches high by 2.25 inches wide by about the length of a lane in a road. The main purpose of the larger surface area was to reduce the skin effect issues that would affect the ability to obtain high resolution information. A skilled person would understand that a suitable PDS 12 or transmission line may have variations in the materials chosen for construction, shape, size, and other physical attributes that may be varied to meet the requirements of the overall device, system, or method.

In this embodiment, there is shown a PDS 12 or transmission line comprising a sensor core 601 in a sensor carrier 603. The sensor carrier 603 is housed in the sensor carrier extrusion housing 605. The sensor carrier extrusion housing 605 is a metallic shield which surrounds the sensor core 601 and sensor carrier 603. The sensor carrier 603 may be supported or stabilized in the sensor carrier extrusion housing 605 by a support tubing 607. The top of the sensor carrier extrusion housing 605 is covered and/or protected by the cap extrusion 609. The cap extrusion 609 is connected to the sensor carrier extrusion housing 605 by adhesive 610. The sensor core 601 may be a half hard copper strip, and the sensor carrier extrusion housing 605 may be made of aluminum. The dielectric is a combination of air and the material of the sensor carrier 603, for example, the sensor carrier 603 may be made of polyethylene. A skilled person would understand that other materials suitable for use in a transmission line may be used, such as aluminum, copper, high density polyethylene, although reliability and durability issues may need to be addressed. The adhesive 610 may be a urethane sealer.

Load from the vehicle's wheels are applied to the cap extrusion 609, which may be mounted flush in the roadway, as a raised surface in the roadway, or above the roadway as required by the aspect or embodiment of the invention. The load is then transferred to the sensor carrier exterior housing 605 via the cap extrusion 609. In an embodiment, the sensor carrier extrusion housing 605 construction material was chosen to be aluminum. Aluminum is a good choice from an electrical signal perspective, other than copper, since sensor carrier extrusion housing would act as the outer conductor of the transmission line sensor, or the PDS 12. Aluminum was also chosen for the mechanical properties related to strength and continuous load cycling, since copper does not have the higher strength properties that are required for these purposes.

The top flat portion of the sensor carrier extrusion housing 605 allows the transmission of the wheel load, while retaining multi-tire recognition, e.g. the wheel load from a dual wheel axle. The cap extrusion 609 is designed as a wearing surface in the road that would limit any effects from the gradual wearing away of the surface of the road and sensor carrier extrusion housing 605 without any detrimental measurement impacts. The isolation foam 611 allows the PDS 12 to measure the true force from the wheel by preventing the road encapsulant or grout 705 (depicted in FIG. 7*f*) from bonding to the side surface of the cap extrusion 609 and impacting the amount of deflection seen by the PDS 12.

The PDS 12 is connected to the system or device via a wire assembly or cable that is attached at connector 615. The connector 615 and the rest of the sensor 12 are connected and interface at the termination block 617. The details of the connection and interface are described below.

Figure 7A:
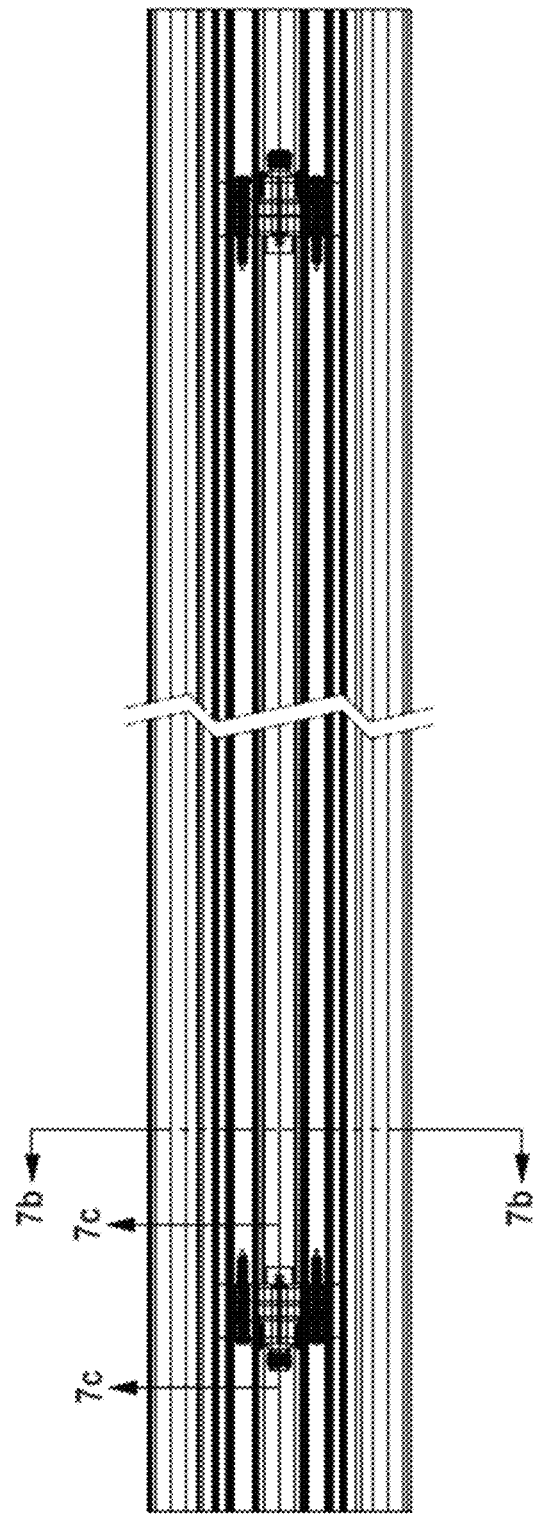
FIGS. 7a-7f are respectively top view, and end view, sectional views along the line A-A and B-B, and, detail views A and B of an example embodiment of an ETDR sensor.
Figure 7B:
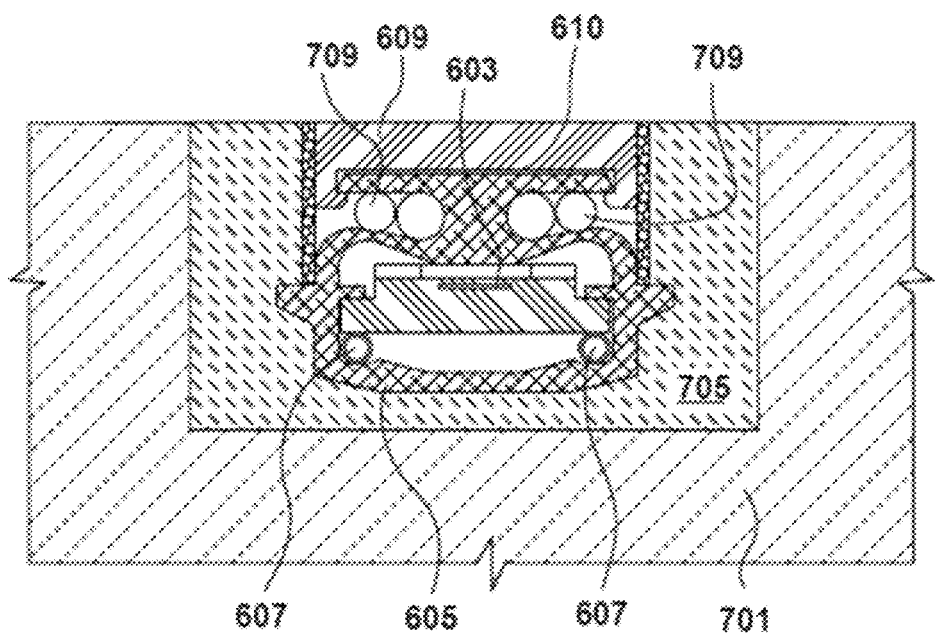
Figure 7C:
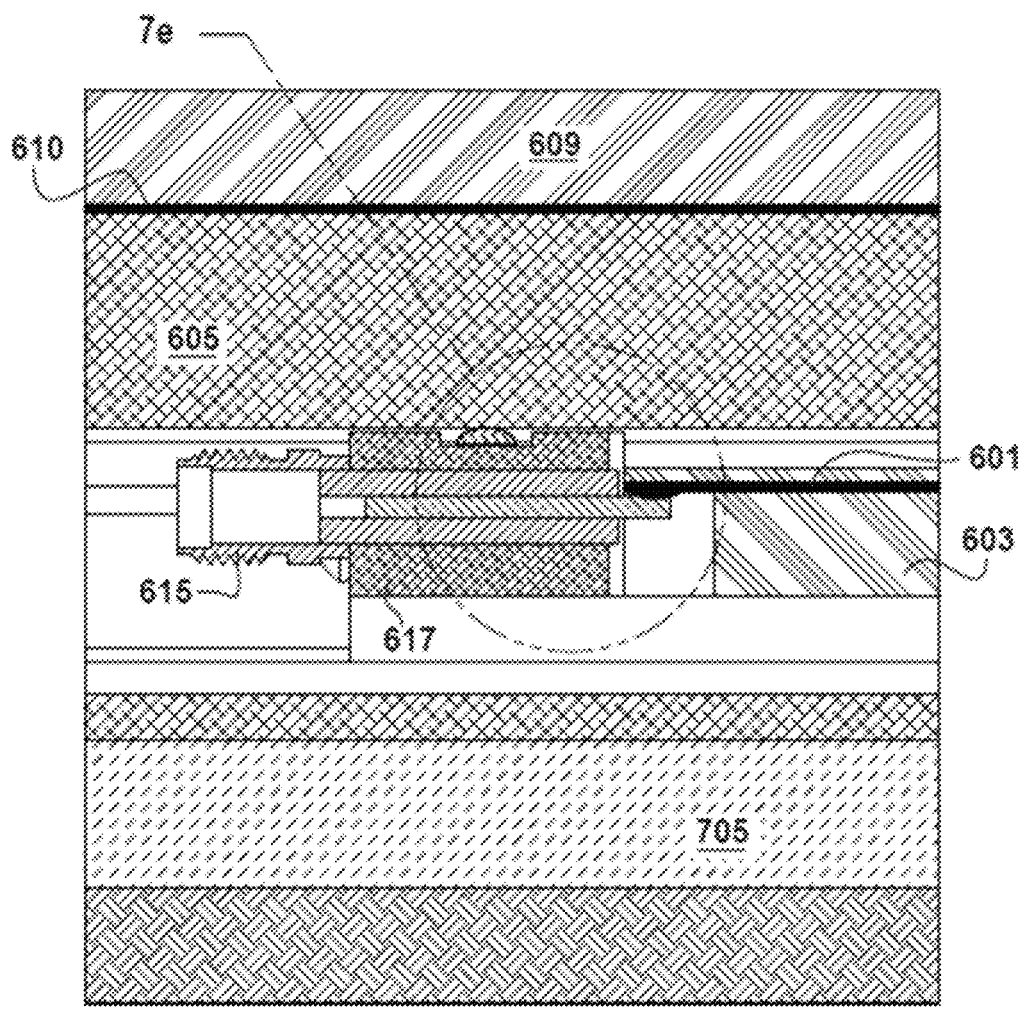
Figure 7D:
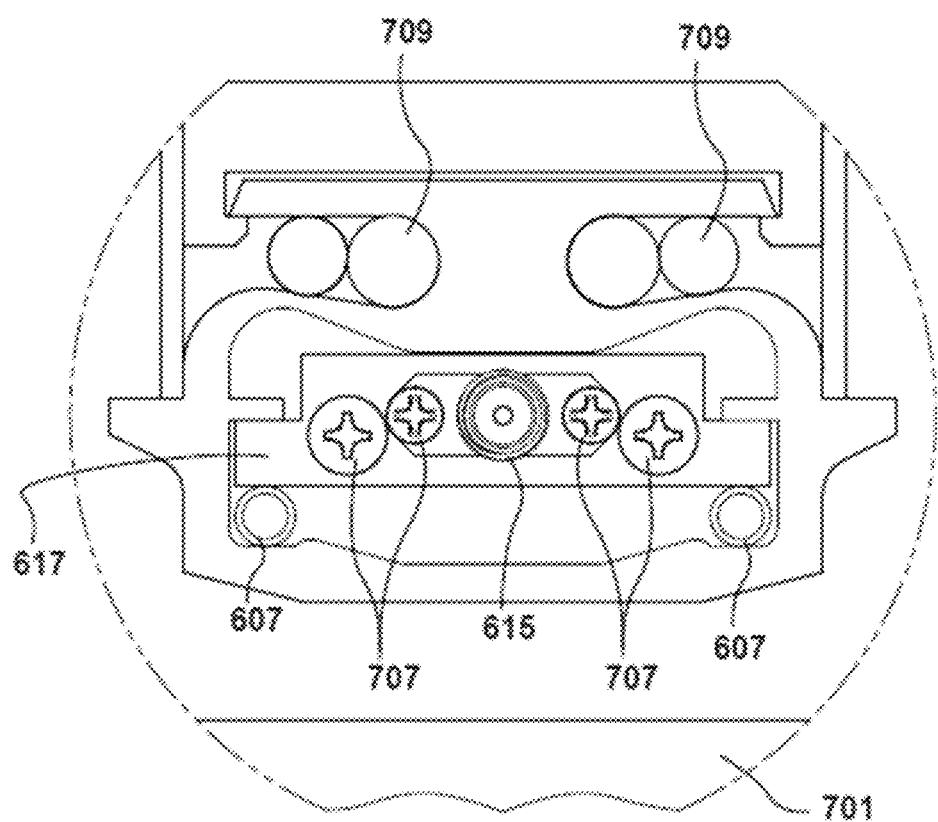
Figure 7E:
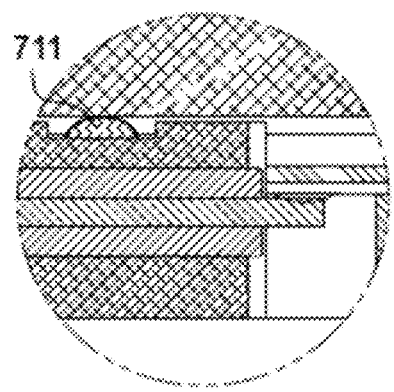
Figure 7F:
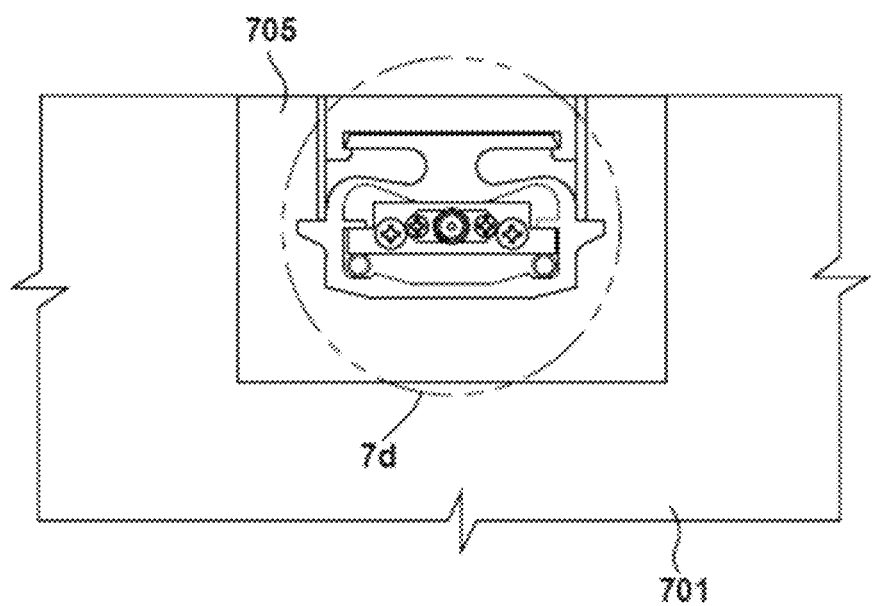

Referring now to FIGS. 7*a*-7*f*, there is shown an embodiment of the PDS 12. The end view shows the PDS 12 mounted in concrete, and held in place by grout 705. FIG. 7*d* shows connector 615 screwed in by screws 707 into the termination block 617 with the termination block screwed into the sensor carrier 603 (depicted in FIG. 7*c*) using screws 707. FIG. 7*b* shows a section of the PDS 12 as it is mounted in the roadway 701. The roadway 701 may include any type of roadway material or materials having, for example, concrete, asphalt, etc. The closed cell foam 709 runs along the length of the sensor carrier extrusion housing 605. The foam 709 acts as filler to prevent contaminants from entering the gap and causing undesired bridging between the top, flat portion of the extrusion housing and the angled corners below. It is desirable that all the force be transferred through the center column of the extrusion housing.

FIG. 7*c* shows an embodiment of how the connector 615, termination block 617, and sensor core 601 may be connected. The connector 615 is connected, as understood by a skilled person, to both the sensor core 601 and sensor carrier extrusion housing 605. FIG. 7*c* shows an electromagnetic interference (EMI) gasket 711 (depicted in FIG. 7*e*) that assists in providing an electrical contact point between the termination block 617 and the sensor carrier extrusion housing 605.

In the embodiment shown, the PDS 12 design addresses the mechanical and electrical requirements of the ETDR device and system. The overall shape and size of the PDS 12 design may be limited by manufacturing constraints, and industry standards or industry expectations regarding acceptable sensor size. A skilled person would understand that these manufacturing and/or industry requirements may change, and that variations in the mechanical and electrical requirements for the PDS 12 are acceptable, as long as they meet the minimum requirements set out by the overall design for the device, system and method.

Figure 7G:
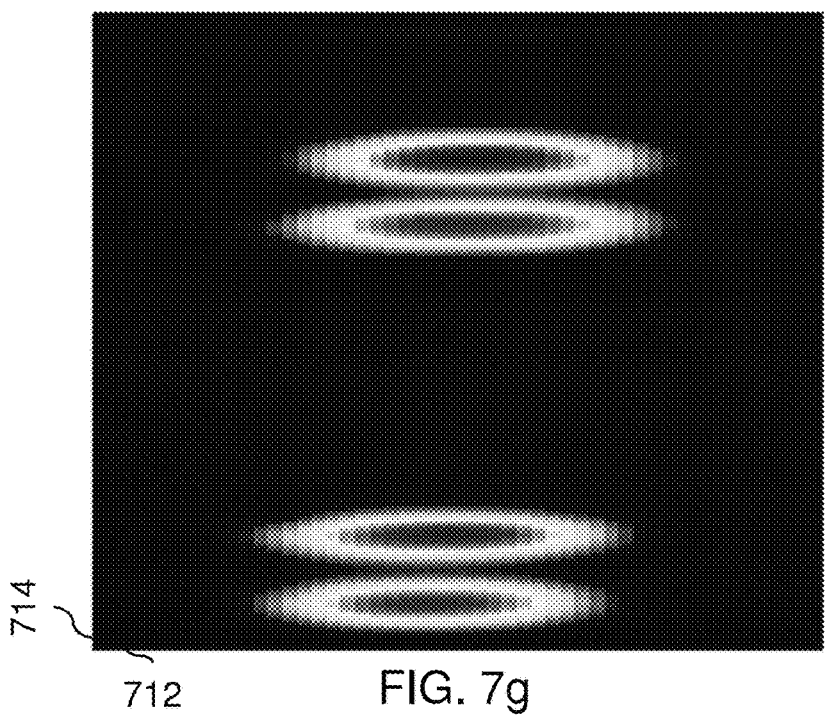
FIGS. 7g-7j depict examples of data images from vehicle data provided by the sensor 12 to the electrical time domain reflectometry signal processing system (906).
Figure 7H:
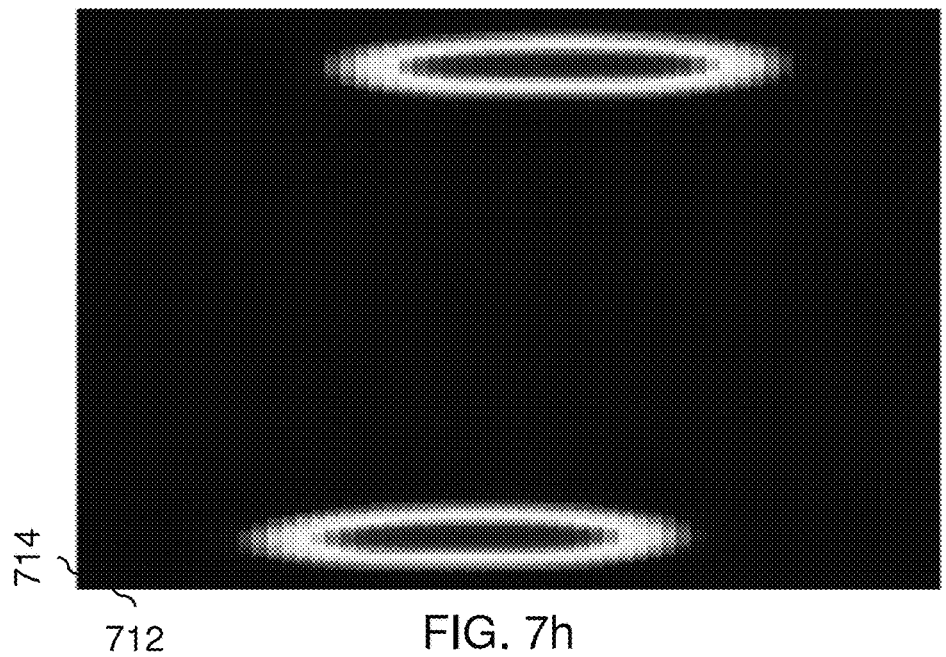
Figure 7I:
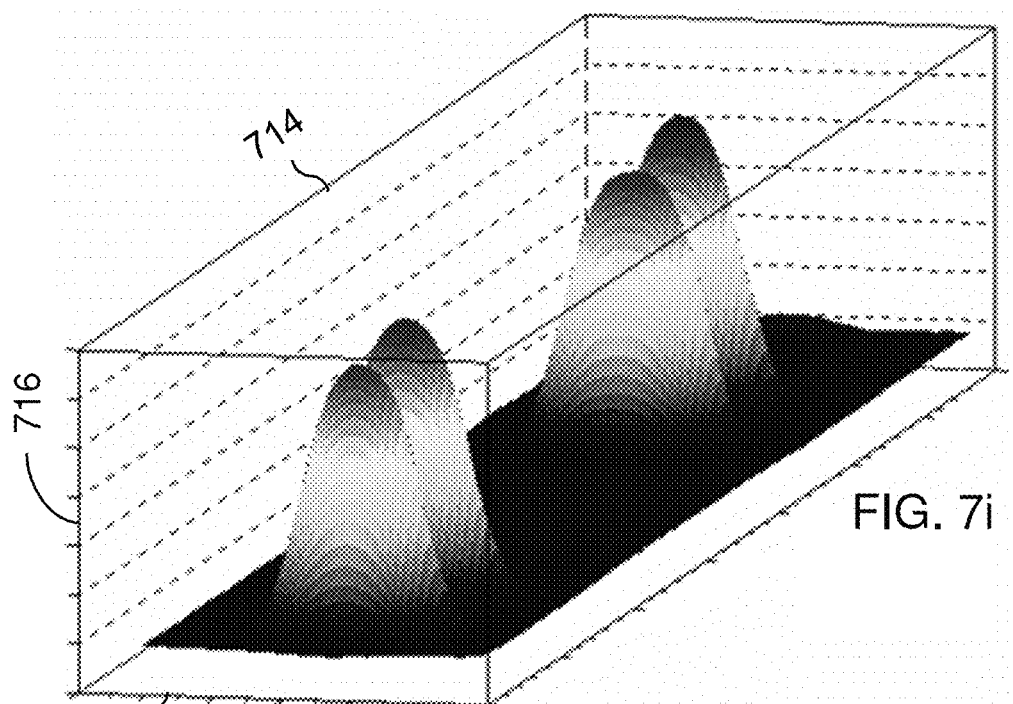

FIGS. 7*g* to 7*i* depict examples of data images from vehicle data provided by the sensor 12 to the electrical time domain reflectometry signal processing system (906).

Figure 7J:
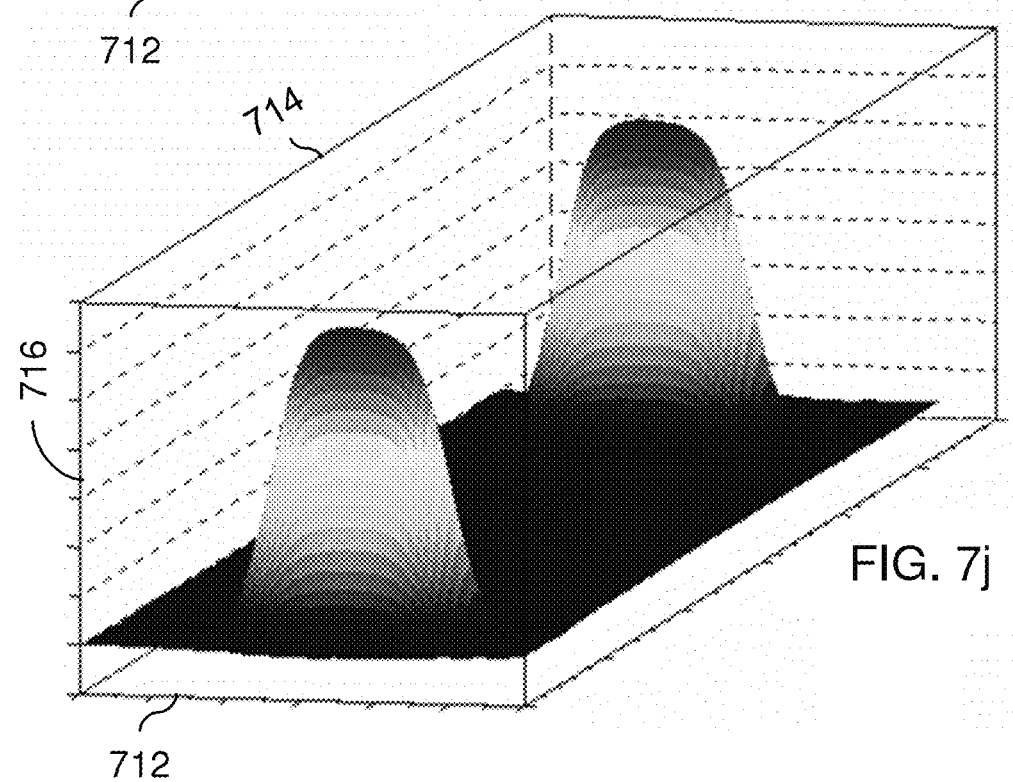

The x-axis 712 represents time, the y-axis 714 represents the distance along a longitudinal length of the sensor 12, and the Z-axis 716 represents impedance change of the sensor 12. FIG. 7*g* depicts two dimensional (2D) data images for an axle with dual tires. FIG. 7*h* depicts two dimensional (2D) data images for an axle with single tires. FIG. 7*i* depicts three dimensional (3D) data images for an axle with dual tires. FIG. 7*j* depicts three dimensional (3D) data images for an axle with single tires. The plots visualize the impedance change in time slices as the vehicle drives across the sensor 12.

The following provides a description of a manner in which vehicle speed may be derived by using a single instance of the sensor 12. It will be appreciated that the speed measurement may be derived or received from two instances of the sensor 12, or the speed measurement may be derived or received from other sensors (depending on the level of accuracy and repeatability desired). The speed measurement may also be determined by using a single instance of the sensor 12. Referring to FIGS. 7*g*, 7*h*, 7*i* and 7*j*, a skilled person would understand that as a wheel rolls onto the sensor 12, the area that the load of the vehicle applies to the sensor 12 (through the wheel) increases over time from no load to a fully applied load. This is shown in FIGS. 7*g* and 7*h*, by how the width of the applied load is narrow at the leading edge and widens out until the load reaches a maximum width. A skilled person would therefore understand that by determining the horizontal distance between where the load is first applied and where the load reaches its greatest width, the vehicle speed may be derived. Assuming, constant velocity of the vehicle and/or wheels as they move over the sensor 12.

Figure 8A:
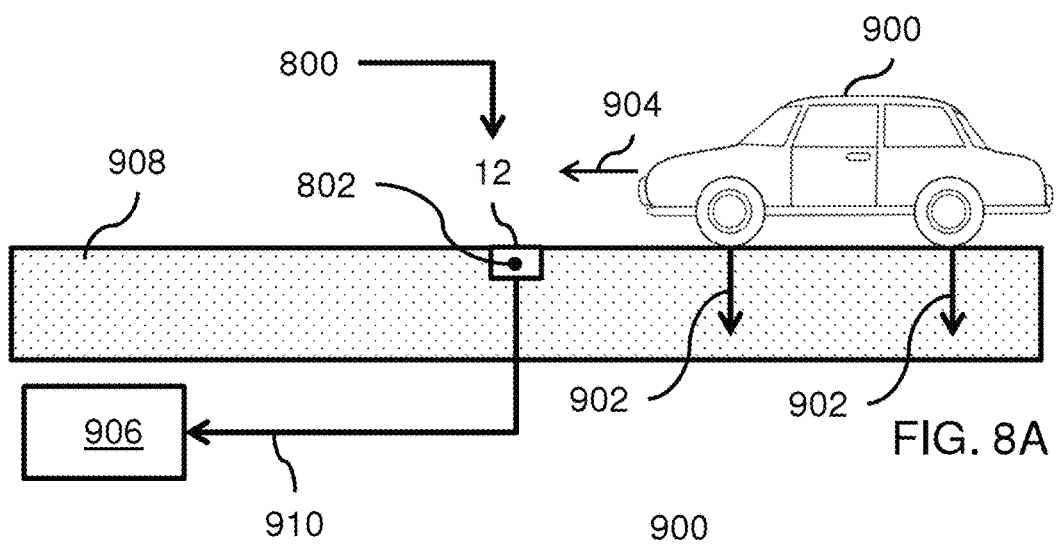
FIGS. 8A, 8B, and 8C depict schematic examples of an apparatus including a sensor assembly.
Figure 8B:
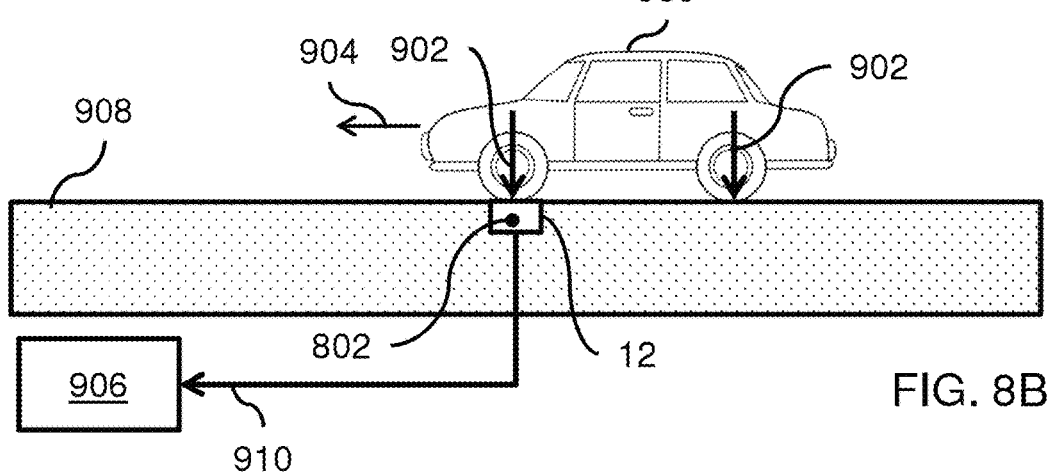
Figure 8C:
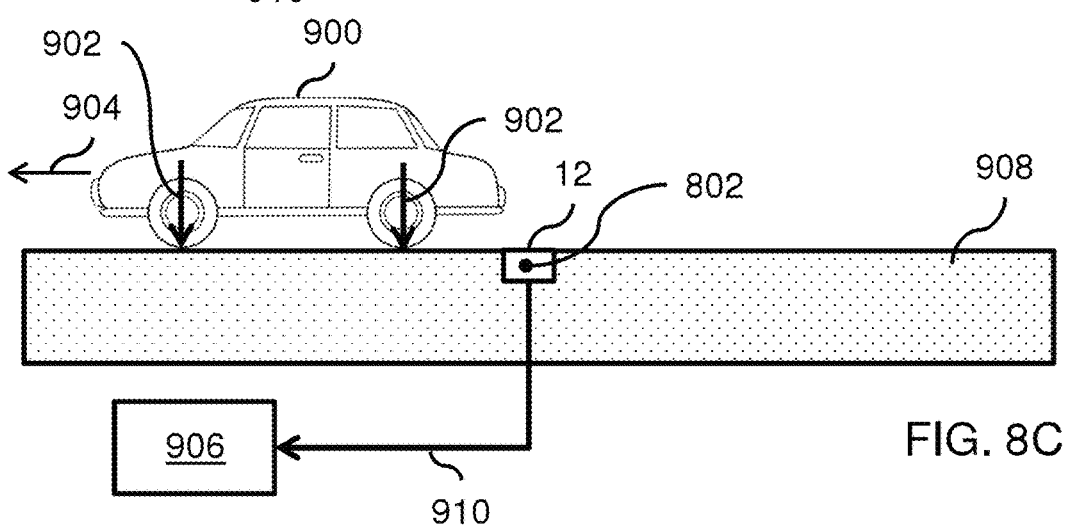

FIGS. 8A, 8B, and 8C depict schematic examples of an apparatus (800) including a sensor assembly (12).

In general terms, the sensor assembly (12) includes (and is not limited to) a transmission-line assembly (802) (depicted, at least in part, in FIGS. 8A, 8B, 8C). The transmission-line assembly (802) is configured to be positioned (at least in part) relative to (or in) a vehicular roadway (908). This is done in such a way that a moving vehicle (900) moving along the vehicular roadway (908), along a direction (904), drives (moves) over or past the sensor assembly (12). The position of the transmission-line assembly (802) is such that the moving vehicle (900) imparts a vehicular load (902) to the transmission-line assembly (802) once the transmission-line assembly (802) is positioned to do just so, and the moving vehicle (900) passes by the sensor assembly (12).

FIG. 8A depicts the case where the moving vehicle (900) is moving toward the sensor assembly (12) along the direction (904), and the sensor assembly (12) does not receive the vehicular load (902) from the moving vehicle (900).

FIG. 8B depicts the case where the moving vehicle (900) is moving along the direction (904) and is positioned over the sensor assembly (12) in such a way that the vehicular load (902) is received by the sensor assembly (12) from the moving vehicle (900). The vehicular load (902) is transferred from the moving vehicle (900) to the sensor assembly (12).

FIG. 8C depicts the case where the moving vehicle (900) is moving along the direction (904) and away from the sensor assembly (12) so that the sensor assembly (12) does not receive the vehicular load (902) from the moving vehicle (900). The moving vehicle (900) may include an automobile, a truck, etc. The vehicular roadway (908, 701) may be constructed of asphalt, concrete, etc. The sensor assembly (12) is configured to be connected or coupled, via a signal-wire assembly (910), to an electrical time domain reflectometry signal processing system (906), hereafter referred to as the ETDR system (906). ETDR stands for Electrical Time Domain Reflectometry. The ETDR system (906) includes a time-domain reflectometer configured to detect faults in the transmission-line assembly (802); the faults may be characterized as a change to an electrical parameter of the sensor assembly (12). The ETDR system (906) may include a display assembly configured to display representations of a transmitted electrical pulse (electrical signal) and a reflected electrical pulse (electrical signal) travelling along a longitudinal length of the transmission-line assembly (802). An electrical signal associated with the ETDR system (906) is transmitted along the transmission-line assembly (802), and the electrical signal may be reflected back to the ETDR system (906) from a discontinuity located at a point or zone of the transmission-line assembly (802). The ETDR system (906) is configured to characterize and locate a fault in the transmission-line assembly (802). The fault is a discontinuity in the sensor assembly (12) resulting from a change in the electrical parameter of the sensor assembly (12) as a result of the sensor assembly (12) receiving the vehicular load (902). The transmission-line assembly (802) may include an electrically-conductive material (metallic cables, twisted wire pairs, coaxial cables, etc). Electrical time-domain reflectometry or ETDR is a measurement technique used to determine the changes in electrical characteristics of electrical material or electrical cables or electrical lines by observing reflected waveforms; that is, electrical signals travelling along the length of the sensor assembly (12). The impedance of the discontinuity created in the sensor assembly (12) can be determined from the amplitude of the reflected electrical signal sent back to the ETDR system (906). The distance to the discontinuity in the sensor assembly (12) can also be determined from the time that an electrical pulse takes to return back to the ETDR system (906) from the position of the discontinuity in the sensor assembly (12).

To summarize FIGS. 8A, 8B, and 8C, the apparatus (800) includes (and is not limited to) the sensor assembly (12). The sensor assembly (12) includes (and is not limited to) the transmission-line assembly (802). The transmission-line assembly (802) has the electrical transmission-line parameter. The electrical transmission-line parameter is configured to change, at least in part, in response to the reception, at least in part, of a vehicular load (902) of a moving vehicle (900) which moves relative to a vehicular roadway (908) and to the transmission-line assembly (802). The transmission-line assembly (802) is positionable, at least in part, relative to the vehicular roadway (908). For example, the transmission-line assembly (802) is configured to generate, at least in part, an electrical transmission-line signal (also called the reflected electrical signal), in response to the reception, at least in part, of the vehicular load (902). For example, the electrical transmission-line parameter includes a transmission-line characteristic impedance. The transmission-line impedance is configured to change, at least in part, in response to the reception of the vehicular load (902) from the moving vehicle (900). The sensor assembly has an elasticity; the sensor assembly deforms but returns to an initial state prior to deformation once the deformation load is no longer applied to the sensor assembly. The point at which the vehicular load (902) is applied to the sensor assembly (12) causes a elastic deformation which alters the impedance of the transmission line, causing a discontinuity in the characteristic impedance of the transmission line in the sensor assembly (12). As well, there is provided a method. The method includes (and is not limited to) changing, at least in part, an electrical transmission-line parameter of the transmission-line assembly (802) of the sensor assembly (12); this is done in response to the reception, at least in part, of a vehicular load (902) of the moving vehicle (900) (the moving vehicle (900) moves relative to the vehicular roadway (908)) to the transmission-line assembly (802). The transmission-line assembly (802) is positionable, at least in part, relative to the vehicular roadway (908). The method may include generating an electrical signal that is transmitted down the transmission line assembly (802) and which results in a reflection of the electrical signal at the discontinuity in the sensor assembly (12), in response to the reception, at least in part, of a vehicular load (902) of a moving vehicle (900) moving relative to a vehicular roadway (908), on the sensor assembly (12).

The transmission-line assembly (802) and/or the sensor assembly (12) includes an electrical cable (and any equivalent thereof) configured to carry an alternating current (electrical signal) having a frequency high enough that the wave nature of the electrical signal is taken into account. The transmission-line assembly (802) does not include a non-electrical conductor, a waveguide (for guiding acoustic waves, or air-borne waves, etc.), a dielectric waveguide (for guiding a pressure wave, etc.), and/or an optical fiber (and any equivalent thereof).

Considering the example depicted in FIG. 8B, the sensor assembly (12) contains a transmission line assembly (802) and terminating impedance. Because of the mechanical properties of the sensor assembly (12), discontinuities are formed in the transmission line assembly (802) as a result of the vehicular load (902) on the sensor assembly (12). The ETDR system (906) of FIGS. 8A, 8B, and 8C is the source of the high frequency signals sent to the sensor assembly. When the signals encounter the discontinuities in the transmission line assembly (802) a portion of the signal is reflected back to the ETDR system (906) which measures the amplitude of the reflected signals and the time taken by the signal to propagate to the discontinuities and reflect back to the ETDR system (906). The measured magnitude of the reflected signals is proportional to the vehicular load (902). The position of the discontinuities on the sensor assembly (12) is calculated by the ETDR system (906) based on the round trip time of the signal out of the ETDR system (906) to the discontinuity and back to the ETDR system (906). A person familiar with the art would understand that the velocity of the signal from the ETDR system (906) is constant and can be derived. With the velocity of the signal and the round trip time of the signal, the position of the discontinuity and the vehiclular load (902) causing the discontinuity from the ETDR system (906) is calculated by the ETDR system (906).

When no vehicular load (902) is applied to the sensor assembly (12) as depicted in FIGS. 8A and 8C, the signal created by the ETDR system (906) travels down the transmission-line assembly (802) within the sensor assembly (12) reaching the termination. Because the termination is matched to the characteristic impedance of the transmission-line assembly (802), the signal terminates at the terminator, and no reflections are sent back to the ETDR system (906). The ETDR system (906) is connected to the sensor assembly (12) through a signal wire assembly (910). This assembly is an electrical transmission line that has the same characteristic impedance as the transmission line assembly (802) in the sensor assembly. A person familiar with the art would know that a signal from the ETDR system (906) will be transmitted through the signal wire assembly (910) without any reflections as long as the source impedance of the ETDR system (906), the characteristic impedance of the signal wire assembly (910), transmission line assembly (802) and terminator are all matched.

FIGS. 9A, 9B, 9C, and 9D depict schematic examples (cross-sectional views) of the assemblies and/or components of the sensor assembly (12) of FIGS. 8A, 8B, and 8C.

Generally, the sensor assembly (12) includes the transmission-line assembly (802) having a first electrical conductor and a second electrical conductor. By way of example, the transmission-line assembly (802) includes (and is not limited to) a combination of a shield assembly (808)

and a core assembly (806). Examples of the core assembly (806) are depicted in FIGS. 9B and 9C. An example of the shield assembly (808) is depicted in FIG. 9A.

Figure 9A:
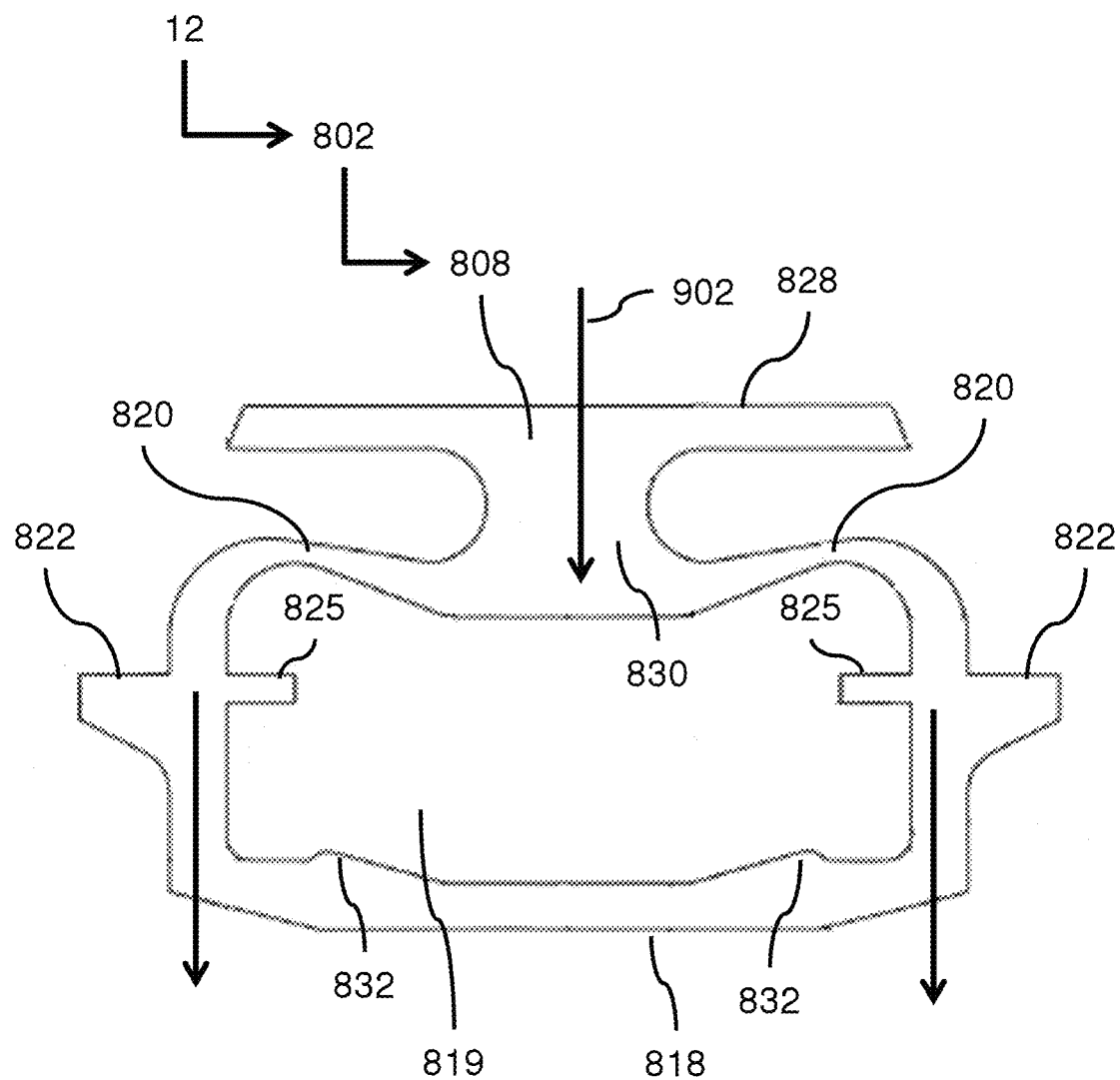
FIGS. 9A, 9B, 9C, and 9D depict schematic examples of the assemblies and/or components of the sensor assembly.
Figure 9B:
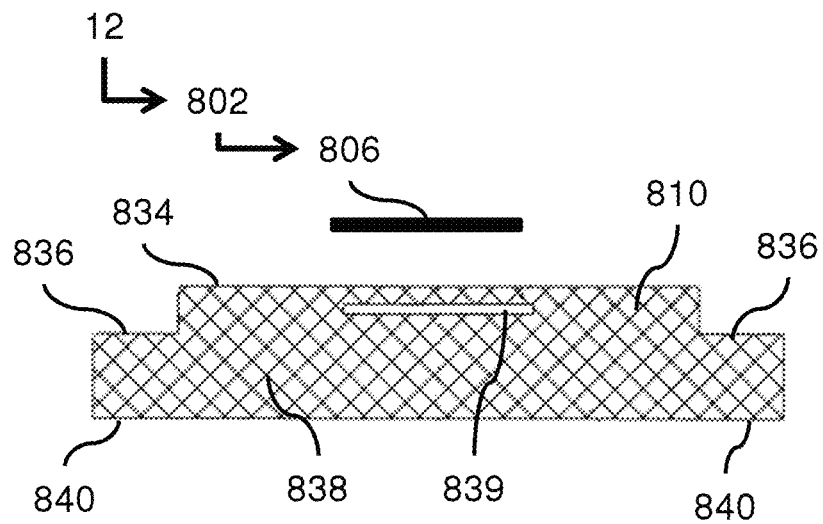
Figure 9C:
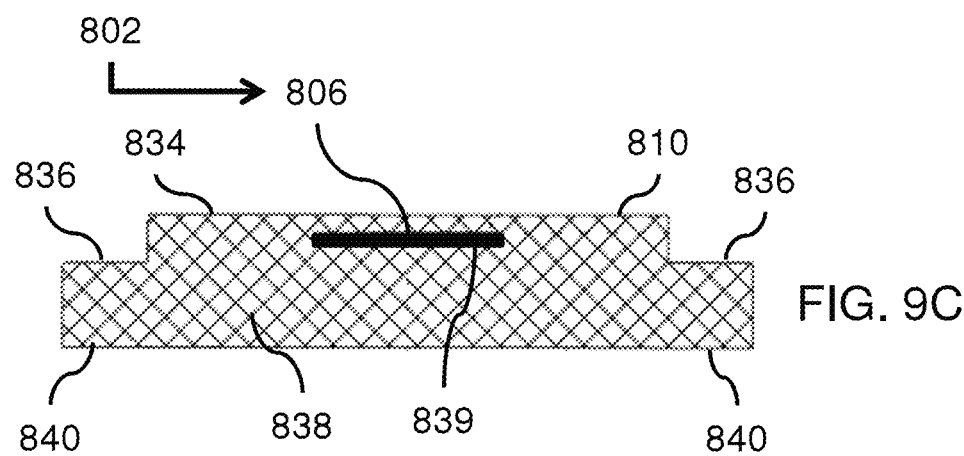

Referring to FIG. 9A, by way of example, the shield assembly (808) includes a combination of an elastically-deformable portion (820), a roadway anchor (822), a core-anchor assembly (825), a force-receiving portion (828), a force-transfer portion (830), a retainer assembly (832), and a tubular assembly (818).

The force-transfer portion (830) may be called a central zone of the tubular assembly (818). The tubular assembly (818) forms a channel (819). The channel (819) may also be called a hollow-interior zone. The tubular assembly (818) may form a rectangular cross-sectional profile, a square-shaped profile, and any suitable cross-sectional profile, etc. The tubular assembly (818) may be formed from an extrusion of a metal alloy, such as aluminum, etc. The force-receiving portion (828) is positioned on a side of the tubular assembly (818). The force-receiving portion (828) is configured to receive the vehicular load (902) and to convey the vehicular load (902) to the force-transfer portion (830). The force-transfer portion (830) connects the force-receiving portion (828) to the tubular assembly (818). The force-transfer portion (830) is positioned at a central zone of the tubular assembly (818). The vehicular load (902) passes through the force-transfer portion (830) to the tubular assembly (818).

The tubular assembly (818) includes instances of the elastically-deformable portion (820) positioned on opposite sides of the force-transfer portion (830), and on opposite sides of the central zone of the tubular assembly (818). The instances of the elastically-deformable portion (820) connect the central zone, or the force-transfer portion (830), of the tubular assembly (818) to the opposite sides of the tubular assembly (818). The vehicular load (902) passes from the force-transfer portion (830) to the elastically-deformable portion (820) then to the opposite sides of the tubular assembly (818).

Figure 10A:
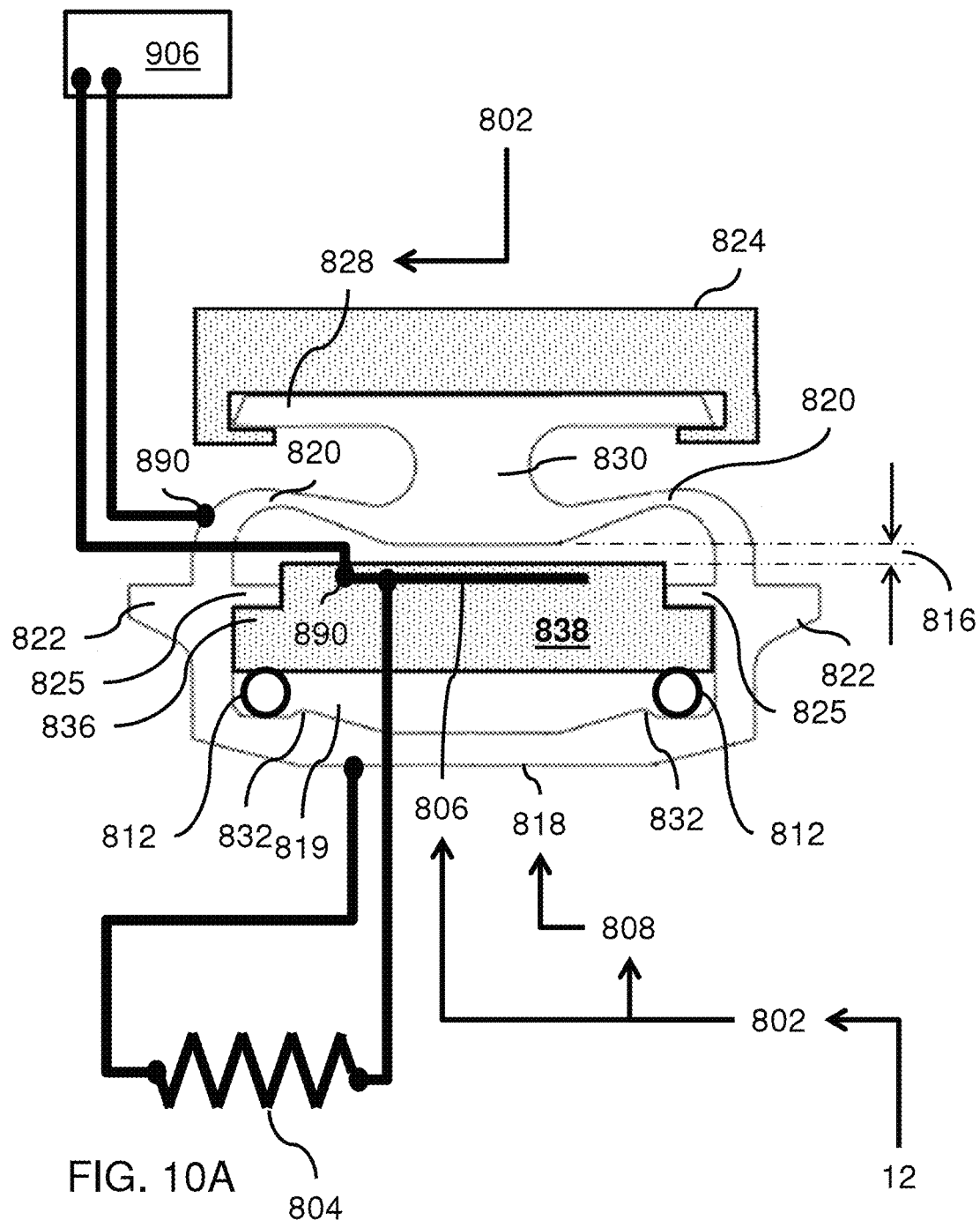
FIGS. 10A and 10B depict schematic examples of a sensor assembly in an assembled state.
Figure 10B:
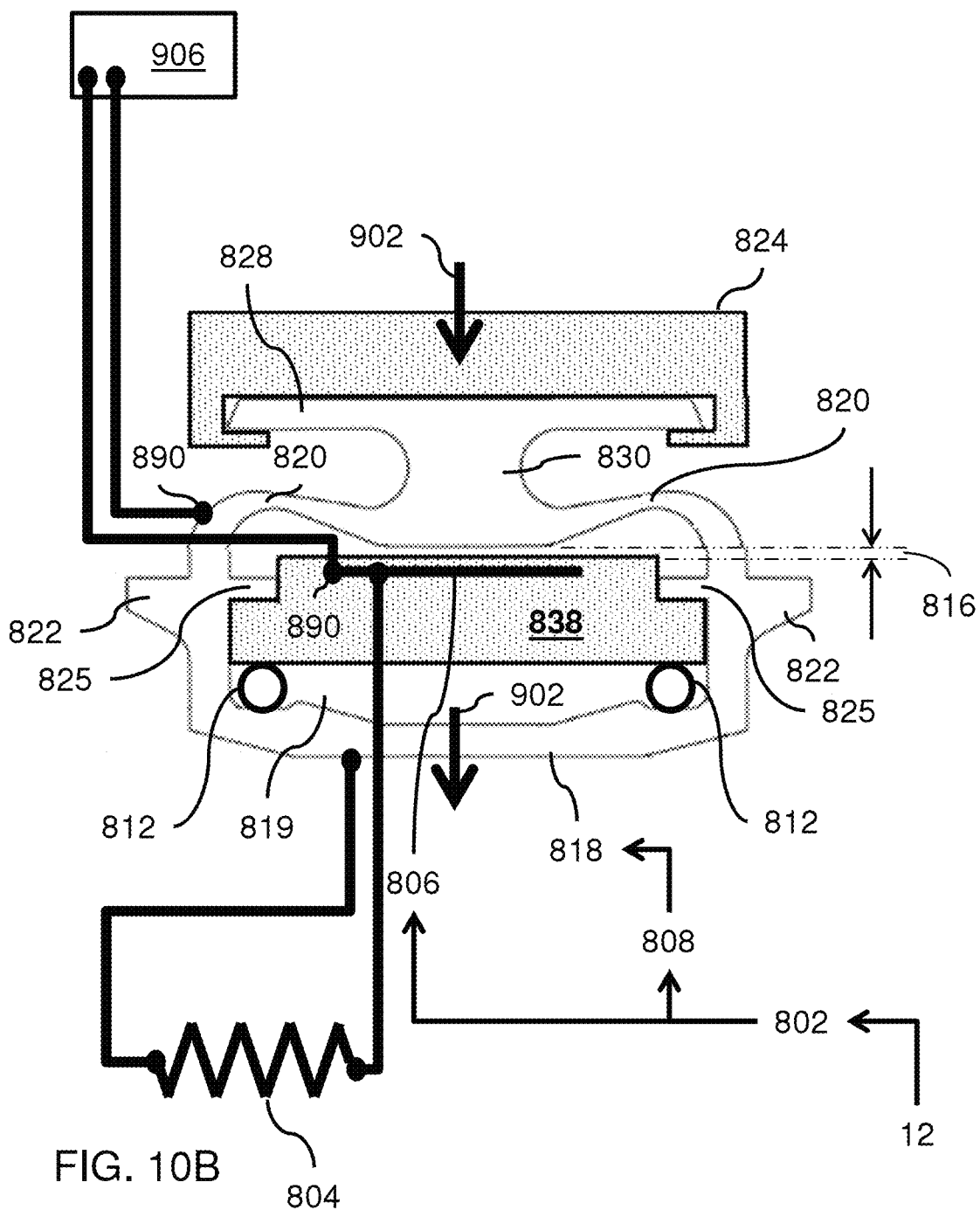

The force-receiving portion (828) receives (directly or indirectly) the vehicular load (902), and then the force-receiving portion (828) transfers the vehicular load (902) to the force-transfer portion (830), and then the force-transfer portion (830) transfers the vehicular load (902) to the central zone of the tubular assembly (818). In response, the elastically-deformable portion (820) elastically deforms in response to the force-transfer portion (830) being pushed or urged downwardly by the vehicular load (902), and transfers the vehicular load (902) from the force-transfer portion (830) to the opposite side walls of the tubular assembly (818). In response to removal of the vehicular load (902) from the elastically-deformable portion (820), the elastically-deformable portion (820) returns back to an original unstressed condition or form (elastically reforms), and the force-transfer portion (830) returns back to its normal condition (the unstressed condition). FIG. 10A depicts the unstressed condition. FIG. 10B depicts the stressed condition. Elastically deformable means that the elastically-deformable portion (820) may repeatably operate between the stressed condition (FIG. 10B) and unstressed condition (FIG. 10A) for as long as possible to thus extend the useful lifespan of the sensor assembly (12).

The tubular assembly (818) includes instances of the roadway anchor (822) positioned on opposite external sides of the tubular assembly (818), and the instances of the roadway anchor (822) face away from each other. The roadway anchor (822) is configured to anchor the sensor assembly (12) in a stationary position relative to the vehicular roadway (908) of FIG. 8B as the moving vehicle (900) moves past the sensor assembly (12) as the vehicular load (902) is imparted to the sensor assembly (12).

The shield assembly (808) includes instances of the core-anchor assembly (825) positioned on opposite internal sides of the tubular assembly (818), and the instances of the core-anchor assembly (825) face each other. The core-anchor assembly (825) is configured to support the core assembly (806) as depicted in FIGS. 9B and 9C.

Returning to FIG. 9A, the tubular assembly (818) defines or provides instances of the retainer assembly (832) positioned within the interior of the tubular assembly (818), and each of which face respective instances of the core-anchor assembly (825), and are positioned spaced apart (below) the core-anchor assembly (825). The retainer assembly (832) is configured to retain the positioning assembly (812) as depicted in FIG. 10A.

Referring to the example of FIG. 9A, the shield assembly (808) or the tubular assembly (818) includes a metal alloy, such as aluminum, that defines the channel (819). The shape of the channel (819) formed by the tubular assembly (818), or by the shield assembly (808), is configured to provide a relatively stronger shape for the tubular assembly (818), such as a rectangular-shaped tube or a square-shaped tube, while permitting some deflection, or resilient deformation, that does not promote fatiguing (or minimizes the fatiguing) of the tubular assembly (818) or the shield assembly (808) of the transmission-line assembly (802) of FIG. 9A. In this way, the useful life span of the shield assembly (808) or the tubular assembly (818) is prolonged. For example, for the case where a top section of the channel (819) is flat, unwanted stress would be expected at the edges of the top section (located proximate to the outer section near one side of the elastically-deformable portion (820)), and this unwanted stress may lead to inadvertent fatigue to the tubular assembly (818) or to the shield assembly (808). Square-shaped top corners of the tubular assembly (818) may (inadvertently) pull in on the sides or the top sides near the top corners of the tubular assembly (818). To resolve this unwanted issue, the top corners of the tubular assembly (818) leading from the elastically-deformable portion (820) curve back (downwardly) to the opposite sides of the tubular assembly (818), thus permitting the top corners of the tubular assembly (818) to become resiliently stretched along a top surface of the curved corner sections of the tubular assembly (818) forming part of the channel (819). The retainer assembly (832) is shaped upwardly or is curved upwardly on an inside corner of the channel (819), and is configured to hold the positioning assembly (812), such as a nylon tube, as depicted in FIGS. 10A and 10B.

To summarize FIG. 9A, the shield assembly (808) further includes the elastically-deformable portion (820) formed, at least in part, in the tubular assembly (818). The shield assembly (808) further includes the elastically-deformable portion (820) configured to elastically deform in response to the reception, at least in part, of the vehicular load (902). The shield assembly (808) includes the roadway anchor (822) extending externally from the tubular assembly (818), and the roadway anchor (822) is configured to anchor, at least in part, the shield assembly (808) to the vehicular roadway (908). The shield assembly (808) includes the core-anchor assembly (825) extending internally from the tubular assembly (818) into the channel (819), and the core-anchor assembly (825) is configured to support, at least in part, positioning of the core assembly (806) within the channel (819).

FIGS. 9B and 9C depict schematic examples (cross-sectional views) of the core assembly (806) of the transmission-line assembly (802) depicted in FIGS. 8A, 8B, and 8C.

The core assembly (806) includes a planar-shaped electrical conductor. The electrical conductor includes, for example, a copper alloy or an electrically-conductive element. The core assembly (806) includes a carrier assembly (810) defining a channel (839) configured to receive and to support the core assembly (806). FIG. 9B depicts the core assembly (806) not received by the channel (839); FIG. 9C depicts the core assembly (806) received by the channel (839). The carrier assembly (810) includes a surface (834), a shield-engagement portion (836), a carrier body (838), and a contact portion (840). The carrier body (838) includes a dielectric material, such as polyethylene.

As depicted in FIGS. 10A and 10B, the surface (834) extends along a top section of the tubular assembly (818), and is configured to face (and is spaced apart from) the central zone of the force-transfer portion (830) of FIG. 9A once the carrier assembly (810) is installed in the channel (819) of the tubular assembly (818) or in the shield assembly (808). The central zone of the tubular assembly (818), or of the shield assembly (808), is configured to change position relative to the surface (834) of the carrier assembly (810) in response to the vehicular load (902) received by the shield assembly (808).

Returning to FIGS. 9B and 9C, the carrier assembly (810) remains stationary while the vehicular load (902) travels through the shield assembly (808) of FIG. 9A. In this way, the characteristic impedance of the transmission-line assembly (802) may change where the spatial position (spot or zone) is changed between the shield assembly (808) and the carrier assembly (810) at the location of the discontinuity, creating a temporary discontinuity. Instances of the shield-engagement portion (836) are positioned on opposite sides of the carrier assembly (810) on a side (top side) of the carrier assembly (810). Instances of the contact portion (840) are positioned on opposite sides of the carrier assembly (810) on another side (bottom side) of the carrier assembly (810). Instances of the contact portion (840) are positioned opposite from respective instances of the shield-engagement portion (836). The shield-engagement portion (836) is configured to contact the core-anchor assembly (825) of FIG. 9A (the underside thereof) so that the carrier assembly (810) remains in a relatively stationary position in the shield assembly (808).

To summarize FIGS. 9B and 9C, the core assembly (806) includes the carrier assembly (810) that is configured to support, at least in part, the electrical conductor relative to the shield assembly (808) of FIG. 9A. The transmission-line assembly (802) includes the core assembly (806) that is, at least in part, electrically conductive. The transmission-line assembly (802) includes the shield assembly (808) that is, at least in part, electrically conductive and is positioned, at least in part, relative to the core assembly (806).

Figure 9D:
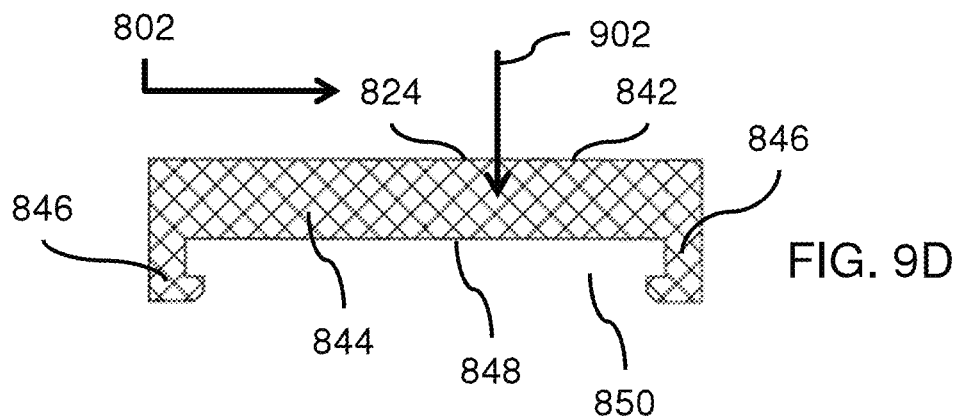

FIG. 9D depicts a schematic example (a cross-sectional view) of the wear-resistant assembly (824) of the shield assembly (808) of FIG. 9A.

As depicted, the wear-resistant assembly (824) includes (and is not limited to) a force-receiving section (842), a body assembly (844), a shield-engaging portion (846), a shield-contact portion (848), and a shield-receiving zone (850). The force-receiving section (842) is spaced apart from the shield-engaging portion (846), each of which are positioned on opposite sides of the body assembly (844). The force-receiving section (842) is configured to receive the vehicular load (902). The body assembly (844) is configured to transfer the vehicular load (902) from the force-receiving section (842) to the shield-engaging portion (846). The shield-engaging portion (846) is configured to securely engage (or contact) the force-receiving portion (828) of the transmission-line assembly (802) of FIG. 9A in such a way that the vehicular load (902) is then transferrable from the shield-contact portion (848) to the force-receiving portion (828). The body assembly (844) includes instances of the shield-engaging portion (846) positioned on opposite sides of the body assembly (844) and proximate to the shield-contact portion (848). The shield-engaging portion (846) is configured to securely engage the transmission-line assembly (802) of FIG. 9A at the force-receiving portion (828) of the transmission-line assembly (802). The shield-engaging portion (846) and the shield-contact portion (848) define the shield-receiving zone (850) configured to receive, at least in part, the force-receiving portion (828) of the transmission-line assembly (802) of FIG. 9A. As further depicted in FIG. 10A, the wear-resistant assembly (824) is configured to securely receive, at least in part, (at top section of) the force-receiving portion (828) of the transmission-line assembly (802). The wear-resistant assembly (824) is configured to provide a wear resistant material or assembly configured to resist, at least in part, wear resulting from repeated application of the vehicular load (902) to the wear-resistant assembly (824), thereby reducing opportunity to wear out the transmission-line assembly (802) of FIG. 9A, thereby prolonging the life of the sensor assembly (12).

To summarize FIG. 9D, the shield assembly (808) of FIG. 9A includes the wear-resistant assembly (824) configured to resist, at least in part, wear in response to reception of repeated applications of the vehicular load (902), in such a way as to reduce wear to the shield assembly (808).

FIGS. 10A and 10B depict cross-sectional views of schematic examples of the sensor assembly (12) in an assembled state. According to FIG. 10A, no load is applied to the sensor assembly (12) in the unstressed condition. According to FIG. 10B, the vehicular load (902) is applied to the sensor assembly (12) in the stressed condition at the point of discontinuity (that is, at the position where the vehicular load (902) is received by the sensor assembly (12)).

The shield assembly (808) includes, for example, the tubular assembly (818) that is manufactured by an extrusion process (for sake of simplicity). The channel (819) of the tubular assembly (818) of the shield assembly (808) is configured to receive the core assembly (806) which is carried by the carrier body (838). The carrier body (838) engages the core-anchor assembly (825) of the shield assembly (808). As depicted in FIG. 10A, the shield-engagement portion (836) is configured to engage with (contact) the core-anchor assembly (825).

A positioning assembly (812), such as a nylon tubing, is configured to contact the inner wall of the tubular assembly (818) of the shield assembly (808), at opposite sides of the carrier body (838), preferably at a position located underneath and proximate to (and underneath) the shield-engagement portion (836). As depicted in FIG. 10A, a retainer assembly (832) extends from the inner wall of the tubular assembly (818), and is configured to keep the position of the positioning assembly (812) in a stationary condition while the carrier body (838) is installed in the channel (819) of the tubular assembly (818). In accordance with an option, the core-anchor assembly (825) may include a portion of masking tape positioned between the core-anchor assembly (825) and the carrier body (838). The positioning assembly (812) is configured to behave much like a spring assembly or a biasing assembly that biases the carrier body (838) to the stationary position relative to the shield assembly (808) while the vehicular load (902) is received by the sensor assembly (12) as depicted in FIG. 10B.

Figure 11:
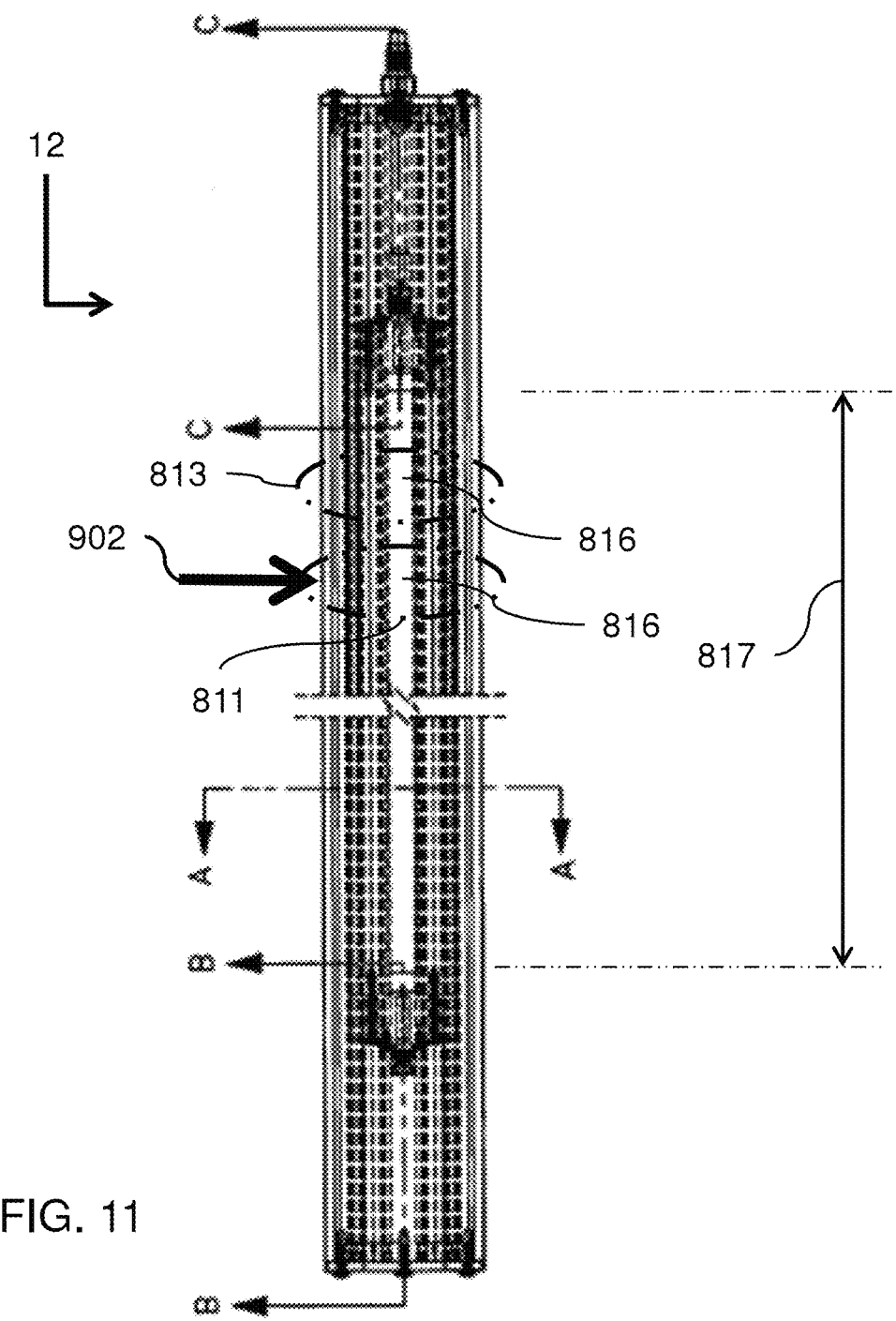
FIG. 11 depicts a top view of a schematic example of a sensor assembly.

The core assembly (806) and the shield assembly (808) are positioned relative to each other so as to form a gap (816) therebetween. The gap (816) depicted in FIG. 10A (the unstressed condition) is larger than (or different from) the gap (816) depicted in FIG. 10B (the stressed condition) as a result of the application of the vehicular load (902) to a portion of the transmission-line assembly (802). Referring to FIG. 10A, the shield assembly (808) receives none of the vehicular load (902), and the gap (816) remains constant (in the unstressed condition) along a length (817) of the transmission-line assembly (802). The length (817) of the transmission-line assembly (802) is depicted in FIG. 11. Referring to FIG. 10B, for the case where the vehicular load (902) is applied to and received by the shield assembly (808), the shield assembly (808) resiliently deforms in such a way that the gap (816) of FIG. 10B (in the stressed condition) is smaller than the gap (816) depicted in FIG. 10A (in the unstressed condition) at a region (811) of the transmission-line assembly (802) that receives the vehicular load (902) at a position along the length (817) of the transmission-line assembly (802). The region (811) is depicted in FIG. 11.

Figure 13:
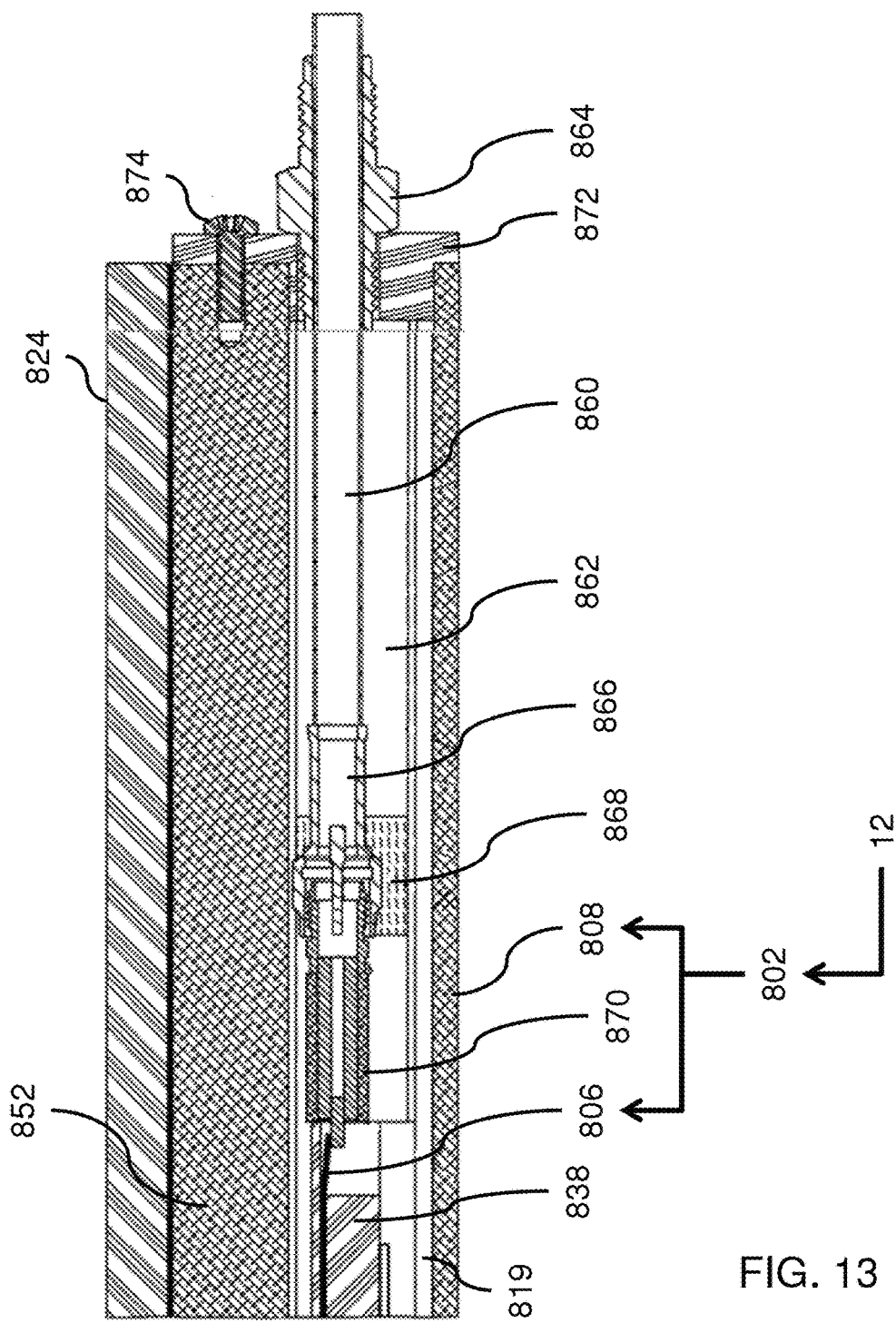
FIG. 13 depicts a cross section along a line C-C of a schematic example of the sensor assembly of FIG. 11.
Figure 14:
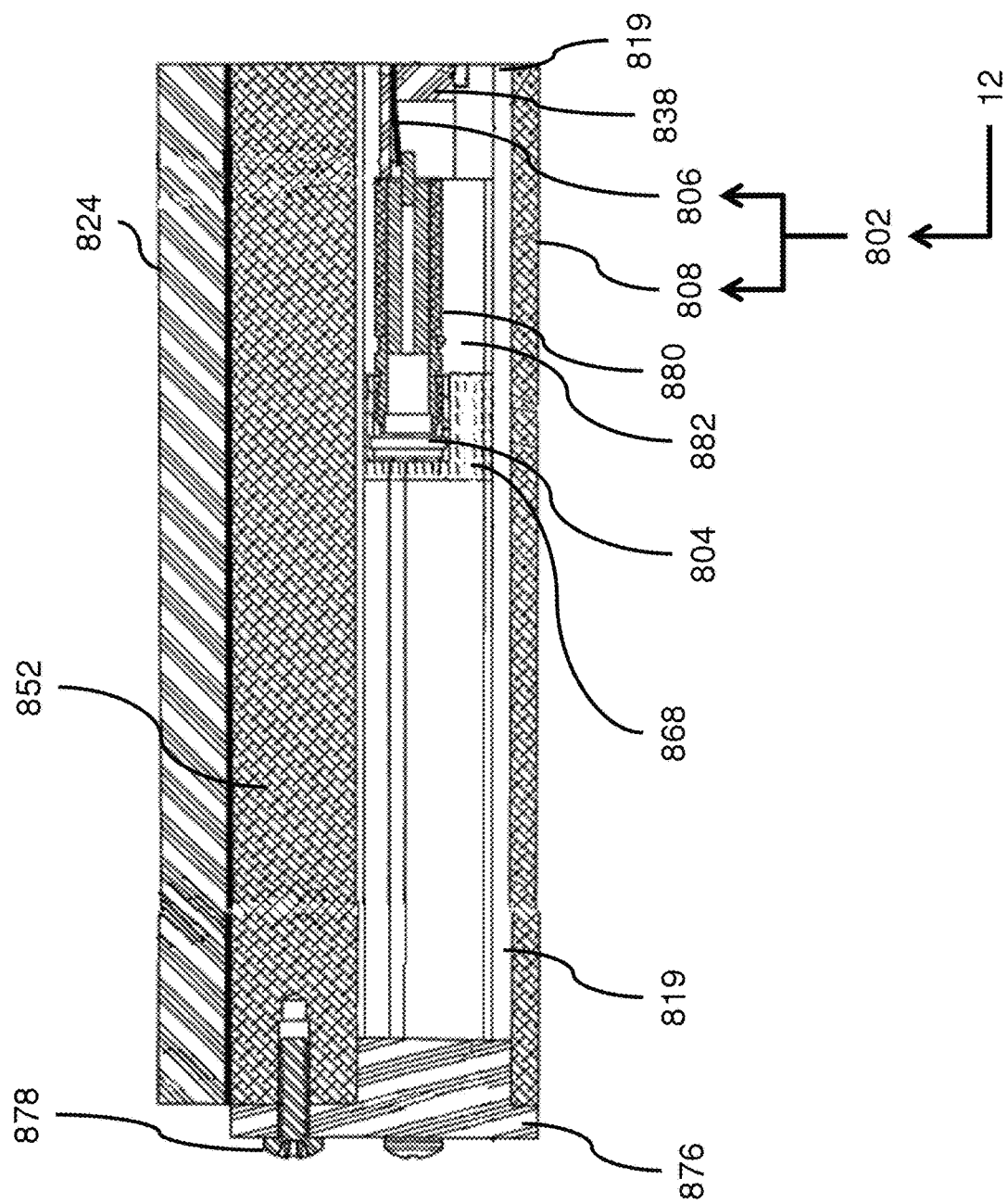
FIG. 14 depicts a cross section along a line B-B of a schematic example of the sensor assembly of FIG. 11.

For both the stressed condition (FIG. 10B) and the unstressed condition (FIG. 10A), the core assembly (806) remains stationary relative to the shield assembly (808). As depicted in FIG. 10A, a termination impedance (804) is connected to the transmission-line assembly (802); that is, connected to or between the shield assembly (808) and the core assembly (806) at a first terminal end portion. The first terminal end portion is depicted in FIG. 14 at the terminator-connector assembly (880). The ETDR system (906) is configured to be operatively connected to the transmission-line assembly (802) (connectable to the shield assembly (808) and the core assembly (806)), at a second terminal end portion that is spaced apart from the first terminal end portion. The second terminal end portion is depicted in FIG. 13 at the signal interface (870). As depicted in FIG. 10A, the termination impedance (804) matches the impedance of the transmission-line assembly (802). In the unstressed condition of FIG. 10A, there are no reflections generated in the transmission-line assembly (802) that can be detected by the ETDR system (906). In the stressed condition of FIG. 10B, reflections generated in the transmission-line assembly (802) can be detected by the ETDR system (906). The ETDR system (906) is configured to generate signals and send the signals into the transmission-line assembly (802). For the case (FIG. 10A) where the termination impedance (804) matches the impedance of the transmission-line assembly (802), there are no electrical signal reflections generated in the transmission-line assembly (802). For the case (FIG. 10B) where the termination impedance (804) does not match the impedance of the transmission-line assembly (802), there are electrical signal reflections generated in the transmission-line assembly (802).

As depicted in FIG. 10B (the stressed condition), the positioning assembly (812) is configured to maintain the position of the carrier body (838) in a stationary position within the channel (819) while the vehicular load (902) is transmitted to and through the shield assembly (808). The shield assembly (808) is configured to resiliently deform, at the region (811) of FIG. 11, in response to the application of the vehicular load (902) to the shield assembly (808); that is, as the vehicular load (902) is transmitted through the shield assembly (808), the portion or section of the shield assembly (808), such as the elastically-deformable portion (820), resiliently deforms but the core assembly (806) and the carrier body (838) remain stationary as the shield assembly (808) deforms resiliently. As depicted in FIG. 10B, the termination impedance (804) does not match the impedance of the transmission-line assembly (802) because the shield assembly (808) has been resiliently deformed, and thus there are electrical reflections generated in the transmission-line assembly (802) that can be detected by the ETDR system (906). Since the termination impedance (804) no longer matches the impedance of the transmission-line assembly (802) as a result of the shield assembly (808) becoming resiliently deformed (FIG. 10B), there are electrical signal reflections generated in the transmission-line assembly (802) at the region (811) of FIG. 11.

Once the vehicular load (902) is no longer applied to the shield assembly (808) (depicted in the unstressed condition of FIG. 10A) at the region (813) (depicted in FIG. 11), the shield assembly (808) regains its original shape (unstressed shape) because the shield assembly (808) is resiliently deformable; in this case, the impedances are matched between the termination impedance (804) and the transmission-line assembly (802), and no electrical reflections are generated in the sensor (912), and the ETDR system (906) does not detect any electrical reflections (since there are none to detect).

Referring to the example of FIG. 10A, the positioning assembly (812) is stiff, and supports the carrier body (838) (also called a polyethylene body) or the core assembly (806) (also called a copper strip). For the case where the positioning assembly (812) includes the nylon tube, the nylon tube does not creep (has a relatively low creep). The positioning assembly (812) is configured to provide a spring-biasing force that constantly pushes the carrier body (838) against the core-anchor assembly (825) so that the shield assembly (808) is held in a stationary position even though the core assembly (806) resiliently reforms, at least in part, relative to the position of the shield assembly (808) at the elastically-deformable portion (820) positioned on each side of the force-transfer portion (830).

The characteristic impedance of the transmission-line assembly (802) is calculated (or is measured) from a bottom of top edge of core assembly (806), that is the electrical conductor or a copper strip, to a bottom edge of the tubular assembly (818) at a position proximate to the force-transfer portion (830). By way of example, the characteristic impedance is about 50 ohms.

For the case where the sensor assembly (12) is about nine to thirteen feet long (for example), there is a way to insert, and to hold in place, the carrier body (838) having the core assembly (806) in the tubular assembly (818) or the shield assembly (808). One way is to use the positioning assembly (812). It will be appreciated that the longitudinal length of the sensor assembly (12) may be made a long or as short as may be required to suit a specific application and/or the roadway. Initially, the carrier body (838) having the core assembly (806) is slide fitted into the tubular assembly (818). Then, the nylon tube is inserted into the middle space located immediately below the carrier body (838) having the core assembly (806). Then, a wedge-shaped block is pushed through the tubular assembly (818) and then the wedge-shaped block pushes the nylon tubes into the opposite respective lower corner areas of the channel (819) of the tubular assembly (818).

The tubular assembly (818), or the shield assembly (808), includes an aluminum alloy that has a linear deflection profile that is not temperature dependent. The top half of the sensor assembly (12) or the shield assembly (808) is configured to resiliently deform or resiliently deflect (move) in response to receiving the vehicular load (902) (which is depicted in FIG. 10B) in such a way that once the vehicular load (902) is removed from the shield assembly (808), the shield assembly (808) returns to an unloaded shape or position (which is depicted in FIG. 10A). A bottom half of the sensor assembly (12) or the shield assembly (808) or the tubular assembly (818) remains isolated, or retains shape, or does not interfere with movement of the upper half of the sensor assembly (12) or the shield assembly (808) or the tubular assembly (818). It will be appreciated that the half-way zone of the sensor assembly (12) is defined as a middle extending edge extending through the core-anchor assembly (825). In accordance with a preferred configuration, the sensor assembly (12) or the force-transfer portion (830) of the shield assembly (808) is configured to deflect by about five thousandths of an inch relative to the top surface of the core assembly (806) that faces the bottom section of the force-transfer portion (830) of the tubular assembly (818) or the shield assembly (808).

To summarize FIGS. 10A and 10B, the electrical transmission-line parameter includes the transmission-line impedance configured to elastically change, at least in part, in response to the reception of the vehicular load (902) from the moving vehicle (900) from between: (A) a no-load characteristic impedance (depicted in FIG. 10A) once none of the vehicular load (902) is received from the moving vehicle (900), and (B) a loaded impedance (depicted in FIG. 10B) once the vehicular load (902) is received, at least in part, from the moving vehicle (900). The electrical transmission-line parameter includes the transmission-line impedance configured to change, at least in part, in response to the reception of the vehicular load (902) from the moving vehicle (900) in such a way that an aspect of the alternating current carried, at least in part, by the transmission-line assembly (802): (A) changes in response to the transmission-line assembly (802) receiving the vehicular load (902), and (B) remains constant in response to the reception of none of the vehicular load (902) from the moving vehicle (900) in such a way that the aspect of the alternating current remains constant. The sensor assembly (12) further includes the termination impedance (804) configured to terminate the transmission-line assembly (802). The sensor assembly (12) further includes the termination impedance (804) configured to terminate the transmission-line assembly (802), and the termination impedance (804) is impedance matched with the transmission-line assembly (802). The transmission-line assembly (802) includes: (A) the core assembly (806) that is, at least in part, electrically conductive, and (B) the shield assembly (808) that is, at least in part, electrically conductive, and the shield assembly (808) surrounds, at least in part, the core assembly (806). The transmission-line assembly (802) includes: (A) the core assembly (806) that is, at least in part, electrically conductive, and (B) the shield assembly (808) that is, at least in part, electrically conductive and surrounds the core assembly (806), and the core assembly (806) and the shield assembly (808) are aligned, at least in part, longitudinally coaxial relative to each other. The shield assembly (808) is configured to support, at least in part, the core assembly (806). The sensor assembly (12) further includes a positioning assembly (812) configured to position, at least in part, the core assembly (806) relative to the shield assembly (808) at a stationary position relative to the shield assembly (808). The transmission-line assembly (802) includes: (A) the core assembly (806) that is, at least in part, electrically conductive, and (B) the shield assembly (808) that is, at least in part, electrically conductive and surrounds the core assembly (806), and the shield assembly (808) is configured to elastically deform in response to the shield assembly (808) receiving the vehicular load (902) from the moving vehicle (900). The transmission-line assembly (802) further includes the gap (816) formed, at least in part, between the core assembly (806) and the shield assembly (808). The transmission-line assembly (802) further includes the gap (816) formed, at least in part, between the core assembly (806) and the shield assembly (808), and the shield assembly (808) is configured to elastically deform in response to the reception of the vehicular load (902) from the moving vehicle (900) by the shield assembly (808), in such a way that an aspect of the gap (816) varies depending on a magnitude of the vehicular load (902) imparted, at least in part, to the shield assembly (808). The shield assembly (808) includes the tubular assembly (818) that forms the channel (819) configured to receive the core assembly (806).

FIG. 11 depicts a top view of a schematic example of a sensor assembly (12).

For the sake of simplicity, at the region (811), the vehicular load (902) is depicted as being applied to a side section of the housing of the sensor assembly (12). It is understood that the vehicular load (902) is, in fact, being applied to a top section of the housing of the sensor assembly (12) as depicted in FIG. 10B. Where the vehicular load (902) is applied to the sensor assembly (12), the gap (816), as depicted in FIG. 10B, in the region (811) is smaller than the gap (816) in a region (813). In the region (813), none of the vehicular load (902) is applied to the region (813) and, therefore, the gap (816), as depicted in FIG. 10A, in the region (813) is larger than the gap (816) in the region (811). The ETDR system (906) of FIG. 10B is configured to detect no reflections at the region (813), because the gap (816) exists in an impedance-matched condition, and detects a reflection at the region (811) since the gap (816) in the region (811) exists in an impedance-mismatched condition.

Figure 12A:
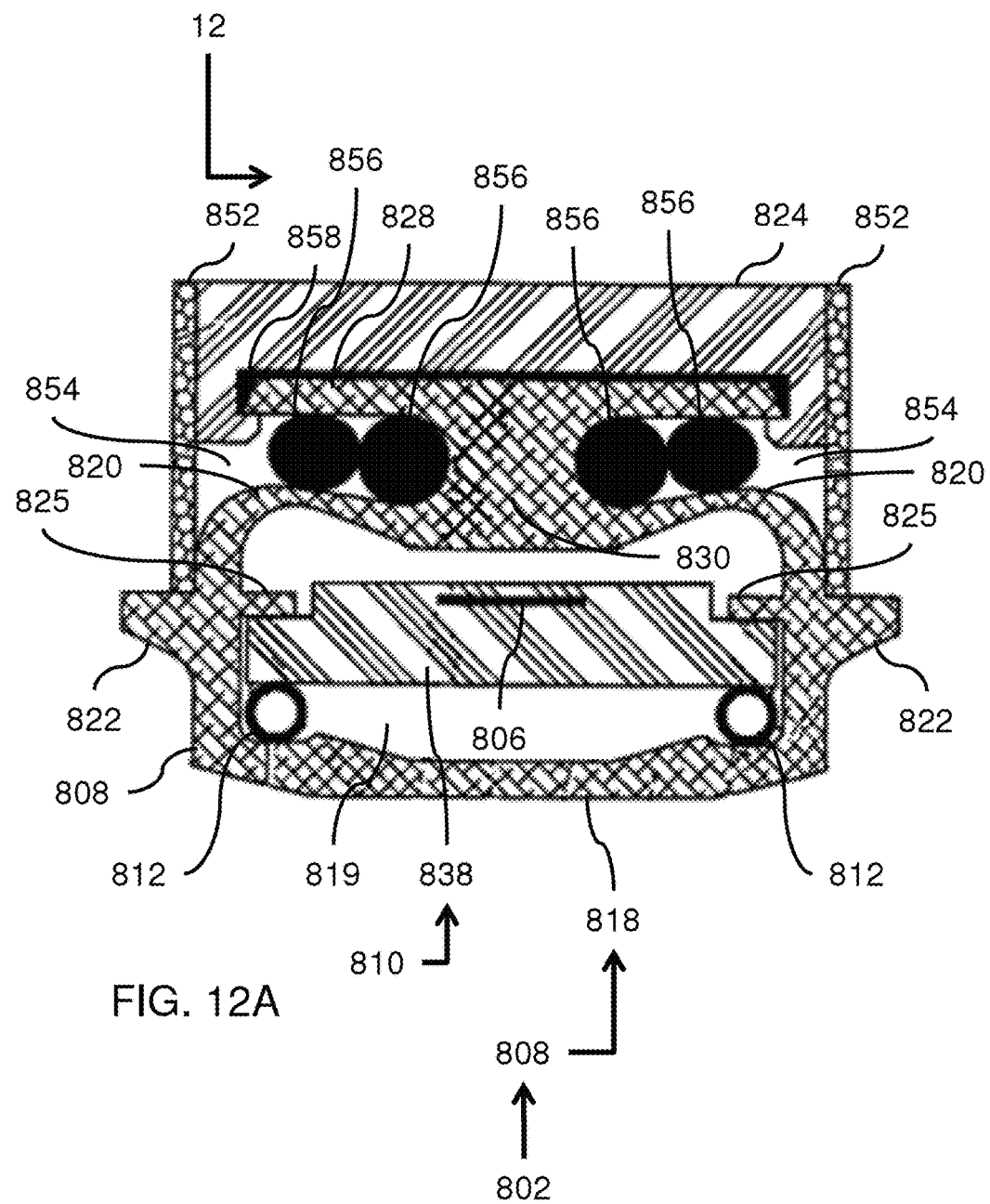
FIGS. 12A and 12B depict a cross section along a line A-A of a schematic example of the sensor assembly of FIG. 11.
Figure 12B:
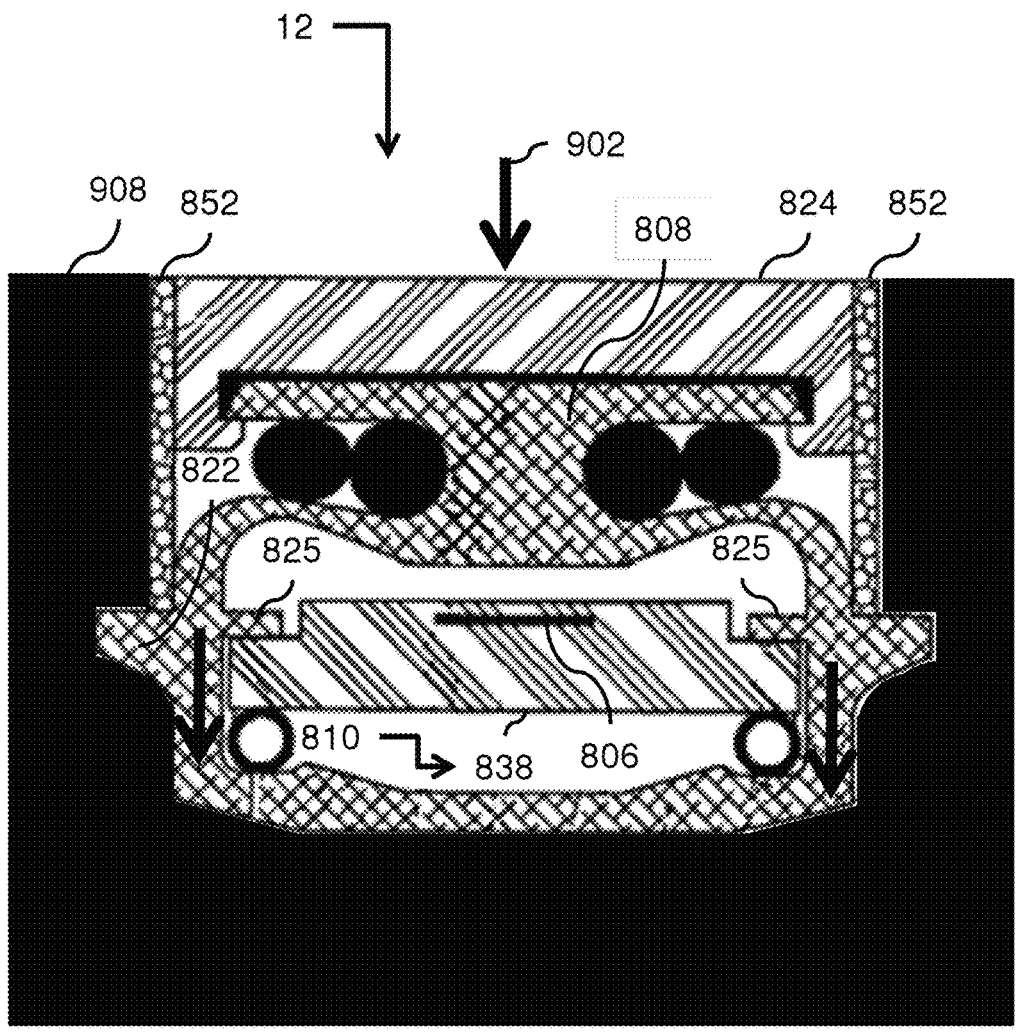

FIGS. 12A and 12B depict a cross section taken along a line A-A of a schematic example of the sensor assembly (12) of FIG. 11. FIG. 12A depicts the sensor assembly (12) not installed to a vehicular roadway (908) of FIG. 8A. FIG. 12B depicts the sensor assembly (12) operatively installed in the vehicular roadway (908).

The transmission-line assembly (802) further includes an adhesive-backed closed-cell neoprene foam (852), a sealer material (854), a foam assembly (856), and a sealer (858). The adhesive-backed closed-cell neoprene foam (852) is hereafter referred to as the foam (852).

Referring to FIG. 12A, the foam assembly (856) is positioned in a space formed between the force-receiving portion (828) and the elastically-deformable portion (820) on opposite sides of the force-transfer portion (830). The foam assembly (856) includes, by way of example, a foam tube or foam tubes. The sealer material (854) fills, at least in part, a void formed between an outer surface of the shield assembly (808) or the tubular assembly (818) and the foam (852). The sealer material (854) is configured to keep the foam assembly (856) securely positioned in the space formed between the force-receiving portion (828) and the elastically-deformable portion (820) on opposite sides of the force-transfer portion (830). The adhesive-backed closed-cell neoprene foam (852) is positioned on opposite sides of the shield assembly (808), on opposite sides of the wear-resistant assembly (824), further sealing the inner construction of the transmission-line assembly (802). The sealer (858) is positioned between the top section of the force-receiving portion (828) of the shield assembly (808) and the wear-resistant assembly (824).

FIG. 12A depicts no application of the vehicular load (902) to the shield assembly (808) via the wear-resistant assembly (824). FIG. 12B depicts application of the vehicular load (902) to the shield assembly (808) via the wear-resistant assembly (824). In accordance with FIG. 12B, a roadway channel is formed in the vehicular roadway (908), and the housing that houses the transmission-line assembly (802) is received, at least in part, in the roadway channel in such a way that the wear-resistant assembly (824) is positioned flush with the top section of the vehicular roadway (908) (within acceptable tolerances).

Referring to FIG. 12A, the tubular assembly (818) includes an aluminum alloy; the tubular assembly (818), which may be called a resiliently flexible frame. The resiliently flexible frame is shaped from a block of aluminum. The resiliently flexible frame is configured to be resiliently deformable under load. Achieving a reliable relative positioning of the core assembly (806) (the copper strip housed in the carrier assembly (810)) to a reference surface, such as the bottom of the tubular assembly (818), may be achieved by the resiliently flexible frame. The core assembly (806) or the copper strip is located or positioned in a chamber defined by the tubular assembly (818). The impedance of the core assembly (806) and the shield assembly (808) may be set or defined with enough precision (exactness) in such a way that the impedance may be a magnitude for an acceptable range of the analog circuits used in FIG. 1a. The impedance may be controlled by using polyethylene in the carrier body (838); polyethylene is a relatively lower loss material (low leakage); it is a low dielectric constant material that provides an acceptable material so that the copper strip or the core assembly (806) may be positioned within the tubular assembly (818) or the shield assembly (808). The tubular assembly (818) may be called the resiliently flexible frame.

It is expected that thermal expansion required for the tubular assembly (818) may be very high. Any changes in shape of the tubular assembly (818) may arise on account of changes in the environmental temperature since the sensor assembly (12) is to be positioned in the vehicular roadway (908) of FIG. 8A, and is to be exposed to relatively higher temperature changes due to changes in seasonal weather. A solution to the problem of temperature changes is to physically clamp the carrier assembly (810) having the polyethylene to prevent movement on account of thermal expansion and/or contraction (in response to changes in environmental temperature). In this way, the carrier assembly (810) is physically restricted from moving and changing shape (e.g. the edges are drawn flat, but during extrusion they may be curved upwards as a result of a manufacturing artifact). Another option is to have the carrier assembly (810) include polystyrene (as an alternative) since this material (or any material that has a close or similar dielectric constant to polyethylene but not as low). If the thermal expansion coefficient is a quarter of polyethylene, this may be less of an issue; relatively more rigidity may allow for easier handling of the carrier assembly (810). The tubular assembly (818) or the shield assembly (808) may be manufactured from extruded aluminum. It is preferred to use a small form factor for the tubular assembly (818).

Referring to the example of FIG. 12A, the force-transfer portion (830) extends downwardly from a central portion of the force-receiving portion (828), and attaches to a top section of the tubular assembly (818). The force-receiving portion (828), the force-transfer portion (830) and the elastically-deformable portion (820) combine to form opposite facing grooves positioned on opposite sides of the force-transfer portion (830). The opposite facing grooves are configured to receive the foam assembly (856). The foam assembly (856) is configured to prevent unwanted ingress (access) of contaminants, ice, dirt, from entering the opposite facing grooves located under the force-receiving portion (828); some small amount of water and contamination may be acceptable within the opposite facing grooves, provided the contamination does not interfere with the operation of the shield assembly (808); that is, the ability of the shield assembly (808) to resiliently deform without inadvertent interference thus maintaining the operational integrity of the sensor assembly (12). The foam assembly (856) may include a foam material to fill the shape of the opposite facing grooves precisely if possible (the shape conforms to the shape of the opposite facing grooves for instance). The foam assembly (856) provides any material suitable for filling the space or the opposite facing grooves located on the opposite sides of the force-transfer portion (830).

Referring to the example of FIG. 12A and FIG. 12B, the sealer (858) is placed between the wear-resistant assembly (824) and the force-receiving portion (828). The sealer (858) includes, for example, urethane. The vehicular roadway (908) is not expected to be completely level and flush. Therefore, an option is to grind the top facing surface of the wear-resistant assembly (824) so that the top of the wear-resistant assembly (824) matches the local top surface or profile of the vehicular roadway (908); the wear-resistant assembly (824), such as a plastic material, is shaped to match and to be flush with the road surface of the vehicular roadway (908). The wear-resistant assembly (824) is reshaped to fit local road conditions. For the case where the wear-resistant assembly (824) becomes entirely removed to match the road surface, then the roadway channel that receives the sensor assembly (12) needs to be reformed to become deeper. It is not recommended to grind down or reform the force-receiving portion (828). The wear-resistant assembly (824) may include a relatively very dense plastic material that is abrasion resistant, and is configured to transfer force without much, if any, absorption of the vehicular load (902), or tire pressure of the moving vehicle (900), applied to the sensor assembly (12). The wear-resistant assembly (824) should not have much, if any, characteristic of hysteresis, such as a rubber material, that may contract (squish) since the wheel of the vehicle would be gone (or removed) from the sensor assembly (12) or the wear-resistant assembly (824) before the vehicular load (902) is fully transferred to the sensor assembly (12) via the wear-resistant assembly (824). For example, the wear-resistant assembly (824) may include ultra-high-molecular-weight polyethylene material. For the case where the wear-resistant assembly (824) includes ultra-high-molecular-weight polyethylene material, the problem of deflection along a length of the sensor assembly (12) reduces the occurrence of bridging along an edge of a wheel of the moving vehicle (900). The combination of the ultra-high-molecular-weight polyethylene material for the wear-resistant assembly 824), and the urethane sealant for the sealer (858) minimizes the effect of bridging. It will be appreciated that any reference to the wheel is applicable to the tire.

The foam (852) is configured, once installed to do just so, prevent road grout from attaching to the sensor assembly (12) or to the housing of the sensor assembly (12). The foam (852) is positioned on the opposite lateral sides of the sensor assembly (12), and allows the sensor assembly (12) to move in the grout if desired to do just so.

Referring to the example of FIG. 12A, the sensor assembly (12) is configured to be sealed from environmental factors, such as humidity, water, air, etc. The sensor assembly (12) is water tight, air tight, etc. If water were to enter the interior of the sensor assembly (12), the unwanted water may inadvertently change the characteristic impedance of the transmission-line assembly (802), and/or may inadvertently electrically short out the transmission-line assembly (802) (all unwanted events). According to an option, a desiccant package may be positioned in the interior of the sensor assembly (12), within the house of the sensor assembly (12), in any convenient position that may be replaceable when required (if desired). The desiccant package is configured to keep the interior of the sensor assembly (12) relatively dry and moisture free (lower moisture), and may be taped to a stationary position within the sensor assembly (12). In accordance with one option, the desiccant is replaceable; in accordance with another option, the desiccant is not replaceable. For example, the desiccant is configured to remove moisture from the air trapped in the sensor assembly (12) during assembly or manufacturing of the sensor assembly (12).

FIG. 13 depicts a cross section along a line C-C of a schematic example of the sensor assembly (12) of FIG. 11.

In accordance with FIG. 13, the sensor assembly (12) includes (and is not limited to) a sealant (862), a fitting assembly (864), a signal connector (866), a sealing element (868), a signal interface (870), a first end cap (872), and a fastener (874). The core assembly (806) extends axially along the transmission-line assembly (802), and connects to the signal interface (870). The signal interface (870) extends along the longitudinal axis of the transmission-line assembly (802), and is configured to terminate at the sealing element (868) that is stationary positioned at the end of the internal zone of the transmission-line assembly (802). The signal connector (866) extends from a signal cable (860), such as an RG-58 coaxial cable. The RG-58 coaxial cable is a type of coaxial cable used for low-power signal and radio frequency connections, and this cable has a characteristic impedance of either about 50 or about 52 ohms. The sealing element (868) is configured to be connectable to the signal interface (870). The sealant (862) fills in the zone surrounding the signal cable (860) within the interior of the sensor assembly (12). The fitting assembly (864) is fixedly connected to the first end cap (872). The first end cap (872) is attached to the housing of the transmission-line assembly (802) by way of a fastener (874). The signal interface (870) is configured to interface the core assembly (806) to the signal connector (866) of the signal cable (860).

The fitting assembly (864) is configured to permit sealed connection between the signal cable (860) and the first end cap (872). The fitting assembly (864) includes a silicon rubber tubing configured to protect the signal cable (860), and to provide strain relief for the signal cable (860). The signal cable (860) may include the QMA connector, the QN connector (which are quick-connect radio frequency connectors), the SMA connector, or the Type-N connector. For the case where the analogue electronics are mounted or positioned within the housing (as depicted in FIG. 18B), and connected to the core assembly (806) and the shield assembly (808), then the signal cable (860) is no longer required and/or no longer required to extend from the housing of the sensor assembly (12).

A silicon material may be placed around the signal connector (866), and is configured to present a sticky water barrier. An epoxy may be positioned as a seal around the signal cable (860) located inside the sensor assembly (12). The epoxy may provide additional strain relief as well. The epoxy may bond to metal, and acts as a sealing layer.

FIG. 14 depicts a cross section along a line B-B of a schematic example of the sensor assembly (12) of FIG. 11.

The transmission-line assembly (802) further includes (and is not limited to) a terminator-connector assembly (880), a termination block (882), and a second end cap (876). The core assembly (806) axially extends towards and connects to the terminator-connector assembly (880) that is mounted to the termination block (882) that is positioned stationary in the transmission-line assembly (802). The sealing element (868) supports and positions and seals the termination impedance (804). The termination impedance (804) is connected in such a way as to terminate the core assembly (806) and the shield assembly (808). The termination impedance (804) may be, for example, about 50 ohms for the case where the characteristic impedance of the transmission-line assembly (802) is about 50 ohms. The impedance of the termination impedance (804) does not change during application of the vehicular load (902) (depicted in FIG. 11) to the shield assembly (808). The fastener (878) attaches the second end cap (876) to the end of the housing of the transmission-line assembly (802).

The terminator-connector assembly (880) is configured to connect the termination impedance (804) to the core assembly (806). The terminator-connector assembly (880) is also called an extended dielectric connector. The termination block (882) supports the terminator-connector assembly (880), and keeps the terminator-connector assembly (880) electrically isolated. The terminator-connector assembly (880) is configured to electrically connect a first terminal of the termination impedance (804) to the core assembly (806). The termination block (882) is configured to electrically connect a second terminal of the termination impedance (804) to the shield assembly (808) (with the aluminum alloy). In accordance with an example, the terminator-connector assembly (880) is soldered to the core assembly (806). The termination block (882) and the terminator-connector assembly (880) are configured to not deflect in response to the vehicular load (902) being received by the shield assembly (808).

To summarize FIGS. 11, 12A, 12B, 13, 14, the transmission-line assembly (802) includes: (A) the core assembly (806) that is, at least in part, electrically conductive, and (B) the shield assembly (808) that is, at least in part, electrically conductive and surrounds the core assembly (806), and the core assembly (806) and the shield assembly (808) are aligned, at least in part, longitudinally coaxial relative to each other. The sensor assembly (12) further includes the signal interface (870) configured to interface, at least in part, the transmission-line assembly (802) with an electrical time domain reflectometry signal processing system (906).

Figure 15:
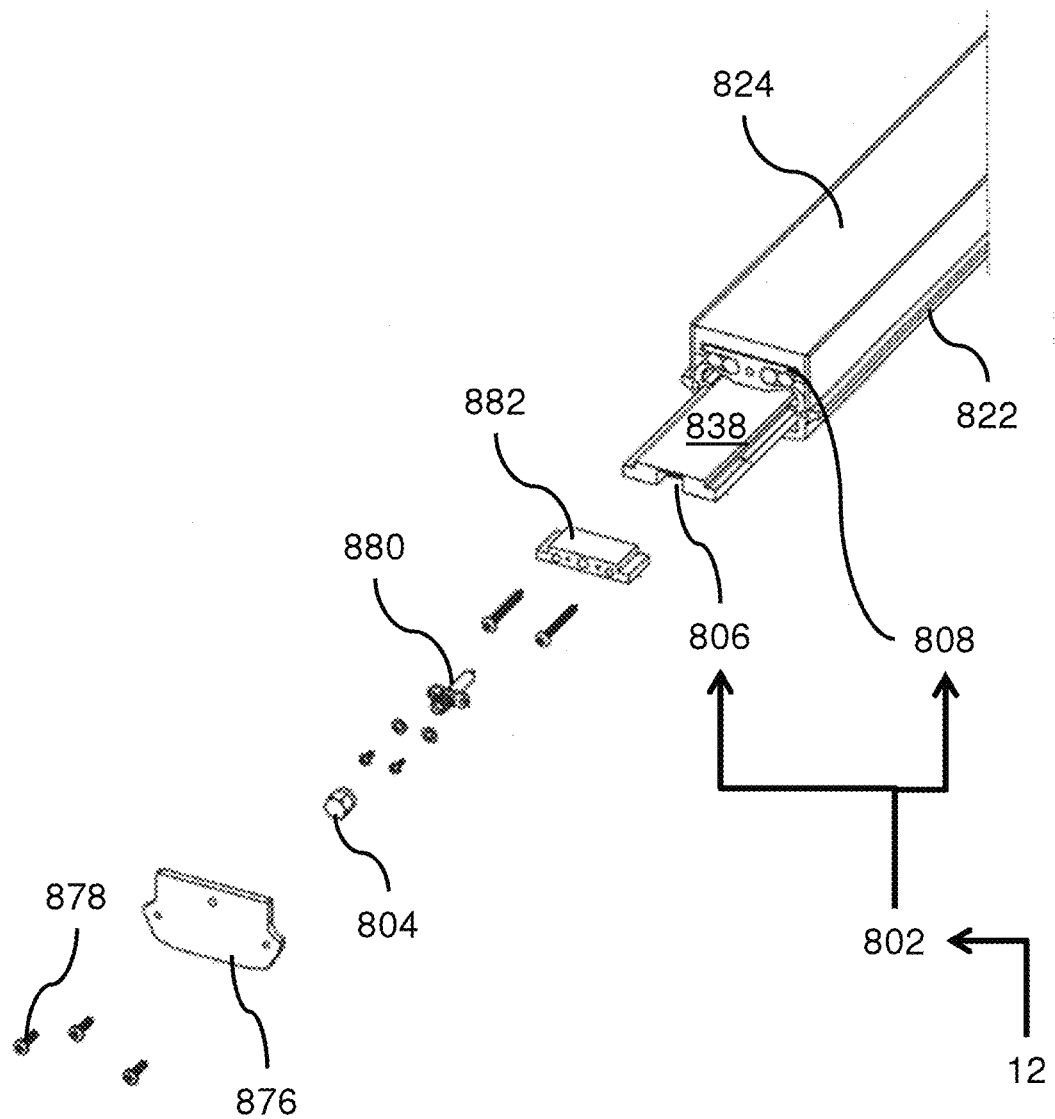
FIG. 15 depicts a perspective view of the schematic example of the sensor assembly.

FIG. 15 depicts a perspective view of the schematic example of the sensor assembly (12).

It is preferred to keep the interior of the sensor assembly (12) sealed in such a way as to prevent unwanted corrosion to the interior components of the sensor assembly (12). For instance, the second end cap (876), and the first end cap (872) of FIG. 13, may be constructed of a milled aluminum alloy or may be plastic injection molded. The second end cap (876) and the first end cap (872) are configured to support the end zones of the sensor assembly (12), and to seal the interior of the sensor assembly (12). For the case where the analog electronics are positioned in the interior of the sensor assembly (12), the analog electronics may be connected directly to the core assembly (806) or to the copper strip. The first end cap (872) and the second end cap (876) are electrically conductive to maintain the shielding of the core assembly (806).

Figure 16A:
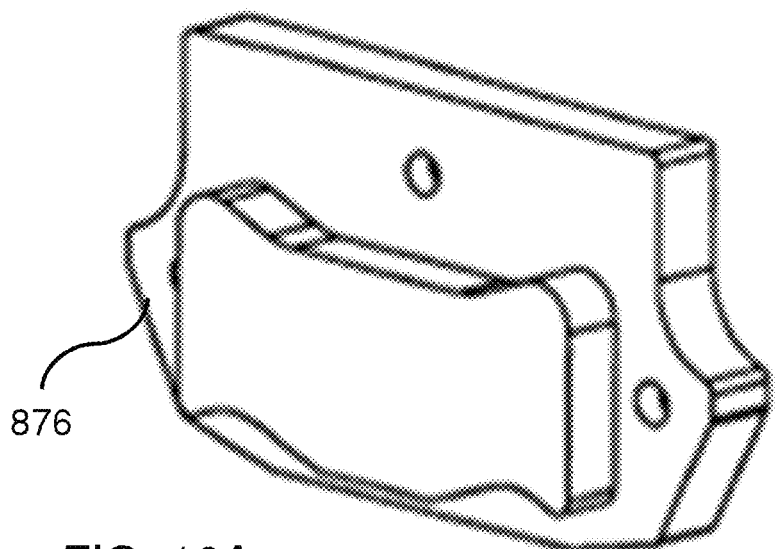
FIGS. 16A and 16B depict a perspective view and a front view, respectively, of a schematic example of a second end cap of a sensor assembly.
Figure 16B:
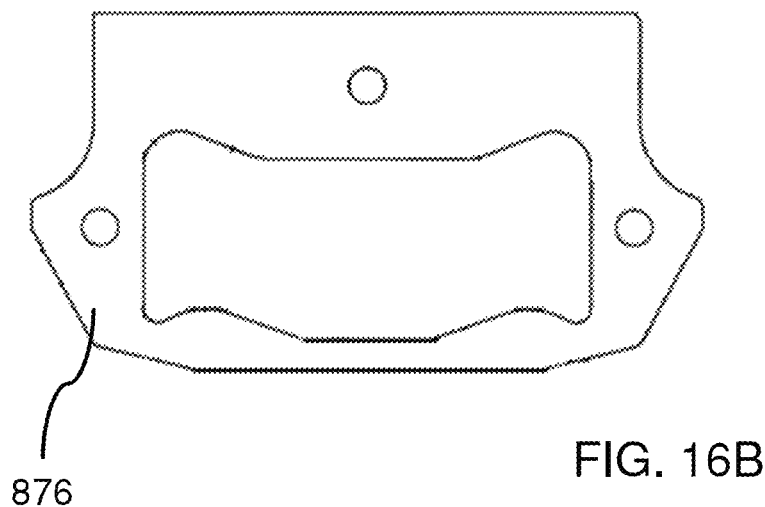

FIGS. 16A and 16B depict a perspective view and a front view, respectively, of a schematic example of the second end cap (876) of the sensor assembly (12) of FIG. 15.

Figure 17A:
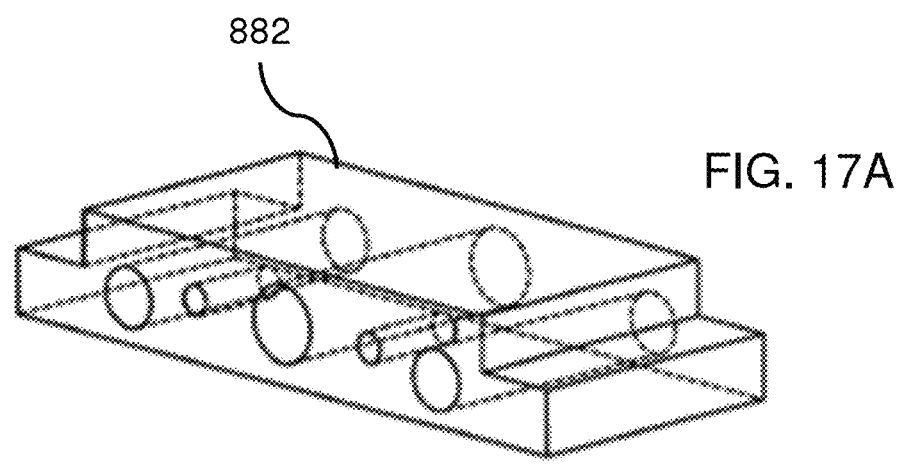
FIGS. 17A and 17B depict a perspective view and a front view, respectively, of a schematic example of a termination block of a sensor assembly.
Figure 17B:
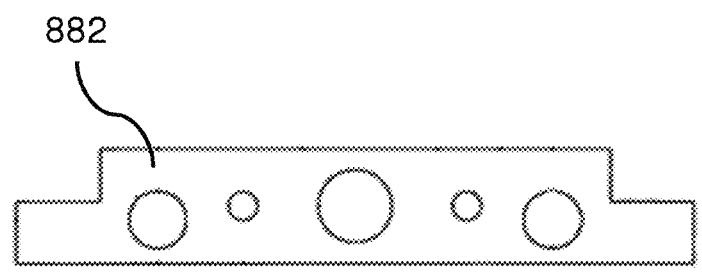

FIGS. 17A and 17B depict a perspective view and a front view, respectively, of a schematic example of the termination block (882) of a sensor assembly (12) of FIG. 15.

Figure 18A:
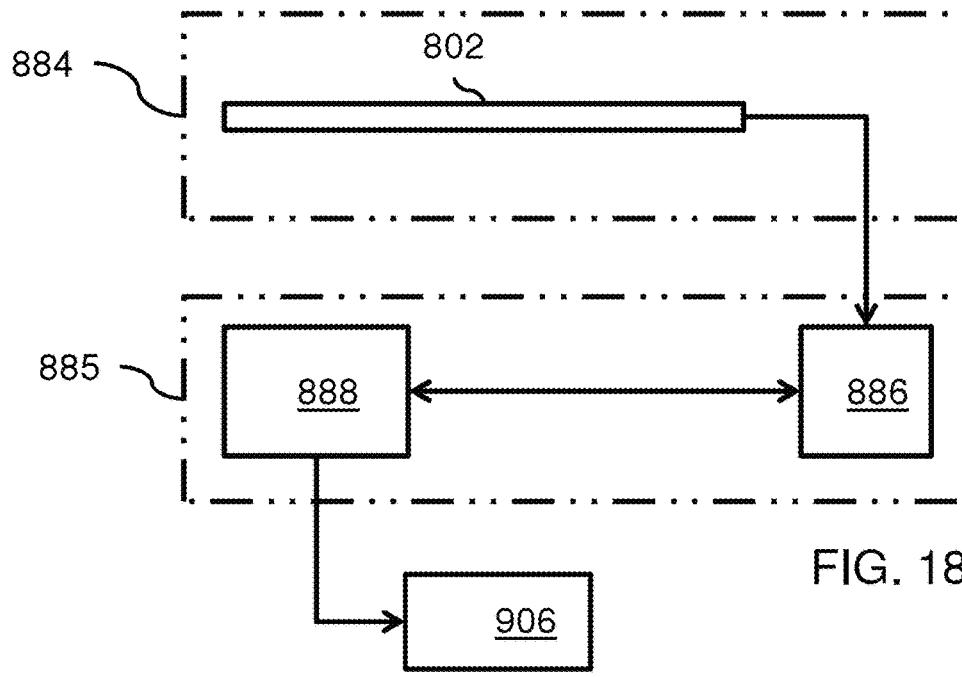
FIGS. 18A, 18B and 18C depict schematic examples of a housing for a sensor assembly.
Figure 18B:
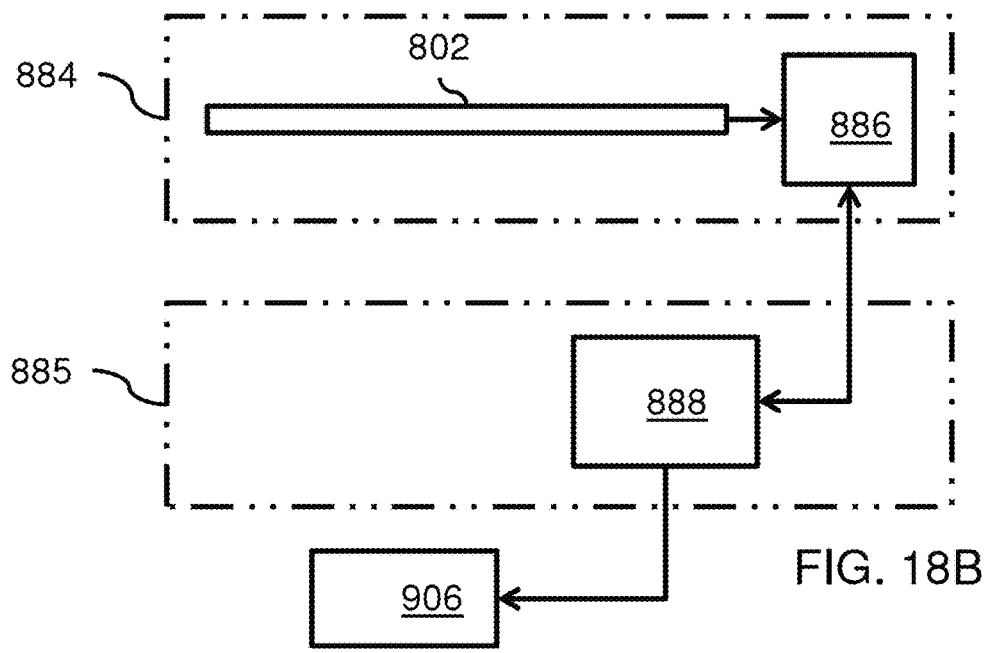
Figure 18C:
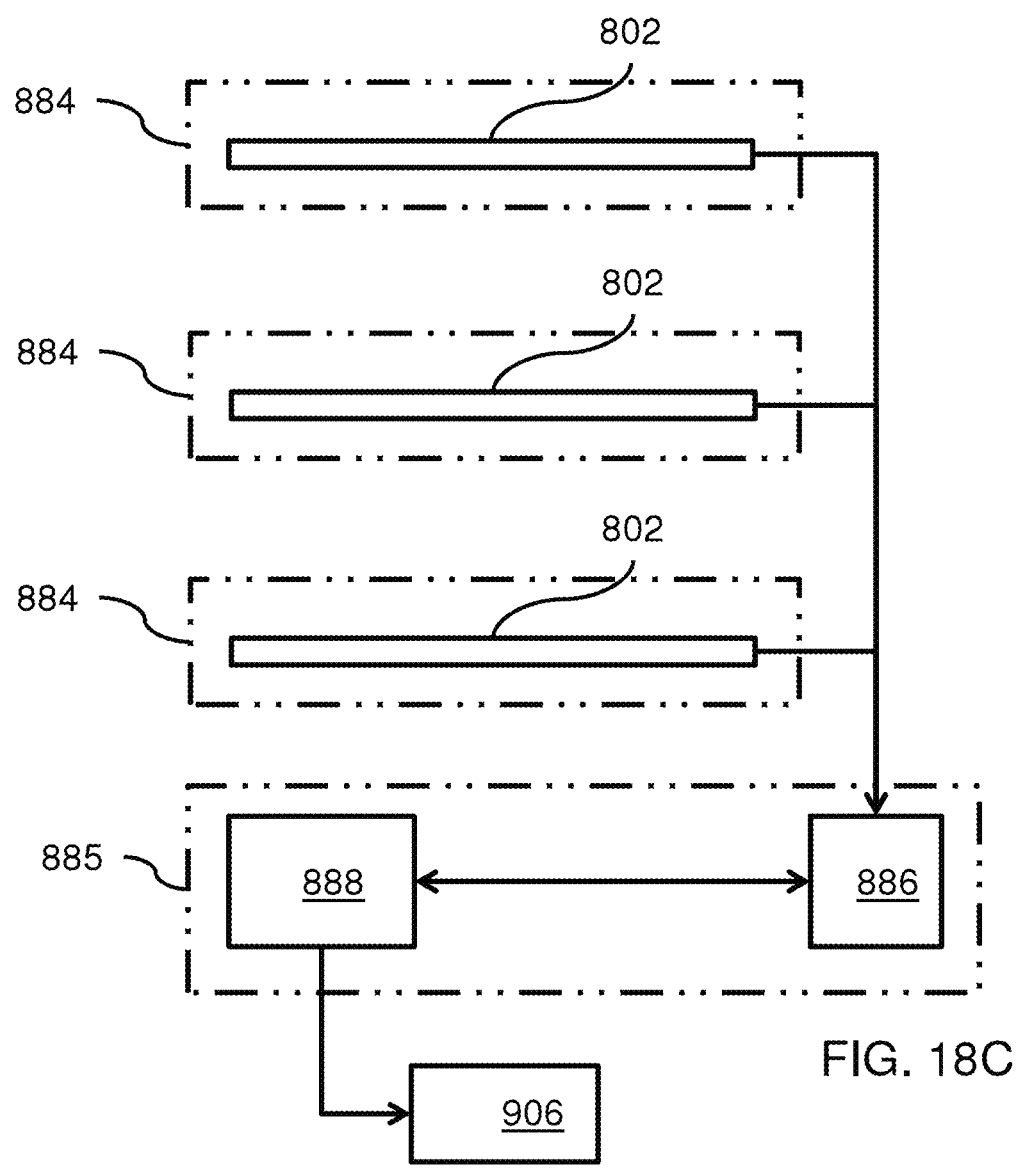

FIGS. 18A, 18B and 18C depict schematic examples of a housing assembly for the sensor assembly (12) of FIG. 8A.

Referring to the option depicted in FIG. 18A, the transmission-line assembly (802) includes a roadway-mountable housing (884) configured to be mounted (in situ) in the vehicular roadway (908) of FIG. 8A. The sensor assembly (12) is mounted in the roadway-mountable housing (884). The transmission-line assembly (802) is configured to be operatively connectable (via a signal wire) to an analog electronics module (886), which is in turn operatively connectable to a digital electronics module (888). The analog electronics module (886) and the digital electronics module (888) are both mounted or received in a remote housing (885) that is positioned remote from the roadway-mountable housing (884). The digital electronics module (888) is operatively connectable to the ETDR system (906).

Referring to the option depicted in FIG. 18B, the transmission-line assembly (802) includes the roadway-mountable housing (884) configured to be mounted (in situ) in the vehicular roadway (908) of FIG. 8A. The transmission-line assembly (802) is configured to be operatively connectable (via a signal wire) to the analog electronics module (886). The sensor assembly (12) and the analog electronics module (886) are mounted in the roadway-mountable housing (884). The analog electronics module (886) is operatively connectable to a digital electronics module (888). The digital electronics module (888) is received in the remote housing (885) that is positioned remote from the roadway-mountable housing (884). The digital electronics module (888) is operatively connectable to the ETDR system (906). A technical advantage of the option of FIG. 18B is that the wire that connects the analog electronics module (886) to the digital electronics module (888) is less prone to electrical noise.

Referring to the option depicted in FIG. 18C, instances of the transmission-line assembly (802) are connected to a single instance of the analog electronics module (886).

Referring to the example of FIG. 18B, the transmission-line assembly (802) and the analog electronics module (886) are positioned in a roadway-mountable housing (884) to be installed into the roadway surface of the vehicular roadway (908) of FIG. 8A, which may be an advantage with this option is that where the analog signals are too sensitive and potentially prone to signal degradation. For example, as depicted in FIG. 18A, the coaxial cable used in the analog electronics module (886) may result in unwanted signal degradation, and may then limit the usable length of coaxial cable extending between the sensor assembly (12) and the analog electronics module (886). Another potential issue arising with the example of FIG. 18A is from a condition called signal spread, in which as the analog signal travels over a distance, the analog signal (unfortunately) becomes spread out (it is preferred to keep the analog signal in as close to the originally generated form as possible). To overcome this issue, a solution is to position or place the analog electronics module (886) (the circuit having primarily analog electronic components) into the roadway-mountable housing (884) along with the transmission-line assembly (802) of the sensor assembly (12) as depicted in FIG. 18B. In this way, problems associated with an asymmetrically-shaped signal are reduced, unwanted signal sensitivity (to noise) is reduced, and/or the installation cost of the sensor assembly (12) is reduced. In accordance with this option, the sensor assembly (12) can be removed from (cut out from) the roadway as an entire unit, and replaced with a new unit when required. The digital electronics module (888) is then connected to the roadway-mountable housing (884).

To summarize FIGS. 18A, 18B, and 18C, the transmission-line assembly (802) is configured to extend across, at least in part, the vehicular roadway (908). The sensor assembly (12) is configured to be buried, at least in part, in the vehicular roadway (908), and the transmission-line assembly (802) is configured to extend across, at least in part, the vehicular roadway (908).

Figure 19A:
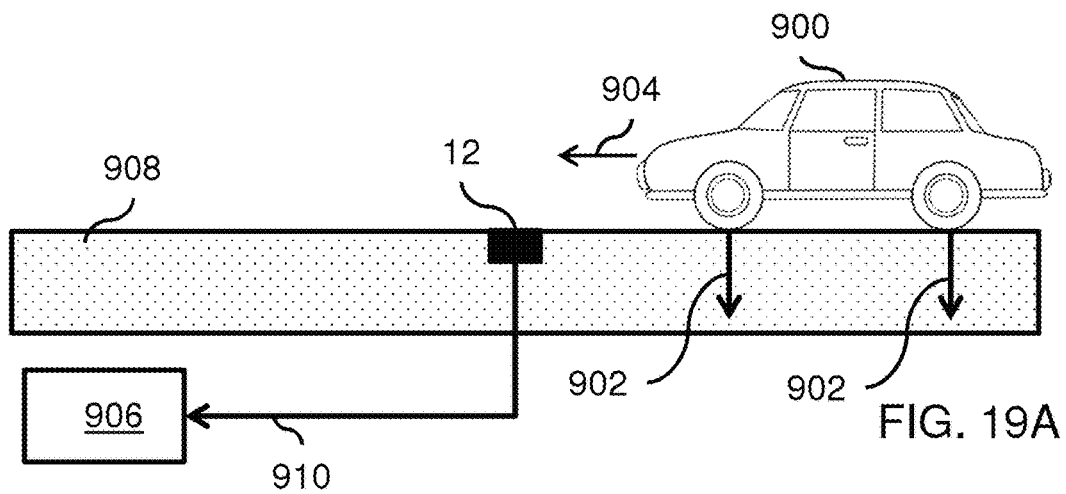
FIGS. 19A, 19B, and 19C depict schematic examples of applications of a sensor assembly.
Figure 19B:
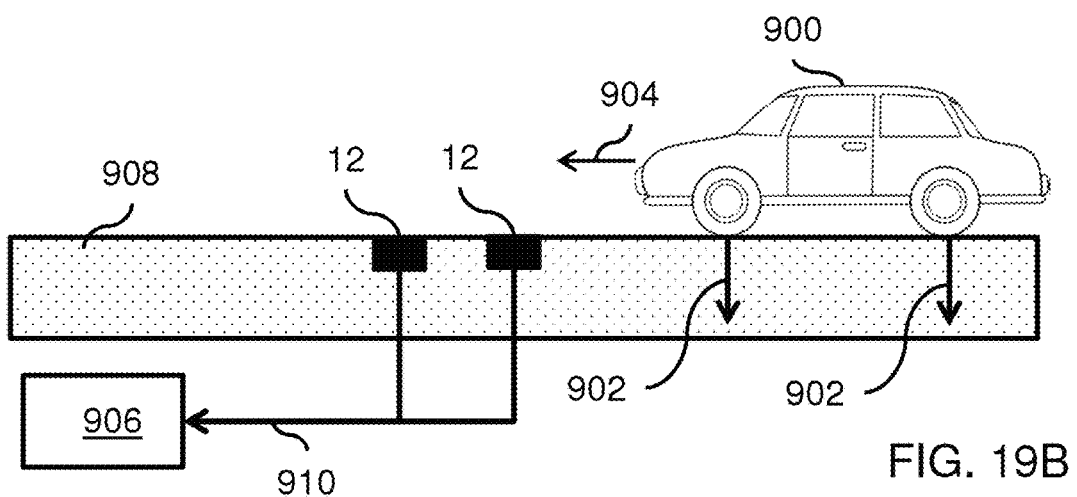
Figure 19C:
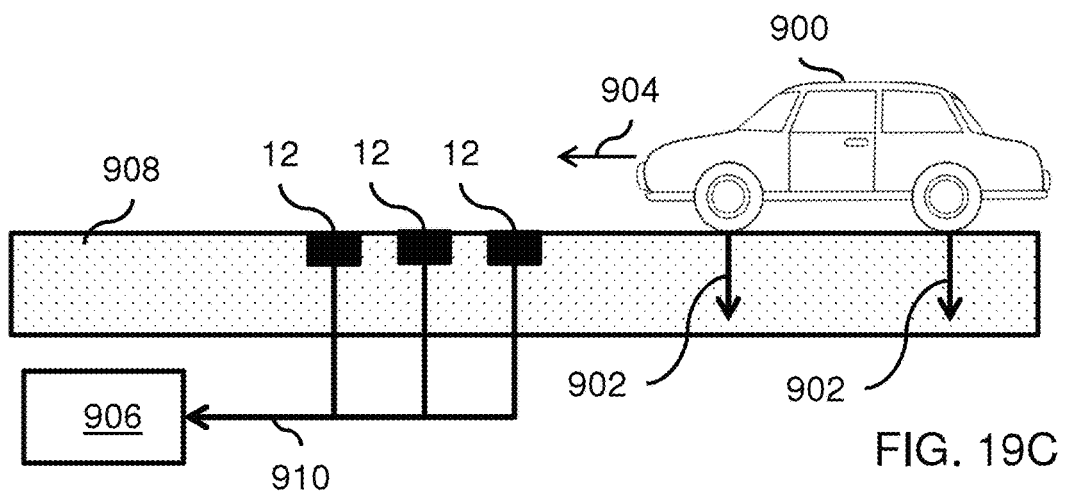

FIGS. 19A, 19B, and 19C depict schematic examples of the manner in which the sensor assembly (12) of FIG. 8A may be applied or used.

In accordance with FIG. 19A, a single instance of the sensor assembly (12) is mounted to the vehicular roadway (908). The vehicular roadway (908) extends longitudinally, and the sensor assembly (12) is mounted to the vehicular roadway (908) in such a way that the sensor assembly (12) extends across the vehicular roadway (908) from side to side or opposite sides of the vehicular roadway (908). The sensor assembly (12) extends at a perpendicular orientation to the vehicular roadway (908).

Depending on the number of sensor assemblies (12) installed in the vehicular roadway (908), various parameters are measurable by the ETDR system (906). Generally speaking, the accuracy of the measurements may be improved by increasing the sampling rate, which is the rate at which measurements are obtained from the sensor assembly (12), such as the number of samples obtained per unit of time.

Case (A) includes detection of an axle width and a lateral position of the axle of the moving vehicle (900). For case (A), the following arrangement of the sensor assembly (12) may be set up and used with the ETDR system (906): a single instance of the sensor assembly (12), two instances of the sensor assembly (12) or three instances of the sensor assembly (12). For case (A), detection includes determining the impedance changes in the transmission-line assembly (802). The wheel of the moving vehicle (900) passes over the sensor assembly (12), and a signal reflection is detected in the sensor assembly (12) by the ETDR system (906). The axle width of the moving vehicle (900) is determined by having two tires strike the sensor assembly (12). The change in impedance may be measured (detected) at two places (positions) along where the transmission-line assembly (802) receives the vehicular load (902). The ETDR system (906) measures the impedance change. Both tires strike the sensor assembly (12), and hence the width of the axle is determined as the spacing between opposite tires that pass over the sensor assembly (12) at about the same instance in time.

Case (B) includes detection of a type of tire used on the moving vehicle (900), such as a single tire or a dual tire configuration. For case (B), the following arrangement of the sensor assembly (12) may be set up and used with the ETDR system (906): a single instance of the sensor assembly (12), two instances of the sensor assembly (12) or three instances of the sensor assembly (12). The overall width of the tire may be detected by the sensor assembly (12). The signal reflections may occur on opposite sides of the tire at the position where the opposite sides of the tire pass over the sensor assembly (12). It is possible to detect the type of tire as well (such as a single tire or a dual tire or tires placed side by side for heavy-duty vehicles).

Case (C) includes detection of a tire width used on the moving vehicle (900). For case (C), the following arrangement of the sensor assembly (12) may be set up and used with the ETDR system (906): a single instance of the sensor assembly (12), two instances of the sensor assembly (12) or three instances of the sensor assembly (12). As the tires initially pass over the sensor assembly (12), a rising edge in the reflected signal is generated in the sensor assembly (12). As the tires depart from the sensor assembly (12), a falling edge in the reflected signal is generated in the sensor assembly (12). With this information, the width of the tire may be calculated.

Case (D) includes detection of a tire speed or a vehicle speed of the moving vehicle (900). For case (D), the following arrangement of the sensor assembly (12) may be set up and used with the ETDR system (906): two instances of the sensor assembly (12) or three instances of the sensor assembly (12). It may be possible to use a single instance of the sensor assembly (12) for case (D). For case (D), in which there is a single instance of the sensor assembly (12), the sensor assembly (12) provides reflected signals that have a rising edge and a falling edge as the tire rolls over the sensor assembly (12). The ETDR system (906) is configured to examine the rising edge and the falling edge information provided by the sensor assembly (12). The pressure applied to the sensor assembly (12) is ramping up when the tire is rolling on the sensor assembly (12). The pressure applied to the sensor assembly (12) is ramping down when the tire rolls off the sensor assembly (12). The slope of the pressure ramp may indicate an approximation of the speed of moving vehicle (900). For slower moving vehicles, a different pattern or signal profile may be generated, and relatively more digital samples are possible for a given digital sampling rate used with the sensor assembly (12). For faster moving vehicles, a different pattern or signal profile may be generated, and relatively fewer digital samples are possible for the given digital sampling rate used with the sensor assembly (12). It is possible to detect the width of the tire as tire rolls (either completely or partially) over the sensor assembly (12). The width of the tire during the time slices of the reflected signal may be determined at position along the sensor assembly (12), such as pressure profile, impedance profile, etc.

For case (D) in which there are two or more instances of the sensor assembly (12), examination of the rising edge, such as when the tire rolls onto the sensor assembly (12), or the falling edge, such as when the tire rolls off the sensor assembly (12) is performed. Then, [delta_x]/[delta_t] is calculated. It is possible to calculate both the rising edge and the falling edge, and then using averaging to get more accurate data. It is possible to obtain a reasonable sound prediction for a single instance of the sensor assembly (12) by examining the rising edge and the falling edge, and if the ramp up in pressure to maximum pressure of tire, then ramp off and pressure maximum decreases to zero. From experimentation, distinct difference between slow moving vehicles and fast moving vehicles may require more samples of the signal from the sensor assembly (12) for slow moving vehicles versus fast moving vehicles. For full contact, the initial tire width as the tire rolls on the sensor assembly (12), then full width of tire may be calculated or measured, and then the tire width tapers off. A first view of the measured data may provide width of impedance change on the sensor assembly (12). A second view of the measured data may provide a pressure profile change on the sensor assembly (12).

Case (E) includes detection of a tire weight of a tire used on the moving vehicle (900). For case (E), the following arrangement of the sensor assembly (12) may be set up and used with the ETDR system (906): two instances of the sensor assembly (12) or three instances of the sensor assembly (12). It may be possible to use a single instance of the sensor assembly (12) for case (E). There may be a need for reasonably accurate tire speed to calculate accurate tire weight. This may be performed by mathematical integration over time. The industry standard for weight in motion (WIM) includes using mathematical integration over time. It is expected that there is no limitation on how vehicle speed may be calculated.

Case (F) includes detection of a tire pressure of a tire used on the moving vehicle (900). For case (F), the following arrangement of the sensor assembly (12) may be set up and used with the ETDR system (906): two instances of the sensor assembly (12) or three instances of the sensor assembly (12). It may be possible to use a single instance of the sensor assembly (12) for case (F). The sensor assembly (12) is used in the process of detecting the absolute peak pressure as the tire rolls over the sensor assembly (12), and this provides the tire pressure. The signal from the sensor assembly (12) may be displayed as a three dimensional surface showing a peak wave that indicates the tire pressure. A lower the peak (or impedance) implies a lower tire pressure. As the sensor assembly (12) is resiliently deforming, and the sampling rate is used, slices are taken of the reflected signal in order to identify the peak in the tire profile (the calculate area may be used). Then averaging cross sectional area may be applied. A high peak value is averaged out in order to take into account situations where a pebble is wedged in the tire tread that may create sharp pressure wave through the sensor assembly (12). By using averaging, then the effects of a pebble may be digitally removed (by averaging). Calibration is a process of matching two known elements. Calibration changes for each sensor assembly (12) may be done by individually calibrating each instance of the sensor assembly (12). Then, the calibration for each sensor assembly (12) may be input to the ETDR system (906). There appears to be no limitation on how speed may be calculated. There are two possible methods. Method (1) includes measurement of the peak of pressure, in which the peak value of tire pressure includes a linear pressure of peak measurement and pressure; that is, the sensor assembly (12) is deforming downwards. Method (2) includes measuring the signal peak, and then slicing the signal, calculating the area of that slice, examine and identify a linear relationship, while the area is used for averaging. Units are digital numbers that are measured, and there may be a need to calibrate between digital numbers and actual weights. Calibration gives constant that may be used; there may be a requirement to recalibrate on a periodic basis.

Case (G) includes detection of a vehicle stop-and-go weight and a vehicle speed associated with the moving vehicle (900). For case (G), the following arrangement of the sensor assembly (12) may be set up and used with the ETDR system (906): two instances of the sensor assembly (12) or three instances of the sensor assembly (12). It may not be possible to use a single instance of the sensor assembly (12) for case (G). For case (G), it may not be possible to use a single instance of the sensor assembly (12). Three instances of the sensor assembly (12) may be used. For the case where the vehicle stops on or before the first instance of the sensor assembly (12) may not provide not enough signal information. Speed information may be derived from the second instance of the sensor assembly (12) and from the third instance of the sensor assembly (12). The weight information may be derived from any tire measurement. If the vehicle stops movement, then the sensor assembly (12) cannot provide vehicle speed. For the case where a tire stopping on the sensor assembly (12) or stopping between instances of the sensor assembly (12), then no speed measurement may be possible. To obtain a weight from any tire measurement, there is a need to determine the vehicle speed, if the tire stops on the sensor assembly (12) or stops in between a sensor assembly (12), then is may not be possible to calculate the vehicle speed. For three instances of the sensor assembly (12), if the vehicle stops movement after passing by the first instance of the sensor assembly (12), then speed may be calculated form the next two instances of the sensor assembly (12). For the case where the vehicle moves by the first two instances of the sensor assembly (12), then the information is derived from the first two instances of the sensor assembly (12).

Case (H) includes detection of a vehicle inter-axle spacing associated with the moving vehicle (900). For case (H), the following arrangement of the sensor assembly (12) may be set up and used with the ETDR system (906): two instances of the sensor assembly (12) or three instances of the sensor assembly (12). It may be possible to use a single instance of the sensor assembly (12) for case (H). For a single instance of the sensor assembly (12), axle spacing is calculated, and the speed is approximated, and detection of inter axle spacing may become less accurate (identify delta_t, then calculate delta_x). A line is interpolated, and measurement may be made when the front tire rolls over the sensor assembly (12), then when the rear tires roll over the sensor assembly (12), that gives the distance between axles. This measurement has no units of measure, so it is a detection signal, and then there is a need to know or identify the speed and time between events (measure initial time using a real-time clock, and then a time later with speed, and thus then the distance between axles may be calculated.

Case (I) includes detection of a bumper-to-bumper vehicle length of the moving vehicle (900), when used in association with loop detector. For case (I), the following arrangement of the sensor assembly (12) may be set up and used with the ETDR system (906): two instances of the sensor assembly (12) or three instances of the sensor assembly (12). It may be possible to use a single instance of the sensor assembly (12) for case (I) if two loop detectors (loops) are used with the single instance of the sensor assembly (12). A traffic loop is required to detect the presence of a bumper of the moving vehicle (900). If a single instance of the sensor assembly (12) is used, then approximated speed may be computed. If two instances of the traffic loop are deployed, then an improved measurement is possible.

Case (J) includes detection of a number of vehicle axles of the moving vehicle (900) when used in association with loop detector. For case (J), the following arrangement of the sensor assembly (12) may be set up and used with the ETDR system (906): a single instance of the sensor assembly (12), two instances of the sensor assembly (12) or three instances of the sensor assembly (12). There is no speed information required for case (J). What is done is a counting of the output (binary state) in order to count the number of axles (by simply detecting impedance change); a count of the number of axles is performed by how often impedance changes in the sensor assembly (12). If a traffic loop is used, then once the traffic loop detects presence of a vehicle, then the process simply counts the number of changes in the impedance of the sensor assembly (12) to determine the number of axles as they pass by the sensor assembly (12); once the vehicle departs from the traffic loop, then there are no more axles to be counted.

In summary (in view of the foregoing), it will be appreciated that the sensor assembly (12) may be used where any one of: (A) a first instance of the sensor, (B) the first instance of the sensor and a second instance of the sensor, and (C) the first instance of the sensor, the second instance of the sensor, and a third instance of the sensor, are used to detect any one of an axle width, axle detection, a single tire, a dual tire, lateral position of tire on sensor, a tire width, a number of axles for the vehicle when used in association with a loop detector.

In summary (in view of the foregoing), it will be appreciated that the sensor assembly (12) may be used where any one of: (A) a first instance of the sensor and a second instance of the sensor, and (B) the first instance of the sensor, the second instance of the sensor, and a third instance of the sensor, are used to detect any one of a tire speed, a vehicle speed, a tire weight, a tire pressure, a vehicle inter-axle spacing, a vehicle weight when used in association with a loop detector, and, a bumper to bumper vehicle length when used in association with a loop detector.

Additional Description

The following clauses are offered as further description of the examples of the apparatus (800). Any one or more of the following clauses may be combinable with any another one or more of the following clauses and/or with any subsection or a portion or portions of any other clause and/or combination and permutation of clauses. Any one of the following clauses may stand on its own merit without having to be combined with any other clause or with any portion of any other clause, etc. Clause (1): an apparatus (800), either taken alone, or with an apparatus (800) of any clause mentioned in this paragraph, or any portion of any clause mentioned in this paragraph, including: a sensor assembly (12), including: a transmission-line assembly (802) having an electrical transmission-line parameter being configured to change, at least in part, in response to reception, at least in part, of a vehicular load (902) of a moving vehicle (900) moving relative to a vehicular roadway (908) to the transmission-line assembly (802) being positionable, at least in part, relative to the vehicular roadway (908). Clause (2): an apparatus (800), either taken alone, or with an apparatus (800) of any clause mentioned in this paragraph, or any portion of any clause mentioned in this paragraph, wherein: the electrical transmission-line parameter includes: a transmission-line impedance being configured to elastically change, at least in part, in response to reception of the vehicular load (902) from the moving vehicle (900). Clause (3): an apparatus (800), either taken alone, or with an apparatus (800) of any clause mentioned in this paragraph, or any portion of any clause mentioned in this paragraph, wherein: the electrical transmission-line parameter includes: a transmission-line impedance being configured to elastically change, at least in part, in response to reception of the vehicular load (902) from the moving vehicle (900) from between: a no-load characteristic impedance once none of the vehicular load (902) is received from the moving vehicle (900); and a loaded impedance once the vehicular load (902) is received, at least in part, from the moving vehicle (900). Clause (4): an apparatus (800), either taken alone, or with an apparatus (800) of any clause mentioned in this paragraph, or any portion of any clause mentioned in this paragraph, wherein: the electrical transmission-line parameter includes: a transmission-line impedance being configured to: change, at least in part, in response to reception of the vehicular load (902) from the moving vehicle (900) in such a way that an aspect of an alternating current being carried, at least in part, by the transmission-line assembly (802) changes in response to the transmission-line assembly (802) receiving the vehicular load (902); and remain constant in response to reception of none of the vehicular load (902) from the moving vehicle (900) in such a way that the aspect of the alternating current remains constant. Clause (5): an apparatus (800), either taken alone, or with an apparatus (800) of any clause mentioned in this paragraph, or any portion of any clause mentioned in this paragraph, wherein: the sensor assembly (12) further includes: a termination impedance (804) being configured to terminate the transmission-line assembly (802). Clause (6): an apparatus (800), either taken alone, or with an apparatus (800) of any clause mentioned in this paragraph, or any portion of any clause mentioned in this paragraph, wherein: the sensor assembly (12) further includes: a termination impedance (804) being configured to terminate the transmission-line assembly (802); and the termination impedance (804) is impedance matched with the transmission-line assembly (802). Clause (7): an apparatus (800), either taken alone, or with an apparatus (800) of any clause mentioned in this paragraph, or any portion of any clause mentioned in this paragraph, wherein: the transmission-line assembly (802) is configured to extend across, at least in part, the vehicular roadway (908). Clause (8): an apparatus (800), either taken alone, or with an apparatus (800) of any clause mentioned in this paragraph, or any portion of any clause mentioned in this paragraph, wherein: the sensor assembly (12) is configured to be buried, at least in part, in the vehicular roadway (908); and the transmission-line assembly (802) is configured to extend across, at least in part, the vehicular roadway (908). Clause (9): an apparatus (800), either taken alone, or with an apparatus (800) of any clause mentioned in this paragraph, or any portion of any clause mentioned in this paragraph, wherein: the transmission-line assembly (802) includes an electrical cable. Clause (10): an apparatus (800), either taken alone, or with an apparatus (800) of any clause mentioned in this paragraph, or any portion of any clause mentioned in this paragraph, wherein: the transmission-line assembly (802) includes at least one of: two electrical conductors; an electrical stripline; an electrical microstrip; and an electrical coaxial cable. Clause (11): an apparatus (800), either taken alone, or with an apparatus (800) of any clause mentioned in this paragraph, or any portion of any clause mentioned in this paragraph, wherein: the transmission-line assembly (802) includes: a core assembly (806) being, at least in part, electrically conductive. Clause (12): an apparatus (800), either taken alone, or with an apparatus (800) of any clause mentioned in this paragraph, or any portion of any clause mentioned in this paragraph, wherein: the transmission-line assembly (802) includes: a shield assembly (808) being, at least in part, electrically conductive and being positioned, at least in part, relative to the core assembly (806). Clause (13): an apparatus (800), either taken alone, or with an apparatus (800) of any clause mentioned in this paragraph, or any portion of any clause mentioned in this paragraph, wherein: the transmission-line assembly (802) includes: a core assembly (806) being, at least in part, electrically conductive; and a shield assembly (808) being, at least in part, electrically conductive, and the shield assembly (808) surrounding, at least in part, the core assembly (806). Clause (14): an apparatus (800), either taken alone, or with an apparatus (800) of any clause mentioned in this paragraph, or any portion of any clause mentioned in this paragraph, wherein: the transmission-line assembly (802) includes: a core assembly (806) being, at least in part, electrically conductive; a shield assembly (808) being, at least in part, electrically conductive and surrounding the core assembly (806); and the core assembly (806) and the shield assembly (808) being aligned, at least in part, longitudinally coaxial relative to each other. Clause (15): an apparatus (800), either taken alone, or with an apparatus (800) of any clause mentioned in this paragraph, or any portion of any clause mentioned in this paragraph, wherein: the core assembly (806) includes: a carrier assembly (810) being configured to support, at least in part, an electrical conductor relative to the shield assembly (808). Clause (16): an apparatus (800), either taken alone, or with an apparatus (800) of any clause mentioned in this paragraph, or any portion of any clause mentioned in this paragraph, wherein: the shield assembly (808) is configured to support, at least in part, the core assembly (806). Clause (17): an apparatus (800), either taken alone, or with an apparatus (800) of any clause mentioned in this paragraph, or any portion of any clause mentioned in this paragraph, wherein: the sensor assembly (12) further includes: a positioning assembly (812) being configured to position, at least in part, the core assembly (806) relative to the shield assembly (808) at a stationary position relative to the shield assembly (808). Clause (18): an apparatus (800), either taken alone, or with an apparatus (800) of any clause mentioned in this paragraph, or any portion of any clause mentioned in this paragraph, wherein: the transmission-line assembly (802) includes: a core assembly (806) being, at least in part, electrically conductive; a shield assembly (808) being, at least in part, electrically conductive and surrounding the core assembly (806); and the shield assembly (808) being configured to elastically deform in response to the shield assembly (808) receiving the vehicular load (902) from the moving vehicle (900). Clause (19): an apparatus (800), either taken alone, or with an apparatus (800) of any clause mentioned in this paragraph, or any portion of any clause mentioned in this paragraph, wherein: the transmission-line assembly (802) further includes: a gap (816) being formed, at least in part, between the core assembly (806) and the shield assembly (808). Clause (20): an apparatus (800), either taken alone, or with an apparatus (800) of any clause mentioned in this paragraph, or any portion of any clause mentioned in this paragraph, wherein: the transmission-line assembly (802) further includes: a gap (816) being formed, at least in part, between the core assembly (806) and the shield assembly (808); and the shield assembly (808) is configured to elastically deform in response to reception of the vehicular load (902) from the moving vehicle (900) by the shield assembly (808), in such a way that an aspect of the gap (816) varies depending on a magnitude of the vehicular load (902) imparted, at least in part, to the shield assembly (808). Clause (21): an apparatus (800), either taken alone, or with an apparatus (800) of any clause mentioned in this paragraph, or any portion of any clause mentioned in this paragraph, wherein: the shield assembly (808) includes: a tubular assembly (818) forming a channel (819) being configured to receive the core assembly (806). Clause (22): an apparatus (800), either taken alone, or with an apparatus (800) of any clause mentioned in this paragraph, or any portion of any clause mentioned in this paragraph, wherein: the shield assembly (808) further includes: an elastically-deformable portion (820) being formed, at least in part, in the tubular assembly (818). Clause (23): an apparatus (800), either taken alone, or with an apparatus (800) of any clause mentioned in this paragraph, or any portion of any clause mentioned in this paragraph, wherein: the shield assembly (808) further includes: an elastically-deformable portion (820) being configured to elastically deform in response to reception, at least in part, of the vehicular load (902). Clause (24): an apparatus (800), either taken alone, or with an apparatus (800) of any clause mentioned in this paragraph, or any portion of any clause mentioned in this paragraph, wherein: the shield assembly (808) includes: a roadway anchor (822) extending externally from the tubular assembly (818), and the roadway anchor (822) being configured to anchor, at least in part, the shield assembly (808) to the vehicular roadway (908). Clause (25): an apparatus (800), either taken alone, or with an apparatus (800) of any clause mentioned in this paragraph, or any portion of any clause mentioned in this paragraph, wherein: the shield assembly (808) includes: a core-anchor assembly (825) extending internally from the tubular assembly (818) into the channel (819); and the core-anchor assembly (825) being configured to support, at least in part, positioning of the core assembly (806) within the channel (819). Clause (26): an apparatus (800), either taken alone, or with an apparatus (800) of any clause mentioned in this paragraph, or any portion of any clause mentioned in this paragraph, wherein: the shield assembly (808) includes: a wear-resistant assembly (824) being configured to resist, at least in part, wear in response to reception of repeated application of the vehicular load (902) in such a way as to reduce wear to the shield assembly (808). Clause (27): an apparatus (800), either taken alone, or with an apparatus (800) of any clause mentioned in this paragraph, or any portion of any clause mentioned in this paragraph, wherein: the shield assembly (808) further includes: an elastically-deformable portion (820) being formed, at least in part, in a tubular assembly (818); a roadway anchor (822) extending externally from the tubular assembly (818); a core-anchor assembly (825) extending internally from the tubular assembly (818) into a channel (819), and being configured to support, at least in part, positioning of the core assembly (806) within the channel (819); and a wear-resistant assembly (824) being configured to resist wear, at least in part, in response to reception of repeated application of the vehicular load (902) in such a way as to reduce wear to the shield assembly (808). Clause (28): an apparatus (800), either taken alone, or with an apparatus (800) of any clause mentioned in this paragraph, or any portion of any clause mentioned in this paragraph, wherein: the sensor assembly (12) further includes: a signal interface (870) being configured to interface, at least in part, the transmission-line assembly (802) with an electrical time domain reflectometry signal processing system (906). Clause (29): an apparatus (800), either taken alone, or with an apparatus (800) of any clause mentioned in this paragraph, or any portion of any clause mentioned in this paragraph, wherein: the transmission-line assembly (802) further includes: an adhesive-backed closed-cell neoprene foam (852), a sealer material (854), a foam assembly (856), and a sealer (858), the foam assembly (856) is positioned in a space formed between a force-receiving portion (828) and an elastically-deformable portion (820) on opposite sides of a force-transfer portion (830), the adhesive-backed closed-cell neoprene foam (852) is positioned on opposite sides of the shield assembly (808), on opposite sides of the wear-resistant assembly (824), the sealer material (854) fills, at least in part, a void formed between an outer surface of the shield assembly (808) and the adhesive-backed closed-cell neoprene foam (852), and the sealer material (854) is configured to keep the foam assembly (856) securely positioned in the space formed between the force-receiving portion (828) and the elastically-deformable portion (820) on opposite sides of the force-transfer portion (830), and the sealer (858) is positioned between a top section of the force-receiving portion (828) of the shield assembly (808) and the wear-resistant assembly (824). Clause (30): an apparatus (800), either taken alone, or with an apparatus (800) of any clause mentioned in this paragraph, or any portion of any clause mentioned in this paragraph, wherein: the sensor assembly (12) further includes: a sealant (862), a fitting assembly (864), a signal connector (866), a sealing element (868), a signal interface (870), a first end cap (872), and a fastener (874), the core assembly (806) extends axially along the transmission-line assembly (802), and connects to the signal interface (870), the signal interface (870) extends along a longitudinal axis of the transmission-line assembly (802), and is configured to terminate at the sealing element (868) that is positioned stationary at an end of an internal zone of the transmission-line assembly (802), the signal connector (866) extends from a signal cable (860), the sealing element (868) is configured to be connectable to the signal interface (870), the sealant (862) fills in a zone surrounding the signal cable (860) within the interior of the sensor assembly (12), the fitting assembly (864) is fixedly connected to the first end cap (872), the first end cap (872) is attached to a housing of the transmission-line assembly (802) by way of the fastener (874), the signal interface (870) is configured to interface the core assembly (806) to the signal connector (866) of the signal cable (860), and the fitting assembly (864) is configured to permit sealed connection between the signal cable (860) and the first end cap (872). Clause (31): an apparatus (800), either taken alone, or with an apparatus (800) of any clause mentioned in this paragraph, or any portion of any clause mentioned in this paragraph, wherein: the transmission-line assembly (802) further includes: a terminator-connector assembly (880), a termination block (882), a second end cap (876), a fastener (878), and a sealing element (868), the core assembly (806) axially extends towards and connects to the terminator-connector assembly (880) that is mounted to the termination block (882) that is positioned stationary in the transmission-line assembly (802), the sealing element (868) supports and positions and seals a termination impedance (804), the termination impedance (804) is connected in such a way as to terminate the core assembly (806) and the shield assembly (808), and the fastener (878) attaches the second end cap (876) to an end of a housing of the transmission-line assembly (802). Clause (32): an apparatus (800), either taken alone, or with an apparatus (800) of any clause mentioned in this paragraph, or any portion of any clause mentioned in this paragraph, wherein: the transmission-line assembly (802) includes: a roadway-mountable housing (884) configured to be mounted in the vehicular roadway (908), the sensor assembly (12) is mounted in the roadway-mountable housing (884), the transmission-line assembly (802) is configured to be operatively connectable to an analog electronics module (886), which is in turn operatively connectable to a digital electronics module (888), a remote housing (885) configured to receive the analog electronics module (886) and the digital electronics module (888), the remote housing (885) is positioned remote from the roadway-mountable housing (884), and the digital electronics module (888) is operatively connectable to an electrical time domain reflectometry signal processing system (906). Clause (33): an apparatus (800), either taken alone, or with an apparatus (800) of any clause mentioned in this paragraph, or any portion of any clause mentioned in this paragraph, wherein: the transmission-line assembly (802) includes: a roadway-mountable housing (884) configured to be mounted in the vehicular roadway (908), the transmission-line assembly (802) is configured to be operatively connectable to an analog electronics module (886), the sensor assembly (12) and the analog electronics module (886) are mounted in the roadway-mountable housing (884), and the analog electronics module (886) is operatively connectable to a digital electronics module (888); and a remote housing (885) configured to receive the digital electronics module (888), and the remote housing (885) is positionable remote from the roadway-mountable housing (884), and the digital electronics module (888) is operatively connectable to an electrical time domain reflectometry signal processing system (906). Clause (34): an apparatus (800), either taken alone, or with an apparatus (800) of any clause mentioned in this paragraph, or any portion of any clause mentioned in this paragraph, wherein any one of: (A) a first instance of the sensor, (B) the first instance of the sensor and a second instance of the sensor, and (C) the first instance of the sensor, the second instance of the sensor, and a third instance of the sensor, are used to detect any one of an axle width, axle detection, a single tire, a dual tire, lateral position of tire on sensor, a tire width, a number of axles for the vehicle when used in association with a loop detector. Clause (35): an apparatus (800), either taken alone, or with an apparatus (800) of any clause mentioned in this paragraph, or any portion of any clause mentioned in this paragraph, wherein any one of: (A) a first instance of the sensor and a second instance of the sensor, and (B) the first instance of the sensor, the second instance of the sensor, and a third instance of the sensor, are used to detect any one of a tire speed, a vehicle speed, a tire weight, a tire pressure, a vehicle inter-axle spacing, a vehicle weight when used in association with a loop detector, and, a bumper to bumper vehicle length when used in association with a loop detector. Clause (36): a method, including: changing, at least in part, an electrical transmission-line parameter of a transmission-line assembly (802) of a sensor assembly (12) in response to reception, at least in part, of a vehicular load (902) of a moving vehicle (900) moving relative to a vehicular roadway (908) to the transmission-line assembly (802) being positionable, at least in part, relative to the vehicular roadway (908). Clause (37): a method, including: any method derivable from an apparatus (800), either taken alone, or with an apparatus (800) of any clause mentioned in this paragraph, or any portion of any clause mentioned in this paragraph.

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, or components, that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:
1. A sensor assembly, comprising:
a signal interface being configured to interface, at least in part, to a transmission-line assembly with an electrical domain reflectometry signal processing system;
the transmission-line assembly positionable relative to a vehicular roadway, including:
a force-receiving portion with a flat conductive surface for receiving a vehicular load of a moving vehicle moving relative to the vehicular roadway; and
a core assembly with a flat conductive strip substantially parallel to the flat surface;
wherein, the flat conductive strip electrically cooperates with the flat conductive surface for changing an electrical transmission-line parameter in response to reception of the vehicular load by elastic deflection of the flat conductive surface towards and away from the flat conductive strip.
2. The sensor assembly of claim 1, wherein:
the electrical transmission-line parameter of the transmission-line assembly includes:
a transmission-line impedance being configured to elastically change, at least in part, in response to reception of the vehicular load from the moving vehicle.
3. The sensor assembly of claim 1, wherein:
the electrical transmission-line parameter of the transmission-line assembly includes:
a transmission-line impedance being configured to elastically change, at least in part, in response to reception of the vehicular load from the moving vehicle from between:
a no-load characteristic impedance once none of the vehicular load is received from the moving vehicle; and
a loaded impedance once the vehicular load is received, at least in part, from the moving vehicle.
4. The sensor assembly of claim 1, wherein:
the sensor assembly is configured to respond to a baseline sweep for representing the unloaded transmission-line parameter of the transmission-line assembly at the time of the response to the baseline sweep.
5. An apparatus comprising:
a sensor assembly, including:
a termination impedance being configured to terminate a transmission-line assembly;
the transmission-line assembly positionable relative to a vehicular roadway, including:
a force-receiving portion with a flat conductive surface for receiving a vehicular load of a moving vehicle moving relative to the vehicular roadway;
a core assembly with a flat conductive strip substantially parallel to the flat surface;
wherein, the flat conductive strip electrically cooperates with the flat conductive surface for changing an electrical transmission-line parameter in response to reception of the vehicular load by elastic deflection of the flat conductive surface towards and away from the flat conductive strip.

6. The sensor assembly of claim 1, wherein:
the sensor assembly further includes:
- a termination impedance being configured to terminate the transmission-line assembly; and
- the termination impedance is impedance matched with the transmission-line assembly.

7. The sensor assembly of claim 1, wherein:
the transmission-line assembly is configured to extend across, at least in part, the vehicular roadway.

8. The sensor assembly of claim 1, wherein:
the sensor assembly is configured to be buried, at least in part, in the vehicular roadway; and
the transmission-line assembly is configured to extend across, at least in part, the vehicular roadway.

9. The sensor assembly of claim 1, wherein:
the transmission-line assembly includes an electrical cable.

10. The sensor assembly of claim 1, wherein:
the transmission-line assembly includes at least one of:
- two electrical conductors;
- an electrical stripline;
- an electrical microstrip; and
- an electrical coaxial cable.

11. The sensor assembly of claim 1, wherein:
the transmission-line assembly includes:
- a core assembly being, at least in part, electrically conductive.

12. The sensor assembly of claim 11, wherein:
the transmission-line assembly includes:
- a shield assembly being, at least in part, electrically conductive and being positioned, at least in part, relative to the core assembly.

13. The sensor assembly of claim 1, wherein:
the transmission-line assembly includes:
- a core assembly being, at least in part, electrically conductive; and
- a shield assembly being, at least in part, electrically conductive, and the shield assembly surrounding, at least in part, the core assembly.

14. The sensor assembly of claim 1, wherein:
the transmission-line assembly includes:
- a core assembly being, at least in part, electrically conductive;
- a shield assembly being, at least in part, electrically conductive and surrounding the core assembly; and
- the core assembly and the shield assembly being aligned, at least in part, longitudinally coaxial relative to each other.

15. The sensor assembly of claim 12, wherein:
the core assembly includes:
- a carrier assembly being configured to support, at least in part, an electrical conductor relative to the shield assembly.

16. The sensor assembly of claim 12, wherein:
the shield assembly is configured to support, at least in part, the core assembly.

17. The sensor assembly of claim 12, wherein:
the sensor assembly further includes:
- a positioning assembly being configured to position, at least in part, the core assembly relative to the shield assembly at a stationary position relative to the shield assembly.

18. The sensor assembly of claim 1, wherein:
the transmission-line assembly includes:
- a core assembly being, at least in part, electrically conductive;
- a shield assembly being, at least in part, electrically conductive and surrounding the core assembly; and
- the shield assembly being configured to elastically deform in response to the shield assembly receiving the vehicular load from the moving vehicle.

19. The sensor assembly of claim 13, wherein:
the transmission-line assembly further includes:
- a gap being formed, at least in part, between the core assembly and the shield assembly.

20. The sensor assembly of claim 13, wherein:
the transmission-line assembly further includes:
- a gap being formed, at least in part, between the core assembly and the shield assembly; and
- the shield assembly is configured to elastically deform in response to reception of the vehicular load from the moving vehicle by the shield assembly, in such a way that an aspect of the gap varies depending on a magnitude of the vehicular load imparted, at least in part, to the shield assembly.

21. The sensor assembly of claim 13, wherein:
the shield assembly includes:
- a tubular assembly forming a channel being configured to receive the core assembly.

22. The sensor assembly of claim 21, wherein:
the shield assembly further includes:
- an elastically-deformable portion being formed, at least in part, in the tubular assembly.

23. The sensor assembly of claim 12, wherein:
the shield assembly further includes:
- an elastically-deformable portion being configured to elastically deform in response to reception, at least in part, of the vehicular load.

24. The sensor assembly of claim 21, wherein:
the shield assembly includes:
- a roadway anchor extending externally from the tubular assembly, and the roadway anchor being configured to anchor, at least in part, the shield assembly to the vehicular roadway.

25. The sensor assembly of claim 21, wherein:
the shield assembly includes:
- a core-anchor assembly extending internally from the tubular assembly into the channel; and
- the core-anchor assembly being configured to support, at least in part, positioning of the core assembly within the channel.

26. The sensor assembly of claim 12, wherein:
the shield assembly includes:
- a wear-resistant assembly being configured to resist, at least in part, wear in response to reception of repeated application of the vehicular load in such a way as to reduce wear to the shield assembly.

27. The sensor assembly of claim 13, wherein:
the shield assembly further includes:
- an elastically-deformable portion being formed, at least in part, in a tubular assembly;
- a roadway anchor extending externally from the tubular assembly;
- a core-anchor assembly extending internally from the tubular assembly into a channel, and being configured to support, at least in part, positioning of the core assembly within the channel; and
- a wear-resistant assembly being configured to resist wear, at least in part, in response to reception of repeated application of the vehicular load in such a way as to reduce wear to the shield assembly.

28. The sensor assembly of claim 26, wherein:
the transmission-line assembly further includes:
an adhesive-backed closed-cell neoprene foam,
a sealer material,
a foam assembly, and
a sealer,
the foam assembly is positioned in a space formed between a force-receiving portion and an elastically-deformable portion on opposite sides of a force-transfer portion, the adhesive-backed closed-cell neoprene foam is positioned on opposite sides of the shield assembly, on opposite sides of the wear-resistant assembly,
the sealer material fills, at least in part, a void formed between an outer surface of the shield assembly and the adhesive-backed closed-cell neoprene foam, and the sealer material is configured to keep the foam assembly securely positioned in the space formed between the force-receiving portion and the elastically-deformable portion on opposite sides of the force-transfer portion, and
the sealer is positioned between a top section of the force-receiving portion of the shield assembly and the wear-resistant assembly.

29. The sensor assembly of claim 11, wherein:
the sensor assembly further includes:
a sealant,
a fitting assembly,
a signal connector,
a sealing element,
a signal interface,
a first end cap, and
a fastener,
the core assembly extends axially along the transmission-line assembly, and connects to the signal interface,
the signal interface extends along a longitudinal axis of the transmission-line assembly, and is configured to terminate at the sealing element that is positioned stationary at an end of an internal zone of the transmission-line assembly,
the signal connector extends from a signal cable,
the sealing element is configured to be connectable to the signal interface,
the sealant fills in a zone surrounding the signal cable within the interior of the sensor assembly,
the fitting assembly is fixedly connected to the first end cap,
the first end cap is attached to a housing of the transmission-line assembly by way of the fastener,
the signal interface is configured to interface the core assembly to the signal connector of the signal cable, and
the fitting assembly is configured to permit sealed connection between the signal cable and the first end cap.

30. The sensor assembly of claim 12, wherein:
the transmission-line assembly further includes:
a terminator-connector assembly,
a termination block,
a second end cap,
a fastener, and
a sealing element,
the core assembly axially extends towards and connects to the terminator-connector assembly that is mounted to the termination block that is positioned stationary in the transmission-line assembly,
the sealing element supports and positions and seals a termination impedance,
a termination impedance is connected in such a way as to terminate the core assembly and the shield assembly, and
the fastener attaches the second end cap to an end of a housing of the transmission-line assembly.

31. A sensor assembly comprising:
a transmission-line assembly positionable relative to a vehicular roadway, including:
a force-receiving portion with a flat conductive surface for receiving a vehicular load of a moving vehicle moving relative to the vehicular roadway; and
a core assembly with a flat conductive strip substantially parallel to the flat surface;
wherein, the flat conductive strip electrically cooperates with the flat conductive surface for changing an electrical transmission-line parameter in response to reception of the vehicular load by elastic deflection of the flat conductive surface towards and away from the flat conductive strip;
a roadway-mountable housing configured to be mounted in the vehicular roadway;
the sensor assembly is mounted in the roadway-mountable housing;
the transmission-line assembly is configured to be operatively connectable to an analog electronics module, which is in turn operatively connectable to a digital electronics module; and
a remote housing configured to receive the analog electronics module and the digital electronics module, the remote housing is positioned remote from the roadway-mountable housing, and the digital electronics module is operatively connectable to an electrical time domain reflectometry signal processing system.

32. A sensor assembly comprising:
a transmission-line assembly positionable relative to a vehicular roadway, including:
a force-receiving portion with a flat conductive surface for receiving a vehicular load of a moving vehicle moving relative to the vehicular roadway; and
a core assembly with a flat conductive strip substantially parallel to the flat surface;
wherein, the flat conductive strip electrically cooperates with the flat conductive surface for changing an electrical transmission-line parameter in response to reception of the vehicular load by elastic deflection of the flat conductive surface towards and away from the flat conductive strip;
a roadway-mountable housing configured to be mounted in the vehicular roadway, the transmission-line assembly is configured to be operatively connectable to an analog electronics module, the sensor assembly and the analog electronics module are mounted in the roadway-mountable housing, and the analog electronics module is operatively connectable to a digital electronics module; and
a remote housing configured to receive the digital electronics module, and the remote housing is positionable remote from the roadway-mountable housing, and the digital electronics module is operatively connectable to an electrical time domain reflectometry signal processing system.

33. The sensor assembly claim 1, wherein:
any one of: (A) a first instance of the sensor, (B) the first instance of the sensor and a second instance of the sensor, and (C) the first instance of the sensor, the second instance of the sensor, and a third instance of the sensor,
are used to detect any one of
an axle width, axle detection, a single tire, a dual tire, lateral position of tire on sensor, a tire width, a number of axles for the vehicle when used in association with a loop detector.

34. The sensor assembly of claim 1, wherein:
any one of: (A) a first instance of the sensor and a second instance of the sensor, and (B) the first instance of the sensor, the second instance of the sensor, and a third instance of the sensor, are used to detect any one of a tire speed, a vehicle speed, a tire weight, a tire pressure, a vehicle inter-axle spacing, a vehicle weight when used in association with a loop detector, and, a bumper to bumper vehicle length when used in association with a loop detector.

35. The sensor assembly of claim 1, wherein:
the vehicular load comprises two or more tires on an axle of the moving vehicle, and, the transmission-line parameter measurably changes in response to each tire on the axle for simultaneously measuring each tire for both a location of each tire on the flat conductive surface and a width of each tire.

36. The sensor assembly of claim 1, wherein:
the vehicular load comprises four or more tires on an axle of the moving vehicle, and, the transmission-line parameter measurably changes in response to each tire on the axle for simultaneously measuring each tire for both a location of each tire on the flat conductive surface and a width of each tire.

37. The sensor assembly of claim 1, wherein:
the vehicular load comprises a dual tire pair on an axle of the moving vehicle, and, the transmission-line parameter measurably changes in response to each tire of the dual tire pair on the axle for simultaneously measuring a location of each tire on the flat conductive surface and a width of each tire.

38. The sensor assembly of claim 1, wherein:
the transmission-line parameter measurably changes with a spatial resolution, measured along a length of the flat conductive surface, of about 3.81 centimeters to about 7.62 centimeters.

39. The apparatus of claim 5, wherein:
the electrical transmission-line parameter of the transmission-line assembly includes:
a transmission-line impedance being configured to elastically change, at least in part, in response to reception of the vehicular load from the moving vehicle.

40. The apparatus of claim 5, wherein:
the electrical transmission-line parameter of the transmission-line assembly includes:
  a transmission-line impedance being configured to elastically change, at least in part, in response to reception of the vehicular load from the moving vehicle from between:
    a no-load characteristic impedance once none of the vehicular load is received from the moving vehicle; and
    a loaded impedance once the vehicular load is received, at least in part, from the moving vehicle.

41. The apparatus of claim 5, wherein:
the sensor assembly is configured to respond to a baseline sweep for representing the unloaded transmission-line parameter of the transmission-line assembly at the time of the response to the baseline sweep.

42. The apparatus of claim 5, wherein:
the termination impedance is impedance matched with the transmission-line assembly.

43. The apparatus of claim 5, wherein:
the transmission-line assembly is configured to extend across, at least in part, the vehicular roadway.

44. The apparatus of claim 5, wherein:
the sensor assembly is configured to be buried, at least in part, in the vehicular roadway; and
the transmission-line assembly is configured to extend across, at least in part, the vehicular roadway.

45. The apparatus of claim 5, wherein:
the transmission-line assembly includes an electrical cable.

46. The apparatus of claim 5, wherein:
the transmission-line assembly includes at least one of:
  two electrical conductors;
  an electrical stripline;
  an electrical microstrip; and
  an electrical coaxial cable.

47. The apparatus of claim 5, wherein:
the transmission-line assembly includes:
  a core assembly being, at least in part, electrically conductive.

48. The apparatus of claim 47, wherein:
the sensor assembly further includes:
  a sealant,
  a fitting assembly,
  a signal connector,
  a sealing element,
  a signal interface,
  a first end cap, and
  a fastener,
  the core assembly extends axially along the transmission-line assembly, and connects to the signal interface,
  the signal interface extends along a longitudinal axis of the transmission-line assembly, and is configured to terminate at the sealing element that is positioned stationary at an end of an internal zone of the transmission-line assembly,
  the signal connector extends from a signal cable,
  the sealing element is configured to be connectable to the signal interface,
  the sealant fills in a zone surrounding the signal cable within the interior of the sensor assembly,
  the fitting assembly is fixedly connected to the first end cap,
  the first end cap is attached to a housing of the transmission-line assembly by way of the fastener,
  the signal interface is configured to interface the core assembly to the signal connector of the signal cable, and
  the fitting assembly is configured to permit sealed connection between the signal cable and the first end cap.

49. The apparatus of claim 47, wherein:
the transmission-line assembly includes:
  a shield assembly being, at least in part, electrically conductive and being positioned, at least in part, relative to the core assembly.

50. The apparatus of claim 49, wherein:
the core assembly includes:
  a carrier assembly being configured to support, at least in part, an electrical conductor relative to the shield assembly.

51. The apparatus of claim 49, wherein:
the shield assembly is configured to support, at least in part, the core assembly.

52. The apparatus of claim 49, wherein:
the sensor assembly further includes:
   a positioning assembly being configured to position, at least in part, the core assembly relative to the shield assembly at a stationary position relative to the shield assembly.

53. The apparatus of claim 49, wherein:
the shield assembly further includes:
   an elastically-deformable portion being configured to elastically deform in response to reception, at least in part, of the vehicular load.

54. The apparatus of claim 49, wherein:
the shield assembly includes:
   a wear-resistant assembly being configured to resist, at least in part, wear in response to reception of repeated application of the vehicular load in such a way as to reduce wear to the shield assembly.

55. The apparatus of claim 49, wherein:
the transmission-line assembly further includes:
   a terminator-connector assembly,
   a termination block,
   a second end cap,
   a fastener, and
   a sealing element,
   the core assembly axially extends towards and connects to the terminator-connector assembly that is mounted to the termination block that is positioned stationary in the transmission-line assembly,
   the sealing element supports and positions and seals a termination impedance,
   the termination impedance is connected in such a way as to terminate the core assembly and the shield assembly, and
   the fastener attaches the second end cap to an end of a housing of the transmission-line assembly.

56. The apparatus of claim 5, wherein:
the transmission-line assembly includes:
   a core assembly being, at least in part, electrically conductive; and
   a shield assembly being, at least in part, electrically conductive, and the shield assembly surrounding, at least in part, the core assembly.

57. The apparatus of claim 56, wherein:
the transmission-line assembly further includes:
   a gap being formed, at least in part, between the core assembly and the shield assembly.

58. The apparatus of claim 56, wherein:
the transmission-line assembly further includes:
   a gap being formed, at least in part, between the core assembly and the shield assembly; and
   the shield assembly is configured to elastically deform in response to reception of the vehicular load from the moving vehicle by the shield assembly, in such a way that an aspect of the gap varies depending on a magnitude of the vehicular load imparted, at least in part, to the shield assembly.

59. The apparatus of claim 56, wherein:
the shield assembly further includes:
   an elastically-deformable portion being formed, at least in part, in a tubular assembly;
   a roadway anchor extending externally from the tubular assembly;
   a core-anchor assembly extending internally from the tubular assembly into a channel, and being configured to support, at least in part, positioning of the core assembly within the channel; and
   a wear-resistant assembly being configured to resist wear, at least in part, in response to reception of repeated application of the vehicular load in such a way as to reduce wear to the shield assembly.

60. The apparatus of claim 56, wherein:
the shield assembly includes:
   a tubular assembly forming a channel being configured to receive the core assembly.

61. The apparatus of claim 60, wherein:
the shield assembly further includes:
an elastically-deformable portion being formed, at least in part, in the tubular assembly.

62. The apparatus of claim 60, wherein:
the shield assembly includes:
   a roadway anchor extending externally from the tubular assembly, and the roadway anchor being configured to anchor, at least in part, the shield assembly to the vehicular roadway.

63. The apparatus of claim 60, wherein:
the shield assembly includes:
   a core-anchor assembly extending internally from the tubular assembly into the channel; and
   the core-anchor assembly being configured to support, at least in part, positioning of the core assembly within the channel.

64. The apparatus of claim 5, wherein:
the transmission-line assembly includes:
   a core assembly being, at least in part, electrically conductive;
   a shield assembly being, at least in part, electrically conductive and surrounding the core assembly; and
   the core assembly and the shield assembly being aligned, at least in part, longitudinally coaxial relative to each other.

65. The apparatus of claim 5, wherein:
the transmission-line assembly includes:
   a core assembly being, at least in part, electrically conductive;
   a shield assembly being, at least in part, electrically conductive and surrounding the core assembly; and
   the shield assembly being configured to elastically deform in response to the shield assembly receiving the vehicular load from the moving vehicle.

66. The apparatus of claim 5, wherein:
the shield assembly includes:
a wear-resistant assembly being configured to resist, at least in part, wear in response to reception of repeated application of the vehicular load in such a way as to reduce wear to the shield assembly;
the transmission-line assembly further includes:
   a core assembly being, at least in part, electrically conductive;
   a shield assembly being, at least in part, electrically conductive and being positioned, at least in part, relative to the core assembly;
   an adhesive-backed closed-cell neoprene foam,
   a sealer material,
   a foam assembly, and
   a sealer,
   the foam assembly is positioned in a space formed between a force-receiving portion and an elastically-deformable portion on opposite sides of a force-transfer portion, the adhesive-backed closed-cell neoprene foam is positioned on opposite sides of the shield assembly, on opposite sides of the wear-resistant assembly, the sealer material fills, at least in part, a void formed between an outer surface of the shield assembly and the adhesive-backed closed-cell neoprene foam, and the sealer material is configured to keep the foam assembly securely positioned in the space formed between the force-receiving portion and the elastically-deformable portion on opposite sides of the force-transfer portion, and the sealer is positioned between a top section of the force-receiving portion of the shield assembly and the wear-resistant assembly.

67. The apparatus of claim 5, wherein:

any one of: (A) a first instance of the sensor, (B) the first instance of the sensor and a second instance of the sensor, and (C) the first instance of the sensor, the second instance of the sensor, and a third instance of the sensor, are used to detect any one of an axle width, axle detection, a single tire, a dual tire, lateral position of tire on sensor, a tire width, a number of axles for the vehicle when used in association with a loop detector.

68. The apparatus of claim 5, wherein:

any one of: (A) a first instance of the sensor and a second instance of the sensor, and (B) the first instance of the sensor, the second instance of the sensor, and a third instance of the sensor, are used to detect any one of a tire speed, a vehicle speed, a tire weight, a tire pressure, a vehicle inter-axle spacing, a vehicle weight when used in association with a loop detector, and, a bumper to bumper vehicle length when used in association with a loop detector.

69. The apparatus of claim 5, wherein:

the vehicular load comprises two or more tires on an axle of the moving vehicle, and, the transmission-line parameter measurably changes in response to each tire on the axle for simultaneously measuring each tire for both a location of each tire on the flat conductive surface and a width of each tire.

70. The apparatus of claim 5, wherein:

the vehicular load comprises four or more tires on an axle of the moving vehicle, and, the transmission-line parameter measurably changes in response to each tire on the axle for simultaneously measuring each tire for both a location of each tire on the flat conductive surface and a width of each tire.

71. The apparatus of claim 5, wherein:

the vehicular load comprises a dual tire pair on an axle of the moving vehicle, and, the transmission-line parameter measurably changes in response to each tire of the dual tire pair on the axle for simultaneously measuring a location of each tire on the flat conductive surface and a width of each tire.

72. The apparatus of claim 5, wherein:

the transmission-line parameter measurably changes with a spatial resolution, measured along a length of the flat conductive surface, of about 3.81 centimeters to about 7.62 centimeters.

73. The apparatus of claim 5, further including:

a signal interface being configured to interface, at least in part, to a transmission-line assembly with an electrical domain reflectometry signal processing system.

* * * * *